US012574131B2

(12) United States Patent
Wang et al.

(10) Patent No.: US 12,574,131 B2
(45) Date of Patent: Mar. 10, 2026

(54) DETERMINING AND MANAGING APPLICABILITY OF CHANNEL LEARNING MODEL

(71) Applicant: HUAWEI TECHNOLOGIES CO., LTD., Shenzhen (CN)

(72) Inventors: Ting Wang, Shanghai (CN); Gaoning He, Boulogne Billancourt (FR); Qi Feng, Shanghai (CN); Jianmin Lu, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 554 days.

(21) Appl. No.: 18/153,876

(22) Filed: Jan. 12, 2023

(65) Prior Publication Data

US 2023/0155702 A1 May 18, 2023

Related U.S. Application Data

(63) Continuation of application No. PCT/CN2021/100637, filed on Jun. 17, 2021.

(30) Foreign Application Priority Data

Jul. 13, 2020 (CN) .......................... 202010667447.X

(51) Int. Cl.
*H04B 17/391* (2015.01)
*H04B 7/0417* (2017.01)
*H04L 25/02* (2006.01)

(52) U.S. Cl.
CPC ......... *H04B 17/391* (2015.01); *H04B 7/0417* (2013.01); *H04L 25/0202* (2013.01)

(58) Field of Classification Search
CPC .. H04B 17/391; H04B 7/0417; H04B 17/382; H04B 7/0413; H04B 7/0456;
(Continued)

(56) References Cited

U.S. PATENT DOCUMENTS

2016/0127058 A1* 5/2016 Souvik .............. H04W 72/0453
370/329
2019/0274108 A1* 9/2019 O'Shea .............. H04B 17/3912
(Continued)

OTHER PUBLICATIONS

Björnson et al, "Massive MIMO: ten myths and one critical question," IEEE Communications Magazine, vol. 54, No. 2, Feb. 2016, pp. 114-123.

*Primary Examiner* — Chae S Lee
(74) *Attorney, Agent, or Firm* — Fish & Richardson P.C.

(57) ABSTRACT

This application provides communication methods and communications apparatuses. In an example method, a first communications apparatus determines whether a first channel learning model is applicable, where the first channel learning model is used to determine first channel information based on target channel information, and a data amount of the first channel information is less than a data amount of the target channel information. The first communications apparatus sends a first message in response to determining that the first channel learning model is not applicable, where the first message is used to indicate that the first channel learning model is not applicable. According to the example method, the first communications apparatus can determine applicability of the first channel learning model without assistance of a second communications apparatus.

19 Claims, 14 Drawing Sheets

(58) Field of Classification Search
CPC . H04L 25/0202; H04L 25/0254; Y02D 30/70;
G06N 3/02; G06N 3/04; G06N 20/00;
G06N 3/045; H04W 40/18
See application file for complete search history.

(56) References Cited

U.S. PATENT DOCUMENTS

2021/0051678 A1* 2/2021 Suzaki .................. H04W 24/10
2021/0390434 A1* 12/2021 Bai ........................ H04W 24/02
2022/0376957 A1* 11/2022 Song ................... H04L 25/0254
2022/0393781 A1* 12/2022 Kim ......................... G06N 3/08

* cited by examiner

Input layer        Hidden layer    Output layer

200

600

Terminal device

Network device

S610. Channel learning training signaling

S620. Perform channel
learning model training

S630. Channel learning feedback signaling

S640. Determine a channel learning model

S650. Configuration information of a first channel
learning model

S660. Determine the first
channel learning model

800

DETERMINING AND MANAGING APPLICABILITY OF CHANNEL LEARNING MODEL

CROSS-REFERENCE TO RELATED APPLICATIONS

This application is a continuation of International Application No. PCT/CN2021/100637, filed on Jun. 17, 2021, which claims priority to Chinese Patent Application No. 202010667447.X, filed on Jul. 13, 2020. The disclosures of the afore-mentioned applications are hereby incorporated by reference in their entireties.

TECHNICAL FIELD

This application relates to the communications field, and more specifically, to a communication method and a communications apparatus.

BACKGROUND

In a massive multiple-input multiple-output (Massive MIMO) technology, a network device may allocate, through precoding, limited power to data streams that can be effectively transmitted, and reduce interference between a plurality of terminal devices and interference between a plurality of signal streams of a same terminal device, to help improve signal quality, implement spatial multiplexing, and improve spectrum utilization. The terminal device may determine a precoding matrix based on downlink channel measurement, and feed back the precoding matrix, so that the network device may determine precoding for data transmission based on the precoding matrix fed back by the terminal device, to improve signal transmission performance.

Currently, an artificial intelligence (AI)-based information transmission method is known. The terminal device and the network device obtain a first channel learning model and a second channel learning model through joint training. The first channel learning model is set on a side of the terminal device, and the second channel learning model is set on a side of the network device. A communications system that includes the first channel learning model and the second channel learning model is referred to as an AI-based communications system. Specifically, the AI-based information transmission method includes: the terminal device obtains information to be fed back; the terminal device processes, by using at least the first channel learning model, the information to be fed back, to obtain information that needs to be fed back through an air interface; the terminal device feeds back, to the network device through a feedback link, the information that needs to be fed back through the air interface; the network device receives the information fed back by the terminal device; and the network device processes, by using at least the second channel learning model, the information that is fed back, to obtain the information to be fed back by the side of the terminal device. However, in this AI-based information transmission manner, the first channel learning model and the second channel learning model obtained through offline training are directly applied to an online information transmission process, and if a location of the terminal device changes or a communication environment in which the terminal device is located changes, the first channel learning model and the second channel learning model may not be applicable. Consequently, in this AI-based information transmission manner, performance of performing information transmission based on the first channel learning model and the second channel learning model is affected.

SUMMARY

This application provides a communication method, to determine applicability of a currently used channel learning model.

According to a first aspect, a communication method is provided. The method may include: a first communications apparatus determines whether a first channel learning model is applicable, where the first channel learning model is used to determine first channel information based on target channel information, and a data amount of the first channel information is less than a data amount of the target channel information; and the first communications apparatus sends a first message when determining that the first channel learning model is not applicable, where the first message is used to indicate that the first channel learning model is not applicable.

The first channel information is used to determine second channel information by using a second channel learning model, and the second channel information is the same as or similar to the target channel information.

Based on the foregoing solution, the first communications apparatus may determine applicability of the first channel learning model without assistance of a second communications apparatus. Therefore, signaling exchange and complexity of determining applicability of the channel learning model can be reduced.

With reference to the first aspect, in some implementations of the first aspect, that a first communications apparatus determines whether a first channel learning model is applicable includes: when a variation of a long-term statistical characteristic of a target channel is greater than or equal to a first preset threshold, the first communications apparatus determines that the first channel learning model is not applicable; or when a variation of a long-term statistical characteristic of a target channel is less than a first preset threshold, the first communications apparatus determines that the first channel learning model is applicable.

Based on the foregoing technical solution, the first communications apparatus determines applicability of the first channel learning model based on the long-term statistical characteristic of the target channel, and does not need to restore the first channel information, and therefore does not need to perform a large amount of calculation. Therefore, a processing load of the first communications apparatus can be reduced.

With reference to the first aspect, in some implementations of the first aspect, that a first communications apparatus determines whether a first channel learning model is applicable includes: the first communications apparatus determines, based on received first scheduling information, whether the first channel learning model is applicable.

The first scheduling information is sent by the second communications apparatus based on the second channel information, and the second channel information is determined based on the first channel information and the second channel learning model.

Based on the foregoing technical solution, the first communications apparatus determines applicability of the first channel learning model based on the first scheduling information, and does not need to restore the first channel information, and therefore does not need to perform a large amount of calculation. Therefore, a processing load of the first communications apparatus can be reduced.

With reference to the first aspect, in some implementations of the first aspect, that a first communications apparatus determines whether a first channel learning model is applicable includes: the first communications apparatus determines, based on data transmission performance, whether the first channel learning model is applicable.

The data transmission performance may include transmission performance of first data and/or transmission performance of second data. The first data is sent by the first communications apparatus based on the target channel information, and the second data is sent by the second communications apparatus based on the second channel information.

Based on the foregoing technical solution, the first communications apparatus determines applicability of the first channel learning model based on the data transmission performance, and does not need to restore the first channel information, and therefore does not need to perform a large amount of calculation. Therefore, a processing load of the first communications apparatus can be reduced.

With reference to the first aspect, in some implementations of the first aspect, that a first communications apparatus determines whether a first channel learning model is applicable includes: when a scenario changes, the first communications apparatus determines that the first channel learning model is not applicable; or when a scenario does not change, the first communications apparatus determines that the first channel learning model is applicable, where the scenario includes at least one of the following: an indoor still scenario, an outdoor still scenario, a low-speed moving scenario, a high-speed moving scenario, a suburban scenario, an urban scenario, a macro base station, a micro base station, a vehicle-mounted scenario, a vehicle-to-another device scenario, and a scenario defined in a 3rd generation partnership project (3GPP) protocol.

Based on the foregoing technical solution, the first communications apparatus determines applicability of the first channel learning model based on whether the scenario changes, and does not need to restore the first channel information, and therefore does not need to perform a large amount of calculation. Therefore, a processing load of the first communications apparatus can be reduced. In addition, it is easier to implement the manner of determining, based on whether the scenario changes, whether the first channel learning model is applicable.

With reference to the first aspect, in some implementations of the first aspect, that a first communications apparatus determines whether a first channel learning model is applicable includes: when a performance indicator of the first channel learning model is less than a second preset threshold, the first communications apparatus determines that the first channel learning model is not applicable, where the performance indicator includes continuity and/or trustworthiness; or when a performance indicator of the first channel learning model is greater than or equal to a second preset threshold, the first communications apparatus determines that the first channel learning model is applicable.

Based on the foregoing technical solution, the first communications apparatus determines applicability of the first channel learning model based on the performance indicator of the first channel learning model, and does not need to restore the first channel information, and therefore does not need to perform a large amount of calculation. Therefore, a processing load of the first communications apparatus can be reduced.

With reference to the first aspect, in some implementations of the first aspect, that a first communications apparatus determines whether a first channel learning model is applicable includes: the first communications apparatus determines, based on an error between the target channel information and the second channel information, whether the first channel learning model is applicable, where the second channel information is determined based on the first channel information and the second channel learning model, and the second channel learning model corresponds to the first channel learning model.

Based on the foregoing technical solution, the first communications apparatus may determine, based on the error between the target channel information and the second channel information, whether the first channel learning model is applicable, in other words, determine, by performing channel learning model training, whether the first channel learning model is applicable. In this manner, the first communications apparatus may determine, without depending on assistance of the second communications apparatus, whether the channel learning model is applicable. Therefore, this manner is simple and convenient. In addition, whether the first channel learning model is applicable is determined in consideration of features of both the target channel information and the second channel information. Therefore, it can be ensured that the first communications apparatus and the second communications apparatus obtain same or similar features of channel information, to help improve data transmission performance when data transmission is subsequently performed by using the channel information.

With reference to the first aspect, in some implementations of the first aspect, the method further includes: the first communications apparatus receives first indication information, where the first indication information is used to indicate the first communications apparatus to perform channel learning model training.

Based on the foregoing technical solution, when receiving the first indication information, the first communications apparatus that does not have an active learning capability may determine applicability of the first channel learning model.

Based on the foregoing technical solution, the second communications apparatus may indicate, by using signaling, the first communications apparatus to determine whether the first channel learning model is applicable, so that when finding that the first channel learning model is not applicable, the second communications apparatus indicates, in a timely manner, the first communications apparatus to perform verification, to reduce a delay of determining whether the first channel learning model is applicable. In addition, when finding, in a timely manner, that first channel learning is not applicable, the second communications apparatus may update the first channel learning model in a timely manner, to avoid degradation of communication performance caused when the first channel learning model is not applicable.

Optionally, the first indication information is further used to indicate one or more of the following:

a resource used to transmit the first message, content in the first message, a manner of sending the first message, and a channel learning model training parameter. The training parameter includes at least one of the following: a channel learning model training time and configuration information of a reference signal for channel learning model training.

With reference to the first aspect, in some implementations of the first aspect, the method further includes: the first communications apparatus sends a first request message, where the first request message is used to request one or more of the following: an operation of performing channel learning model training, an operation of sending the first message, and the first indication information.

Based on the foregoing technical solution, the first communications apparatus may request, by using signaling, to determine whether the first channel learning model is applicable, so that when finding that the first channel learning model is not applicable, the first communications apparatus requests verification from the second communications apparatus in a timely manner, to reduce a delay of determining whether the first channel learning model is applicable. In addition, when finding, in a timely manner, that the first channel learning model is not applicable, the first communications apparatus may update the first channel learning model in a timely manner, to avoid degradation of communication performance caused when the first channel learning model is not applicable.

With reference to the first aspect, in some implementations of the first aspect, the first message is further used to indicate one or more configuration parameters used to update the second channel learning model, and the second channel learning model is used to determine the second channel information based on the first channel information.

Based on the foregoing solution, when determining that the first channel learning model is not applicable, the first communications apparatus may determine one or more configuration parameters used to update the first channel learning model and the one or more configuration parameters used to update the second channel learning model, and send the one or more configuration parameters used to update the second channel learning model to the second communications apparatus, so that the second communications apparatus may update the second channel learning model. Further, there is relatively good performance when the first communications apparatus and the second communications apparatus perform information transmission based on an updated first channel learning model and an updated second channel learning model.

With reference to the first aspect, in some implementations of the first aspect, the method further includes: the first communications apparatus receives a second message, where the second message is used to indicate one or more configuration parameters used to update the first channel learning model.

Based on the foregoing solution, when determining that the first channel learning model is not applicable, the second communications apparatus may determine the one or more configuration parameters used to update the first channel learning model and one or more configuration parameters used to update the second channel learning model, and send the one or more configuration parameters used to update the first channel learning model to the first communications apparatus, so that the first communications apparatus may update the first channel learning model. Further, there is relatively good performance when the first communications apparatus and the second communications apparatus perform information transmission based on an updated first channel learning model and an updated second channel learning model.

With reference to the first aspect, in some implementations of the first aspect, the method further includes: the first communications apparatus determines, based on a first parameter, the one or more configuration parameters used to update the second channel learning model, where the first parameter includes at least one of the following: a cell identifier of a cell in which the first communications apparatus is located, a scenario in which the first communications apparatus is located, a type of the first communications apparatus, and a geographical location in which the first communications apparatus is located.

Based on the foregoing technical solution, the first communications apparatus may determine the first channel learning model and/or the second channel learning model based on the first parameter, and further determine the configuration parameter used to update the second channel learning model, in other words, may determine a new channel learning model without performing channel learning model training, thereby reducing processing complexity of the first communications apparatus.

According to a second aspect, a communication method is provided. The method may include: a second communications apparatus receives a first message; the second communications apparatus determines, based on the first message, that a first channel learning model is not applicable, where the first channel learning model is used to determine first channel information based on target channel information, and a dimension of the first channel information is less than a dimension of the target channel information; and the second communications apparatus sends first indication information, where the first indication information is used to indicate to perform channel learning model training.

The first channel information is used to determine second channel information by using a second channel learning model, and the second channel information is the same as or similar to the target channel information.

Based on the foregoing solution, a first communications apparatus may determine applicability of the first channel learning model without assistance of the second communications apparatus. Therefore, signaling exchange and complexity of determining applicability of the channel learning model can be reduced. In addition, when receiving the first indication information, the first communications apparatus that does not have an active learning capability may determine applicability of the first channel learning model.

Optionally, the first indication information is further used to indicate one or more of the following:

a resource used to transmit the first message, content in the first message, a manner of the first message, and a channel learning model training parameter. The training parameter includes at least one of the following: a channel learning model training time and configuration information of a reference signal for channel learning model training.

With reference to the second aspect, in some implementations of the second aspect, the method further includes: the second communications apparatus receives first request signaling, where the first request signaling is used to request one or more of the following: an operation of performing channel learning model training, an operation of sending the first message, and the first indication information.

Based on the foregoing technical solution, the first communications apparatus may request, by using signaling, to determine whether the first channel learning model is applicable, so that when finding that the first channel learning model is not applicable, the first communications apparatus requests verification from the second communications apparatus in a timely manner, to reduce a delay of determining whether the first channel learning model is applicable. In addition, when receiving the request signaling, the second communications apparatus may find, in a timely manner, that the first channel learning model and/or the second channel information are/is not applicable, and may enable the first communications apparatus to train and update the channel learning model in a timely manner, to avoid degradation of communication performance caused when the first channel learning model and/or the second channel information are/is not applicable.

With reference to the second aspect, in some implementations of the second aspect, the first message is further used to indicate one or more configuration parameters used to update the second channel learning model, and the second channel learning model is used to determine the second channel information based on the first channel information.

Based on the foregoing solution, when determining that the first channel learning model is not applicable, the first communications apparatus may determine one or more configuration parameters used to update the first channel learning model and the one or more configuration parameters used to update the second channel learning model, and send the one or more configuration parameters used to update the second channel learning model to the second communications apparatus, so that the second communications apparatus may update the second channel learning model. Further, there is relatively good performance when the first communications apparatus and the second communications apparatus perform information transmission based on an updated first channel learning model and an updated second channel learning model.

With reference to the second aspect, in some implementations of the second aspect, the method further includes: the second communications apparatus sends a second message, where the second message is used to indicate the one or more configuration parameters used to update the first channel learning model.

Based on the foregoing solution, when determining that the first channel learning model is not applicable, the second communications apparatus may determine the one or more configuration parameters used to update the first channel learning model and the one or more configuration parameters used to update the second channel learning model, and send the one or more configuration parameters used to update the first channel learning model to the first communications apparatus, so that the first communications apparatus may update the first channel learning model. Further, there is relatively good performance when the first communications apparatus and the second communications apparatus perform information transmission based on an updated first channel learning model and an updated second channel learning model.

With reference to the second aspect, in some implementations of the second aspect, the method further includes: the second communications apparatus determines, based on a first parameter, the one or more configuration parameters used to update the first channel learning model, where the first parameter includes at least one of the following: a cell identifier of a cell in which the first communications apparatus is located, a scenario in which the first communications apparatus is located, a type of the first communications apparatus, and a geographical location in which the first communications apparatus is located.

Based on the foregoing technical solution, the second communications apparatus may determine the first channel learning model and/or the second channel learning model based on the first parameter, and further determine the configuration parameter used to update the first channel learning model, in other words, may determine a new channel learning model without performing channel learning model training, thereby reducing processing complexity of the second communications apparatus.

According to a third aspect, a communication method is provided. The method may include: a first communications apparatus determines whether a first channel learning model is applicable, where the first channel learning model is used to determine first channel information based on target channel information, and a data amount of the first channel information is less than a data amount of the target channel information; and the first communications apparatus sends a first message when determining that the first channel learning model is not applicable, where the first message is used to indicate a configuration parameter used to update a second channel learning model, and the second channel learning model is used to determine second channel information based on the first channel information.

The first channel information is used to determine the second channel information by using the second channel learning model, and the second channel information is the same as or similar to the target channel information.

Based on the foregoing solution, the first communications apparatus may determine applicability of the first channel learning model without assistance of a second communications apparatus. Therefore, signaling exchange and complexity of determining applicability of the channel learning model can be reduced. The foregoing solution is applicable to a case in which the first communications apparatus sends information to the second communications apparatus in a timely manner when finding that the first channel learning model is not applicable, to reduce a delay of determining whether the channel learning model is applicable. In addition, when receiving the information, the second communications apparatus may find, in a timely manner, that the first channel learning model and/or the second channel information are/is not applicable, and may enable the first communications apparatus to train and update the channel learning model in a timely manner, to avoid degradation of communication performance caused when the first channel learning model and/or the second channel information are/is not applicable.

In addition, when determining that the first channel learning model is not applicable, the first communications apparatus may determine one or more configuration parameters used to update the first channel learning model and the one or more configuration parameters used to update the second channel learning model, and send the one or more configuration parameters used to update the second channel learning model to the second communications apparatus, so that the second communications apparatus may update the second channel learning model. Further, there is relatively good performance when the first communications apparatus and the second communications apparatus perform information transmission based on an updated first channel learning model and an updated second channel learning model.

With reference to the third aspect, in some implementations of the third aspect, that a first communications apparatus determines whether a first channel learning model is applicable includes: when a variation of a long-term statistical characteristic of a target channel is greater than or equal to a first preset threshold, the first communications apparatus determines that the first channel learning model is not applicable; or when a variation of a long-term statistical characteristic of a target channel is less than a first preset threshold, the first communications apparatus determines that the first channel learning model is applicable.

Based on the foregoing technical solution, the first communications apparatus determines applicability of the first channel learning model based on the long-term statistical characteristic of the target channel, and does not need to restore the first channel information, and therefore does not need to perform a large amount of calculation. Therefore, a processing load of the first communications apparatus can be reduced.

With reference to the third aspect, in some implementations of the third aspect, that a first communications apparatus determines whether a first channel learning model is applicable includes: the first communications apparatus determines, based on received first scheduling information, whether the first channel learning model is applicable.

The first scheduling information is sent by the second communications apparatus based on the second channel information, and the second channel information is determined based on the first channel information and the second channel learning model.

Based on the foregoing technical solution, the first communications apparatus determines applicability of the first channel learning model based on the first scheduling information, and does not need to restore the first channel information, and therefore does not need to perform a large amount of calculation. Therefore, a processing load of the first communications apparatus can be reduced.

With reference to the third aspect, in some implementations of the third aspect, that a first communications apparatus determines whether a first channel learning model is applicable includes: the first communications apparatus determines, based on data transmission performance, whether the first channel learning model is applicable.

The data transmission performance may include transmission performance of first data and/or transmission performance of second data. The first data is sent by the first communications apparatus based on the target channel information, and the second data is sent by the second communications apparatus based on the second channel information.

Based on the foregoing technical solution, the first communications apparatus determines applicability of the first channel learning model based on the data transmission performance, and does not need to restore the first channel information, and therefore does not need to perform a large amount of calculation. Therefore, a processing load of the first communications apparatus can be reduced.

With reference to the third aspect, in some implementations of the third aspect, that a first communications apparatus determines whether a first channel learning model is applicable includes: when a scenario changes, the first communications apparatus determines that the first channel learning model is not applicable; or when a scenario does not change, the first communications apparatus determines that the first channel learning model is applicable, where the scenario includes at least one of the following: an indoor still scenario, an outdoor still scenario, a low-speed moving scenario, a high-speed moving scenario, a suburban scenario, an urban scenario, a macro base station, a micro base station, a vehicle-mounted scenario, a vehicle-to-another device scenario, and a scenario defined in a 3GPP protocol.

Based on the foregoing technical solution, the first communications apparatus determines applicability of the first channel learning model based on whether the scenario changes, and does not need to restore the first channel information, and therefore does not need to perform a large amount of calculation. Therefore, a processing load of the first communications apparatus can be reduced. In addition, it is easier to implement the manner of determining, based on whether the scenario changes, whether the first channel learning model is applicable.

With reference to the third aspect, in some implementations of the third aspect, that a first communications apparatus determines whether a first channel learning model is applicable includes: when a performance indicator of the first channel learning model is less than a second preset threshold, the first communications apparatus determines that the first channel learning model is not applicable, where the performance indicator includes continuity and/or trustworthiness; or when a performance indicator of the first channel learning model is greater than or equal to a second preset threshold, the first communications apparatus determines that the first channel learning model is applicable.

Based on the foregoing technical solution, the first communications apparatus determines applicability of the first channel learning model based on the performance indicator of the first channel learning model, and does not need to restore the first channel information, and therefore does not need to perform a large amount of calculation. Therefore, a processing load of the first communications apparatus can be reduced.

With reference to the third aspect, in some implementations of the third aspect, that a first communications apparatus determines whether a first channel learning model is applicable includes: the first communications apparatus determines, based on an error between the target channel information and the second channel information, whether the first channel learning model is applicable, where the second channel information is determined based on the first channel information and the second channel learning model, and the second channel learning model corresponds to the first channel learning model.

Based on the foregoing technical solution, the first communications apparatus may determine, based on the error between the target channel information and the second channel information, whether the first channel learning model is applicable, in other words, determine, by performing channel learning model training, whether the first channel learning model is applicable. In this manner, the first communications apparatus may determine, without depending on assistance of the second communications apparatus, whether the channel learning model is applicable. Therefore, this manner is simple and convenient. In addition, whether the first channel learning model is applicable is determined in consideration of features of both the target channel information and the second channel information. Therefore, it can be ensured that the first communications apparatus and the second communications apparatus obtain same or similar features of channel information, to help improve data transmission performance when data transmission is subsequently performed by using the channel information.

With reference to the third aspect, in some implementations of the third aspect, that a first communications apparatus determines whether a first channel learning model is applicable includes: the first communications apparatus determines, based on whether first indication information is received, whether the first channel learning model is applicable, where the first indication information is used to indicate the first communications apparatus to perform channel learning model training.

Optionally, the first indication information is further used to indicate a channel learning model training parameter, and the training parameter includes at least one of the following: a channel learning model training time and configuration information of a reference signal for channel learning model training.

Based on the foregoing technical solution, the second communications apparatus may indicate, by using signaling, the first communications apparatus to determine whether the first channel learning model is applicable, so that when finding that the first channel learning model is not applicable, the second communications apparatus indicates, in a timely manner, the first communications apparatus to perform verification, to reduce a delay of determining whether the first channel learning model is applicable and reduce complexity of determining, by the first communications apparatus, whether the channel learning model is applicable. In addition, when finding, in a timely manner, that first channel learning is not applicable, the second communications apparatus may update the first channel learning model in a timely manner, to avoid degradation of communication performance caused when the first channel learning model is not applicable.

According to a fourth aspect, a communication method is provided. The method may include: a second communications apparatus determines whether a second channel learning model is applicable, where the second channel learning model is used to determine second channel information based on first channel information, the first channel information is determined based on a first channel learning model and target channel information, and a data amount of the first channel information is less than a data amount of the target channel information; the second communications apparatus sends first indication information when determining that the second channel learning model is not applicable, where the first indication information is used to indicate to perform channel learning model training; and the second communications apparatus receives a first message, where the first message is used to indicate one or more configuration parameters used to update the second channel learning model.

The first channel information is used to determine the second channel information by using the second channel learning model, and the second channel information is the same as or similar to the target channel information.

Based on the foregoing solution, the second communications apparatus may determine applicability of the second channel learning model without assistance of a first communications apparatus. Therefore, signaling exchange and complexity of determining applicability of the channel learning model can be reduced. The foregoing solution is applicable to a case in which the second communications apparatus sends information to the first communications apparatus in a timely manner when finding that the second channel learning model is not applicable, to reduce a delay of determining whether the channel learning model is applicable. In addition, when receiving the information, the first communications apparatus may find, in a timely manner, that the second channel learning model and/or the first channel information are/is not applicable, and the first communications apparatus may train and update the channel learning model in a timely manner, to avoid degradation of communication performance caused when the second channel learning model and/or the first channel information are/is not applicable.

In addition, when determining that the second channel learning model is not applicable, the second communications apparatus may send the first indication information to the first communications apparatus, receive the first message sent by the first communications apparatus, and further update the second channel learning model based on the first message. Further, there is relatively good performance when the first communications apparatus and the second communications apparatus perform information transmission based on an updated first channel learning model and an updated second channel learning model.

Optionally, the first indication information is further used to indicate a channel learning model training parameter, and the training parameter includes at least one of the following: a channel learning model training time and configuration information of a reference signal for channel learning model training.

With reference to the fourth aspect, in some implementations of the fourth aspect, that a second communications apparatus determines whether a second channel learning model is applicable includes: when a variation of a long-term statistical characteristic of a target channel is greater than or equal to a third preset threshold, the second communications apparatus determines that the second channel learning model is not applicable; or when a variation of a long-term statistical characteristic of a target channel is less than a third preset threshold, the second communications apparatus determines that the second channel learning model is applicable.

Based on the foregoing technical solution, the second communications apparatus determines applicability of the second channel learning model based on the long-term statistical characteristic of the target channel, and the first communications apparatus does not need to feed back the target channel information. Therefore, feedback overheads of the first communications apparatus can be reduced, and a processing load of the second communications apparatus can be reduced because no large amount of calculation needs to be performed.

With reference to the fourth aspect, in some implementations of the fourth aspect, that a second communications apparatus determines whether a second channel learning model is applicable includes: the second communications apparatus determines, based on first scheduling information, whether the second channel learning model is applicable.

The first scheduling information is sent by the second communications apparatus based on the second channel information, and the second channel information is determined based on the first channel information and the second channel learning model.

Based on the foregoing technical solution, the second communications apparatus determines applicability of the second channel learning model based on the first scheduling information, and the first communications apparatus does not need to feed back the target channel information. Therefore, feedback overheads of the first communications apparatus can be reduced, and a processing load of the second communications apparatus can be reduced because no large amount of calculation needs to be performed.

With reference to the fourth aspect, in some implementations of the fourth aspect, that a second communications apparatus determines whether a second channel learning model is applicable includes: the second communications apparatus determines, based on data transmission performance, whether the second channel learning model is applicable.

The data transmission performance may include transmission performance of first data and/or transmission performance of second data. The first data is sent by the first communications apparatus based on the target channel information, and the second data is sent by the second communications apparatus based on the second channel information.

Based on the foregoing technical solution, the second communications apparatus determines applicability of the second channel learning model based on the data transmission performance, and the first communications apparatus does not need to feed back the target channel information.

Therefore, feedback overheads of the first communications apparatus can be reduced, and a processing load of the second communications apparatus can be reduced because no large amount of calculation needs to be performed.

With reference to the fourth aspect, in some implementations of the fourth aspect, the method further includes: the second communications apparatus receives a third message, where the third message is used to indicate a scenario in which the first communications apparatus is located, and the scenario includes at least one of the following: an indoor still scenario, an outdoor still scenario, a low-speed moving scenario, a high-speed moving scenario, a suburban scenario, an urban scenario, a macro base station, a micro base station, a vehicle-mounted scenario, a vehicle-to-another device scenario, and a scenario defined in a 3GPP protocol; and that a second communications apparatus determines whether a second channel learning model is applicable includes: when the scenario changes, the second communications apparatus determines that the second channel learning model is not applicable; or when the scenario does not change, the second communications apparatus determines that the second channel learning model is applicable.

Based on the foregoing technical solution, the second communications apparatus determines applicability of the second channel learning model based on the scenario in which the first communications apparatus is located, and the first communications apparatus does not need to feed back the target channel information. Therefore, feedback overheads of the first communications apparatus can be reduced, and a processing load of the second communications apparatus can be reduced because no large amount of calculation needs to be performed. In addition, it is easier to implement the manner of determining, based on whether the scenario in which the first communications apparatus is located changes, whether the first channel learning model is applicable.

With reference to the fourth aspect, in some implementations of the fourth aspect, that a second communications apparatus determines whether a second channel learning model is applicable includes: the second communications apparatus determines, based on an error between the target channel information and the second channel information, whether the second channel learning model is applicable.

Based on the foregoing technical solution, the second communications apparatus may determine, based on the error between the target channel information and the second channel information, whether the first channel learning model is applicable, in other words, determine, by performing channel learning model training, whether the second channel learning model is applicable. In this manner, the second communications apparatus may determine, without depending on assistance of the first communications apparatus, whether the channel learning model is applicable. Therefore, this manner is simple and convenient. In addition, whether the second channel learning model is applicable is determined in consideration of features of both the target channel information and the second channel information. Therefore, it can be ensured that the first communications apparatus and the second communications apparatus obtain same or similar features of channel information, to help improve data transmission performance when data transmission is subsequently performed by using the channel information.

According to a fifth aspect, a communications apparatus is provided, and includes modules or units configured to perform the method in any one of the first aspect and the possible implementations of the first aspect.

According to a sixth aspect, a communications apparatus is provided, and includes modules or units configured to perform the method in any one of the second aspect and the possible implementations of the second aspect.

According to a seventh aspect, a communications apparatus is provided, and includes a transceiver unit and a processing unit. The processing unit is configured to determine whether a first channel learning model is applicable. The first channel learning model is used to determine first channel information based on target channel information. A data amount of the first channel information is less than a data amount of the target channel information. The transceiver unit is configured to send a first message when it is determined that the first channel learning model is not applicable. The first message is used to indicate a configuration parameter used to update a second channel learning model. The second channel learning model is used to determine second channel information based on the first channel information.

With reference to the seventh aspect, in some implementations of the seventh aspect, the processing unit is specifically configured to determine, based on whether a variation of a long-term statistical characteristic of a channel is greater than a first preset threshold, whether the first channel learning model is applicable.

With reference to the seventh aspect, in some implementations of the seventh aspect, the processing unit is specifically configured to: when the variation of the long-term statistical characteristic of the target channel is greater than or equal to the first preset threshold, determine that the first channel learning model is not applicable; or when the variation of the long-term statistical characteristic of the target channel is less than the first preset threshold, determine that the first channel learning model is applicable.

With reference to the seventh aspect, in some implementations of the seventh aspect, the processing unit is specifically configured to determine, based on data transmission performance, whether the first channel learning model is applicable.

With reference to the seventh aspect, in some implementations of the seventh aspect, the processing unit is specifically configured to: when a scenario changes, determine that the first channel learning model is not applicable; or when a scenario does not change, determine that the first channel learning model is applicable, where the scenario includes at least one of the following: an indoor still scenario, an outdoor still scenario, a low-speed moving scenario, a high-speed moving scenario, a suburban scenario, an urban scenario, a macro base station, a micro base station, a vehicle-mounted scenario, a vehicle-to-another device scenario, and a scenario defined in a 3GPP protocol.

With reference to the seventh aspect, in some implementations of the seventh aspect, the processing unit is specifically configured to: when a performance indicator of the first channel learning model is less than a second preset threshold, determine that the first channel learning model is not applicable, where the performance indicator includes continuity and/or trustworthiness; or when a performance indicator of the first channel learning model is greater than or equal to a second preset threshold, determine that the first channel learning model is applicable.

With reference to the seventh aspect, in some implementations of the seventh aspect, the processing unit is specifically configured to determine, based on an error between the target channel information and the second channel information, whether the first channel learning model is applicable, where the second channel information is determined based on the first channel information and the second channel learning model, and the second channel learning model corresponds to the first channel learning model.

With reference to the seventh aspect, in some implementations of the seventh aspect, the processing unit is specifically configured to determine, based on whether first indication information is received, whether the first channel learning model is applicable, where the first indication information is used to indicate the first communications apparatus to perform channel learning model training.

According to an eighth aspect, a communications apparatus is provided, and includes a transceiver unit and a processing unit. The processing unit is configured to determine whether a second channel learning model is applicable. The second channel learning model is used to determine second channel information based on first channel information. The first channel information is determined based on a first channel learning model and target channel information, and a data amount of the first channel information is less than a data amount of the target channel information. The transceiver unit is configured to send first indication information when it is determined that the second channel learning model is not applicable. The first indication information is used to indicate to perform channel learning model training. The transceiver unit is further configured to receive a first message. The first message is used to indicate one or more configuration parameters used to update the second channel learning model.

With reference to the eighth aspect, in some implementations of the eighth aspect, the processing unit is specifically configured to: when a variation of a long-term statistical characteristic of a target channel is greater than or equal to a third preset threshold, determine that the second channel learning model is not applicable; or when a variation of a long-term statistical characteristic of a target channel is less than a third preset threshold, determine that the second channel learning model is applicable.

With reference to the eighth aspect, in some implementations of the eighth aspect, the processing unit is specifically configured to determine, based on first scheduling information, whether the second channel learning model is applicable.

With reference to the eighth aspect, in some implementations of the eighth aspect, the processing unit is specifically configured to determine, based on data transmission performance, whether the second channel learning model is applicable.

With reference to the eighth aspect, in some implementations of the eighth aspect, the transceiver unit is further configured to receive a third message, where the third message is used to indicate a scenario in which a first communications apparatus is located, and the scenario includes at least one of the following: an indoor still scenario, an outdoor still scenario, a low-speed moving scenario, a high-speed moving scenario, a suburban scenario, and an urban scenario; and the processing unit is specifically configured to: when the scenario changes, determine that the second channel learning model is not applicable; or when the scenario does not change, determine that the second channel learning model is applicable.

With reference to the eighth aspect, in some implementations of the eighth aspect, the processing unit is specifically configured to determine, based on an error between the target channel information and the second channel information, whether the second channel learning model is applicable.

According to a ninth aspect, a communications apparatus is provided, and includes a processor. The processor is coupled to a memory, and may be configured to execute instructions in the memory, to implement the method in any one of the possible implementations of the first aspect and the third aspect. Optionally, the communications apparatus further includes the memory. Optionally, the communications apparatus further includes a communications interface, and the processor is coupled to the communications interface.

In an implementation, the communications apparatus is a first communications apparatus. When the communications apparatus is the first communications apparatus, the communications interface may be a transceiver or an input/output interface.

In another implementation, the communications apparatus is a chip disposed in a first communications apparatus. When the communications apparatus is a chip disposed in the first communications apparatus, the communications interface may be an input/output interface.

Optionally, the transceiver may be a transceiver circuit. Optionally, the input/output interface may be an input/output circuit.

According to a tenth aspect, a communications apparatus is provided, and includes a processor. The processor is coupled to a memory, and may be configured to execute instructions in the memory, to implement the method in any one of the possible implementations of the second aspect and the fourth aspect. Optionally, the communications apparatus further includes the memory. Optionally, the communications apparatus further includes a communications interface, and the processor is coupled to the communications interface.

In an implementation, the communications apparatus is a second communications apparatus. When the communications apparatus is the second communications apparatus, the communications interface may be a transceiver or an input/output interface.

In another implementation, the communications apparatus is a chip disposed in a second communications apparatus. When the communications apparatus is a chip disposed in the second communications apparatus, the communications interface may be an input/output interface.

Optionally, the transceiver may be a transceiver circuit. Optionally, the input/output interface may be an input/output circuit.

According to an eleventh aspect, a processor is provided, and includes an input circuit, an output circuit, and a processing circuit. The processing circuit is configured to: receive a signal by using the input circuit, and transmit the signal by using the output circuit, so that the processor performs the method in any one of the possible implementations of the first aspect to the fourth aspect.

In a specific implementation process, the processor may be one or more chips, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in embodiments of this application.

According to a twelfth aspect, a processing apparatus is provided, and includes a processor and a memory. The processor is configured to: read instructions stored in the memory, receive a signal by using a receiver, and transmit the signal by using a transmitter, to perform the method in any one of the possible implementations of the first aspect to the fourth aspect.

Optionally, there are one or more processors, and there are one or more memories.

Optionally, the memory may be integrated into the processor, or the memory and the processor are separately disposed.

In a specific implementation process, the memory may be a non-transitory memory, for example, a read-only memory (ROM). The memory and the processor may be integrated into a same chip, or may be disposed on different chips. A type of the memory and a manner in which the memory and the processor are disposed are not limited in this embodiment of this application.

It should be understood that, a related data exchange process such as sending of indication information may be a process of outputting the indication information from the processor, and receiving of capability information may be a process of receiving the input capability information by the processor. Specifically, data output by the processor may be output to a transmitter, and input data received by the processor may be from a receiver. The transmitter and the receiver may be collectively referred to as a transceiver.

The processing apparatus in the twelfth aspect may be one or more chips. The processor in the processing apparatus may be implemented by hardware or software. When being implemented by hardware, the processor may be a logic circuit, an integrated circuit, or the like. When being implemented by software, the processor may be a general-purpose processor, and is implemented by reading software code stored in the memory. The memory may be integrated into the processor, or may be located outside the processor and exist independently.

According to a thirteenth aspect, a computer program product is provided. The computer program product includes a computer program (which may also be referred to as code or an instruction). When the computer program is run, a computer is enabled to perform the method in any one of the possible implementations of the first aspect to the fourth aspect.

According to a fourteenth aspect, a computer-readable storage medium is provided. The computer-readable storage medium stores a computer program (which may also be referred to as code or an instruction). When the computer program is run on a computer, the method in any one of the possible implementations of the first aspect to the fourth aspect is performed.

According to a fifteenth aspect, a communications system is provided, and includes the foregoing first communications apparatus and the foregoing second communications apparatus.

DESCRIPTION OF EMBODIMENTS

Figure 1:
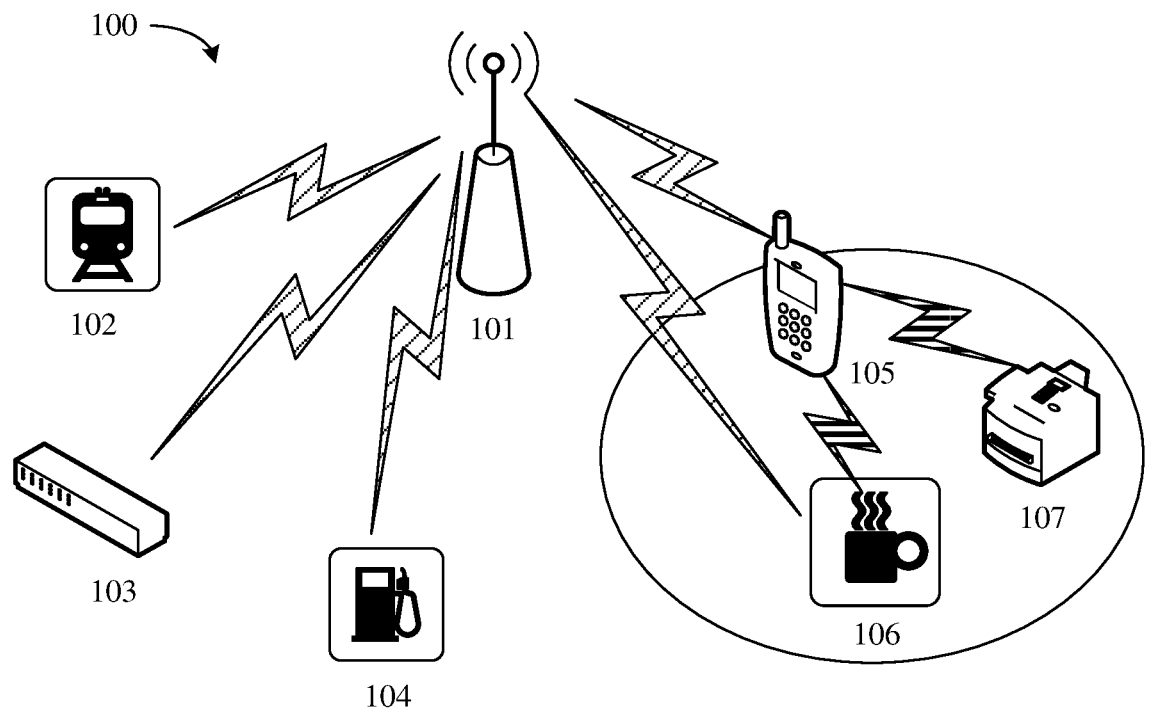
FIG. 1 is a schematic diagram of a communications system applicable to an embodiment of this application.

The following describes technical solutions of this application with reference to the accompanying drawings.

The technical solutions in the embodiments of this application may be applied to various communications systems, for example, a long term evolution (LTE) system, an LTE frequency division duplex (FDD) system, LTE time division duplex (TDD), a universal mobile telecommunication system (UMTS), a worldwide interoperability for microwave access (WiMAX) communications system, a 5th generation (5G) mobile communications system, a new radio access technology (NR), a 6th generation (6G) mobile communications system, or a future evolved communications system. The 5G mobile communications system may include non-standalone (NSA) and/or standalone (SA).

The technical solutions in the embodiments of this application may be further applied to a non-terrestrial network (NTN) system such as a satellite communications system or high altitude platform station (HAPS) communication, and various mobile communications systems integrated with the satellite communications system.

The technical solutions provided in this application may be further applied to machine type communication (MTC), long term evolution-machine type communication (LTE-M), a device-to-device (D2D) network, a machine-to-machine (M2M) network, an internet of things (IoT) network, or another network. The IoT network may include, for example, an internet of vehicles. Communication modes in an internet of vehicles system are collectively referred to as vehicle-to-X (V2X, where X can stand for anything). For example, V2X may include vehicle-to-vehicle (V2V) communication, vehicle-to-infrastructure (V2I) communication, vehicle-to-pedestrian (V2P) communication, or vehicle-to-network (V2N) communication.

In the embodiments of this application, a network device may be any device with a wireless transceiver function. The device includes but is not limited to an evolved NodeB (eNB), a radio network controller (RNC), a NodeB (NB), a base station controller (BSC), a base transceiver station (BTS), a home base station (for example, a home evolved NodeB or a home Node B, HNB), a baseband unit (BBU), an access point (AP) in a wireless fidelity (WiFi) system, a wireless relay node, a wireless backhaul node, a transmission point (TP), a transmission and reception point (TRP), a gNB or a transmission point (TRP or TP) in a 5G system such as an NR system, one antenna panel or one group of antenna panels (including a plurality of antenna panels) of a base station in a 5G system, a network node that forms a gNB or a transmission point, for example, a baseband unit (BBU) or a distributed unit (DU), or a base station in a future communications system.

In some deployment, the gNB may include a centralized unit (CU) and the DU. The gNB may further include an active antenna unit (AAU). The CU implements some functions of the gNB, and the DU implements some functions of the gNB. For example, the CU is responsible for processing a non-real-time protocol and service and implementing functions of a radio resource control (RRC) layer and a packet data convergence protocol (PDCP) layer. The DU is responsible for processing a physical layer protocol and a real-time service and implementing functions of a radio link control (RLC) layer, a medium access control (MAC) layer, and a physical (PHY) layer. The AAU implements some physical layer processing functions, radio frequency processing, and a function related to an active antenna. Information at the RRC layer eventually becomes information at the PHY layer, or is converted from the information at the PHY layer. Therefore, in the architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (RAN), or the CU may be classified into a network device in a core network (CN). This is not limited in this application.

The network device provides a service for a cell, and a terminal device communicates with the cell by using a transmission resource (for example, a frequency domain resource or a spectrum resource) allocated by the network device. The cell may belong to a macro base station (for example, a macro eNB or a macro gNB), or may belong to a base station corresponding to a small cell. The small cell herein may include a metro cell, a micro cell, a pico cell, a femto cell, or the like. These small cells are characterized by a small coverage area and low transmit power, and are suitable for providing a high-rate data transmission service.

The terminal device in embodiments of this application may alternatively be referred to as user equipment (UE), an access terminal, a subscriber unit, a subscriber station, a mobile station, a mobile console, a remote station, a remote terminal, a mobile device, a user terminal, a terminal, a wireless communications device, a user agent, a user apparatus, or the like.

The terminal device may be a device that provides voice/data connectivity for a user, for example, a handheld device or a vehicle-mounted device with a wireless connection function. Currently, some examples of the terminal may be a mobile phone, an unmanned aerial vehicle, a tablet computer (pad), a computer (for example, a laptop or a palmtop computer) with a wireless transceiver function, a mobile internet device (MID), a virtual reality (VR) device, an augmented reality (AR) device, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, a cellular telephone, a cordless telephone, a session initiation protocol (SIP) telephone, a wireless local loop (WLL) station, a personal digital assistant (PDA), a handheld device with a wireless communication function, a computing device, another processing device connected to a wireless modem, a vehicle-mounted device, a wearable device, a terminal device in a 5G network, or a terminal device in a future evolved public land mobile network (PLMN).

The wearable device may alternatively be referred to as a wearable intelligent device, and is a general term for wearable devices, such as glasses, gloves, watches, clothes, and shoes, that are developed by applying wearable technologies to intelligent designs of daily wear. The wearable device is a portable device that is directly worn on a body or integrated into clothes or an accessory of a user. The wearable device is not merely a hardware device, but is used to implement a powerful function through software support, data interaction, and cloud interaction. In a board sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, the terminal device may be a terminal device in an internet of things (IoT) system. IoT is an important part of future information technology development. A main technical feature of IoT is to connect things to a network by using a communications technology, to implement an intelligent network in which man and a machine are connected and things are connected. In an IoT technology, massive connections, deep coverage, and power saving of a terminal may be implemented by using, for example, a narrowband (NB) technology.

In addition, the terminal device may further include sensors such as an intelligent printer, a train detector, and a gas station. Main functions include collecting data (some terminal devices), receiving control information and downlink data of a network device, sending an electromagnetic wave, and transmitting uplink data to the network device.

For ease of understanding the embodiments of this application, a communications system applicable to a method provided in the embodiments of this application is first described in detail with reference to FIG. 1. FIG. 1 is a schematic diagram of a communications system 100 applicable to the method provided in the embodiments of this application. As shown in the figure, the communications system 100 may include at least one network device, for example, a network device 101 in a 5G system shown in FIG. 1. The communications system 100 may further include at least one terminal device, for example, terminal devices 102 to 107 shown in FIG. 1. The terminal devices 102 to 107 may be mobile or fixed. The network device 101 may communicate with one or more of the terminal devices 102 to 107 through a radio link. Each network device may provide communication coverage for a specific geographical area, and may communicate with a terminal device located in the coverage area. For example, the network device may send configuration information to the terminal device, and the terminal device may send uplink data to the network device based on the configuration information. For another example, the network device may send downlink data to the terminal device. Therefore, the network device 101 and the terminal devices 102 to 107 in FIG. 1 form a communications system.

Optionally, the terminal devices may directly communicate with each other, for example, perform sidelink communication. For example, the terminal devices may directly communicate with each other by using a D2D or V2X technology. As shown in the figure, terminal devices 105 and 106 and terminal devices 105 and 107 may directly communicate with each other by using the D2D or V2X technology. The terminal device 106 and the terminal device 107 may independently or simultaneously communicate with the terminal device 105.

Each of the terminal devices 105 to 107 may further communicate with the network device 101, for example, may directly communicate with the network device 101. For example, the terminal devices 105 and 106 in the figure may directly communicate with the network device 101. Alternatively, each of the terminal devices 105 to 107 may indirectly communicate with the network device 101. For example, the terminal device 107 in the figure communicates with the network device 101 by using the terminal device 106.

It should be understood that FIG. 1 shows an example in which there is one network device, a plurality of terminal devices, and a communications link between communications devices. Optionally, the communications system 100 may include a plurality of network devices, and a coverage area of each network device may include another quantity of terminal devices, for example, more or fewer terminal devices. Optionally, the communications system 100 may include a plurality of network devices, and the plurality of network devices may perform coordinated multipoint transmission. For example, the plurality of network devices may collaborate or cooperate to communicate with one terminal device. This is not limited in this application.

A plurality of antennas may be configured for each of the communications devices such as the network device 101 and the terminal devices 102 to 107 in FIG. 1. The plurality of antennas may include at least one transmit antenna configured to send a signal and at least one receive antenna configured to receive a signal. The transmit antenna and the receive antenna may be the same or different. For example, when the transmit antenna and the receive antenna are the same, the antenna can be used for transmission and receiving. When the transmit antenna and the receive antenna are different, the transmit antenna and the receive antenna are different antennas. In addition, each communications device further includes a transmitter chain and a receiver chain. A person of ordinary skill in the art may understand that each communications device may include a plurality of components (for example, a processor, a modulator, a multiplexer, a demodulator, a demultiplexer, or an antenna) related to signal sending and receiving. Therefore, the network device and the terminal device may communicate with each other by using a multi-antenna technology.

Optionally, the wireless communications system 100 may further include other network entities such as a network controller and a mobility management entity. This is not limited in the embodiments of this application.

In a wireless communications system, a MIMO technology is usually used to increase a system capacity, that is, a plurality of antennas are used at each of a transmit end and a receive end. Theoretically, the plurality of antennas are used with reference to spatial multiplexing, and therefore the system capacity can be exponentially increased. However, a problem of interference enhancement is caused due to use of the plurality of antennas. Therefore, specific processing needs to be performed on a signal to suppress impact of interference. This method for suppressing interference by performing signal processing may be implemented at the receive end or the transmit end. When this method is implemented at the transmit end, a to-be-sent signal may be preprocessed, and then sent through a MIMO channel. This sending manner is precoding.

To identify a useful channel in a MIMO channel matrix H, a plurality of channels need to be converted into one-to-one modes similar to single-input single-output (SISO) systems, so that a transmit signal S1 corresponds to a received signal R1, a transmit signal S2 corresponds to a received signal R2, and so on. In other words, a plurality of MIMO cross channels are converted into a plurality of one-to-one channels parallel to each other. This process may be implemented by performing singular value decomposition (SVD) on H, in other words, $H=U\Sigma V^{T}$, where U and V are orthogonal matrices, and $\Sigma$ is a diagonal matrix. Non-zero elements (namely, elements on a diagonal line) of the diagonal matrix are singular values of the channel matrix H. Usually, these singular values may be arranged in descending order. The superscript "T" represents a transposition operation. For example, $r=H*s$ n may be written as $r=U\Sigma V^{T}*s+n$, where r is a received signal, s is a transmit signal, and n is channel noise. When to-be-sent data is x, it may be set that $s=Vx$. At the receive end, the received signal is decoded by using $\Sigma^{-1}U^{T}$, to obtain a plurality of one-to-one channels without interference. At the transmit end, $s=Vx$ is a precoding operation, and V is a precoding matrix.

It may be learned from the foregoing description that to obtain a precoding matrix that matches a MIMO channel, the MIMO channel needs to be known. Therefore, the MIMO channel needs to be estimated.

Currently, in a TDD system, there is reciprocity between uplink and downlink channels, and therefore a network device may obtain downlink channel information based on uplink channel information obtained through measurement, and then calculate a precoding matrix and perform downlink transmission. In an FDD system, a network device calculates a precoding matrix and performs downlink transmission based on channel state information fed back by a terminal device.

To reduce feedback overheads, an AI-based information transmission method is currently provided. A terminal device and a network device obtain a first channel learning model and a second channel learning model through joint training. The first channel learning model is set on a side of the terminal device, and the second channel learning model is set on a side of the network device. A communications system that includes the first channel learning model and the second channel learning model is referred to as an AI-based communications system. Specifically, the AI-based information transmission method includes: the terminal device obtains information to be fed back; the terminal device processes, by using at least the first channel learning model, the information to be fed back, to obtain information that needs to be fed back through an air interface; the terminal device feeds back, to the network device through a feedback link, the information that needs to be fed back through the air interface; the network device receives the information fed back by the terminal device; and the network device processes, by using at least the second channel learning model, the information that is fed back, to obtain the information to be fed back by the side of the terminal device. However, in this AI-based information transmission manner, the first channel learning model and the second channel learning model obtained through offline training are directly applied to an online information transmission process, and if a location of the terminal device changes or a communication environment in which the terminal device is located changes, the first channel learning model and the second channel learning model may not be applicable. Consequently, in this AI-based information transmission manner, performance of performing information transmission based on the first channel learning model and the second channel learning model is affected.

In view of this, the embodiments of this application provide a communication method, to determine applicability of a currently used channel learning model.

For ease of understanding the embodiments of this application, the channel learning model is first described below.

Channel Learning Model:

The channel learning model in the embodiments of this application may be a model or an algorithm used to obtain a channel, a model or an algorithm used to determine channel information, a model or an algorithm related to a channel, a model or an algorithm applied to a communications system, or the like. This is not limited in the embodiments of this application.

For example, the channel learning model may be a machine learning algorithm, for example, may be one or more of the following machine learning algorithms: a decision tree algorithm, a naive Bayesian algorithm, a support vector machine algorithm, a random forest algorithm, an artificial neural network algorithm, a boosting and bagging algorithm, an expectation maximum (EM) algorithm, and deep learning. For definitions and implementation of the algorithms, refer to the conventional technology.

For another example, the channel learning model may be a neural network (NN) model, for example, may be at least one of the following neural networks: a convolutional neural network, a fully connected neural network, a deep neural network, a feedforward neural network, a feedback neural network, a radial basis function neural network, a Hopfield network, a Markov chain, a Boltzmann machine, a restricted Boltzmann machine, an auto-encoder, a sparse auto-encoder, a variational auto-encoder, a denoising auto-encoder, a deep belief network, a deconvolutional network, a deep convolutional inverse graphics network, a generative adversarial network, a recurrent neural network, a long-short term memory, a neural Turing machine, a deep residual network, an echo state network, an extreme learning machine, and a support vector machine.

For another example, the channel learning model may alternatively be a principal component analysis algorithm, a matrix eigenvalue decomposition algorithm, a matrix eigenvector decomposition algorithm, or a matrix singular value decomposition algorithm.

For another example, the channel learning model may be an auto-encoder (AE) model. For example, the channel learning model may be a model or an algorithm for implementing channel dimension reduction and/or channel restoration (or channel reconstruction).

The channel learning model is further described below by using an example in which the channel learning model is a neural network model.

Figure 2:
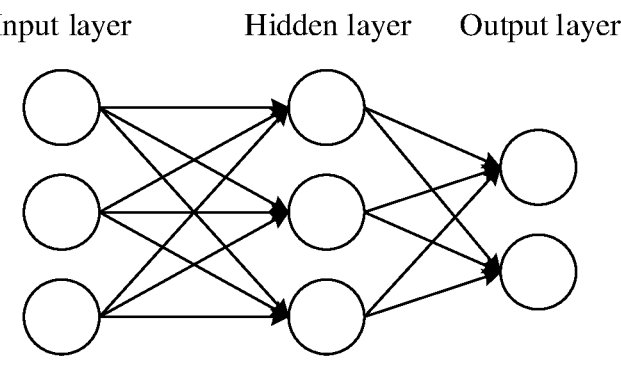
FIG. 2 is a schematic diagram of a structure of a neural network.

Neural Network Model:

When the channel learning model is a neural network model, a neural network mainly includes an input layer, a hidden layer, and an output layer. FIG. 2 shows a most basic neural network. When there is only one hidden layer, the network may be referred to as a two-layer neural network. No transformation is performed at the input layer, and therefore the input layer may not be considered as a separate layer. Actually, each neuron at the input layer in the network represents one feature, and a quantity of dimensions of the input layer may also be referred to as a quantity of input dimensions. A quantity of output layers may represent a quantity of classification labels, and a quantity of dimensions of the output layer may also be referred to as a quantity of output dimensions. A quantity of hidden layers and a quantity of neurons at the hidden layer may be set to positive integers.

Figure 3:
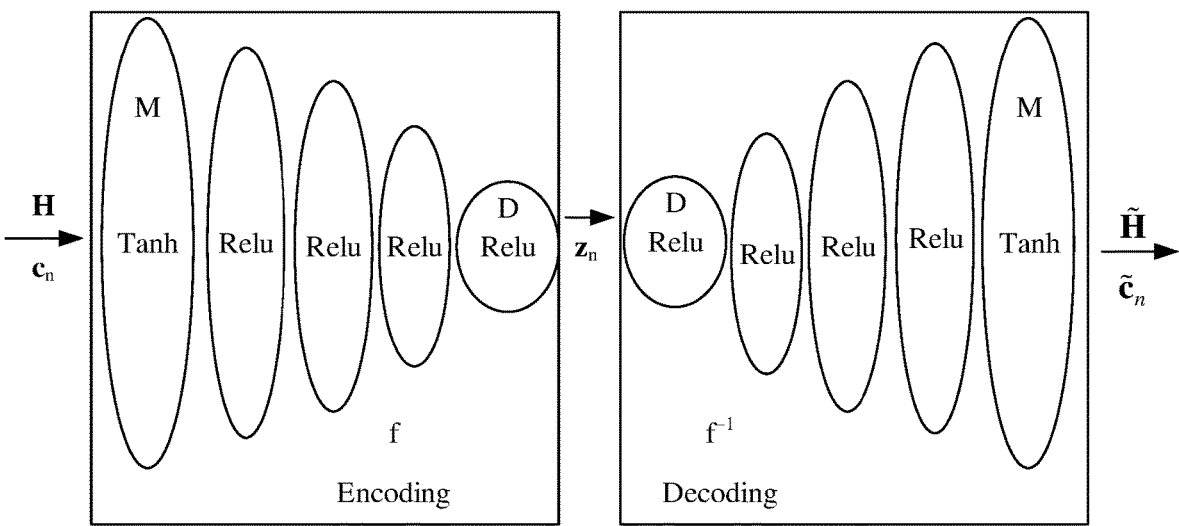
FIG. 3 is a schematic diagram of a structure of a symmetric neural network.

FIG. 3 shows a symmetric neural network. The neural network may also be referred to as an auto-encoder. In the neural network, there is encoding (from M dimensions to D dimensions), namely, f that represents conversion from $c_n$ (high-dimensional data) to $z_n$ (low-dimensional data), and decoding (from D dimensions to M dimensions), namely, $f^{-1}$ that represents conversion from $z_n$ (low-dimensional data) to $\tilde{c}_n$ (high-dimensional data), where M may be greater than D.

In a process of training the neural network, the neural network may be trained by using a mean approximation error as a loss function. There may be many specific training algorithms, for example, a backpropagation algorithm and a gradient descent algorithm. This is not limited in this application. A mean training error may be expressed as follows:

$$E = \frac{1}{N} \sum_{n=1}^{N} \left\| c_n - f^{-1}(f(c_n)) \right\|_2^2 \tag{1}$$

As shown in FIG. 3, $c_n$ is an M-dimensional channel vector, and $z_n$ is a D-dimensional channel vector. A quantity of output dimensions of encoding is less than a quantity of input dimensions of encoding. Therefore, an idea of dimension reduction can be implemented, and it is expected that $z_n = f(c_n)$ may represent a main key feature of the input $c_n$. That is, on a side of a terminal device, dimension reduction is performed on high-dimensional channel information by using an encoding equation f of the neural network, and then the channel information is fed back to a network device. Correspondingly, the network device may restore low-dimensional data into high-dimensional data by using a decoding equation $f^{-1}$ of the neural network. For example, a channel matrix may be an A*B*S-dimensional complex number, where A is a quantity of antenna ports of the network device, B is a quantity of antenna ports of the terminal device, and S is a quantity of subcarriers. In this case, M may be A*B*S (a real part and an imaginary part are independently input or input as a complex number) or A*B*S*2 (a real part and an imaginary part are jointly input). If A is 64, B is 1, and S is 1, M is 64 or 128. A value of D may be a positive integer, for example, 2, 4, 5, 6, 8, 16, or 32. The neural network shown in FIG. 3 is a four-layer neural network structure, and quantities of neurons at all layers may be gradually decreased. For example, if M is 64 and D is 4, 64-dimensional high-dimensional channel information may be reduced into four-dimensional channel information.

Optionally, the encoding equation and the decoding equation may be symmetric or asymmetric, in other words, a same structure or different structures may be used for the encoding equation and the decoding equation.

Specifically, a value (activation value) of a neuron at each hidden layer/a neuron at each output layer is obtained based on a neuron at a previous layer by performing an operation (for example, weighted summation or weighted summation plus bias) and nonlinear transformation. A nonlinear transformation function (which is also referred to as an activation function) may be a Sigmoid function, a hyperbolic tangent (Tanh) function, a rectified linear unit (ReLU) function, or the like. The Sigmoid function, the Tanh function, and the ReLU function may include variants of a same type of function. For example, in FIG. 3, the activation function is an Ranh function and an ReLU function.

(1) The Sigmoid function is a common S-shaped function in biology, and is also referred to as an S-shaped growth curve. In information science, the Sigmoid function is usually used as a threshold function of the neural network because a monotonically increasing property of the Sigmoid function, a monotonically increasing property of an inverse function, and the like. A variable is mapped between 0 and 1. The Sigmoid function may be expressed by using the following formula:

$$f(x) = \frac{1}{1 + e^{-x}} \tag{2}$$

(2) The Tanh function is one of hyperbolic functions. In mathematics, the Tanh function is derived from a basic hyperbolic function, a hyperbolic sine function, and a hyperbolic cosine function. The Tanh function may be expressed by using the following formula:

$$f(x) = \frac{e^x - e^{-x}}{e^x + e^{-x}} \tag{3}$$

(3) The ReLU function is used to calculate an output of the neuron at the hidden layer. The ReLU function may be expressed by using the following formula:

$$f(x) = \max(0, x) \tag{4}$$

A variant of the ReLU activation function may be a leaky rectified linear unit (leakly Relu, LRelu) function, a random leaky rectified linear unit (random leakly Relu, RRelu) function, a parametric rectified linear unit (parameter Relu, PRelu) function, or the like.

The LReLU function may be expressed by using the following formula:

$$f(x) = \begin{cases} x & x > 0 \\ \lambda x & x \le 0 \end{cases}, \tag{5}$$

where
the constant is $\lambda \in (0,1)$

The PReLU function may be expressed by using the following formula:

$$f(x) = \begin{cases} x & x > 0 \\ \lambda x & x \le 0 \end{cases}, \tag{6}$$

where
$\lambda$ is a variable that can be learned of by using a back-propagation algorithm.

The RReLU function may be expressed by using the following formula:

$$f(x) = \begin{cases} x & x > 0 \\ \lambda x & x \le 0 \end{cases}, \tag{7}$$

where
$\lambda \square U(l,u)$, and 1, $u \in (0,1)$, which are randomly determined.

It is assumed that in an N-layer neural network, transformation is performed for N times from an input layer to a hidden layer and from the hidden layer to an output layer, and each time transformation is performed, there may be weighted summation plus bias and a nonlinear transformation operation. For example, there is an operation in which X is to be transformed into H. In this case, a transformation process may be expressed as H=g(X*W+b), where W is a weight matrix or a weight vector, and is briefly referred to as a weight, b is a bias vector or a bias matrix, and is briefly referred to as a bias, and g( ) is an activation function. If X is a 1*x matrix, and a quantity of neurons at the hidden layer is h, W may be an x*h-dimensional matrix, and b may be a 1*h-dimensional matrix.

Figure 4:
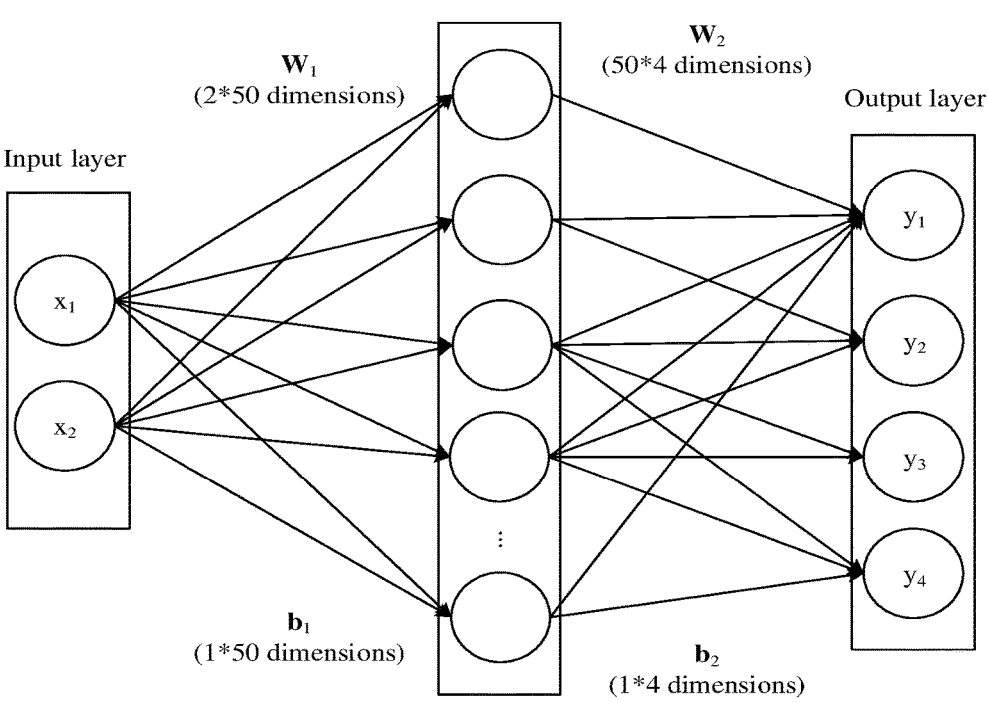
FIG. 4 is a schematic diagram of performing an operation in a neural network.

As shown in FIG. 4, a quantity of neurons at the input layer shown in the figure is 2, and the input data $X=(x_1, x_2)$ is a 1*2-dimensional matrix; the quantity of neurons at the hidden layer is 50, and the data $H=(h_1, h_2, \ldots, h_{50})$ output from the hidden layer is a 1*50-dimensional matrix; and a quantity of neurons at the output layer is 4, and data $Y=(y_1, y_2, y_3, y_4)$ output from the output layer is a 1*4-dimensional matrix.

A transformation process from the input layer to the hidden layer may be expressed as $H=g_1(X*W_1+b_1)$, that is, $$h_1 = g_1(x_1 * w_{1,1,1} + x_2 * w_{1,1,2} + b_{1,1}),$$

$$h_2 = g_1(x_1 * w_{1,2,1} + x_2 * w_{1,2,2} + b_{1,2}),$$

$$\ldots$$

$$h_{50} = g_1(x_1 * w_{1,50,1} + x_2 * w_{1,50,2} + b_{1,50}).$$

Herein, $$W_1 = \begin{bmatrix} w_{1,1,1} w_{1,2,1} \ldots w_{1,50,1} \\ w_{1,1,2} w_{1,2,2} \ldots w_{1,50,2} \end{bmatrix},$$

$b_1=[b_{1,1} \ b_{1,2} \ \ldots \ b_{1,50}]$, and the function $g_1$ may be an activation function, for example, may be a Sigmoid function, a Tanh function, or an ReLU function.

Further, a transformation process from the hidden layer to the output layer may be expressed as $Y=g_2(H*W_2+b_2)$, that is, $$y_1=g_2(h_1*w_{2,1,1}+h_2*w_{2,1,2}+ \ldots +h_{50}*w_{2,1,50}+b_{2,1}),$$

$$y_2=g_2(h_1*w_{2,2,1}+h_2*w_{2,2,2}+ \ldots +h_{50}*w_{2,2,50}+b_{2,2}),$$

$$y_3=g_2(h_1*w_{2,3,1}+h_2*w_{2,3,2}+ \ldots +h_{50}*w_{2,3,50}+b_{2,3}),$$
and $$y_4=g_2(h_1*w_{2,4,1}+h_2*w_{2,4,2}+ \ldots +h_{50}*w_{2,4,50}+b_{2,4}).$$

Herein, $$W_2 = \begin{bmatrix} w_{2,1,1} w_{2,2,1} w_{2,3,1} w_{2,4,1} \\ w_{2,1,2} w_{2,2,2} w_{2,3,2} w_{2,4,2} \\ \ldots \\ w_{2,1,50} w_{2,2,50} w_{2,3,50} w_{2,4,50} \end{bmatrix},$$

$b_2=[b_{2,1} \ b_{2,2} \ b_{2,3} \ b_{2,4}]$, and the function $g_2$ may be an activation function, for example, may be a Sigmoid function, a Tanh function, or an ReLU function.

A configuration parameter of the channel learning model in this step may be one or more of a transformation algorithm, a weight vector, a weight matrix, a bias vector, a bias matrix, an activation function, a quantity of dimensions of an input layer, a quantity of dimensions of an output layer, a quantity of hidden layers, a quantity of neurons at the hidden layer, and the like.

The channel learning model is further described below by using an example in which the channel learning model is a convolutional neural network model.

Convolutional Neural Network Model:

There are three basic concepts in a convolutional neural network: a local receptive field, a shared weight, and pooling. The neural network is first applied to an image. Therefore, an image is used as an example below. Correspondingly, application of the neural network to channel learning is similar to this, except that an input signal is changed from an image to channel data.

(1) Local receptive field: in a common deep neural network, each pixel in an image is usually connected to each neuron at a fully connected layer, while in the convolutional neural network, each neuron at a hidden layer is connected only to a specific local region of an image, to reduce a quantity of training parameters. For example, for a 1024×720 image, if a 9×9 receptive field is used, only 81 weight parameters are required. There is a same case for general vision. During viewing of an image, attention is paid to a local part in most cases.

(2) Shared weight: at a convolutional layer in the convolutional neural network, all neurons correspond to a same weight, in other words, it may be considered that each neuron pays attention to only one feature. The neuron may be a filter, for example, may be a Sobel filter specifically configured to perform edge detection. Therefore, it may be considered that each filter at the convolutional layer has a data feature to which the filter pays attention, for example, a mean, a variance, an amplitude, a phase, a vertical edge, a horizontal edge, a color, or texture. All the neurons at the convolutional layer may be considered as a feature extractor set of entire data after being collected together. Therefore, convolution is to calculate an inner product of a set of fixed weights and data in different receptive fields.

Advantages of weight sharing are as follows: a repeating unit can identify a feature without considering a location of the feature in a visual field. In addition, weight sharing makes feature extraction more efficient because a quantity of free variables to be learned of is greatly reduced. By controlling a scale of the model, the convolutional network may have a good generalization capability for a channel problem.

(3) Pooling: There is usually a relatively large to-be-processed image, and in an actual process, there is no need to analyze the original image, and it is most important to effectively obtain a feature of the image. Therefore, an idea similar to image compression may be used. After convolution is performed on an image, a downsampling process is performed to adjust a size of the image.

The convolutional neural network may include an input layer, a convolutional layer, a rectified linear unit ReLU layer, a pooling layer, and a fully connected layer (FC layer).

(1) Input layer: processing to be performed at this layer is mainly preprocessing of original data. The preprocessing may include one or more of the following:

Mean subtraction: all dimensions of input data are zero-centered, to pull a center of a sample back to an origin of a coordinate system.

Normalization: amplitudes of input data are normalized to a same range, to reduce interference caused due to a difference between value ranges of various dimensions of data. For example, it is assumed that the input data includes two dimensions of features (for example, a feature $A_1$ and a feature $B_1$), data of the feature $A_1$ ranges from 0 to 10, and data of the feature $B_1$ ranges from 0 to 10000. There is a problem if the data of the two features is directly used, and it is better to normalize amplitudes of the data of the two features, that is, the data of the feature $A_1$ and the data of the feature $B_1$ may be changed to a range from 0 to 1.

Principal component analysis (PCA) and whitening: PCA is used to reduce a dimension of input data. Whitening is used to normalize amplitudes of the input data on feature axes.

A configuration parameter in this step may be one or more of a preprocessing operation algorithm, a quantity of dimensions of the input data, a value range of the input data, and the like.

(2) Convolutional layer: this layer is a most important layer in the convolutional neural network, and is a name source of the convolutional neural network.

There are two key operations at the convolutional layer: (1) local correlation in which each neuron at the convolution layer is considered as a filter; and (2) receptive field sliding in which local data is calculated by using the filter.

Nouns at the convolutional layer:

(1) Depth: a depth, namely, a quantity of filters or a quantity of neurons connected to a same region, of an output unit may be controlled. The depth is also referred to as a depth column.

(2) Stride: the stride is also referred to as a stride, and is a length for the receptive field sliding. The stride may be used to control a distance between input regions connected to two adjacent hidden units of a same depth. If there is a very small stride (for example, the stride is equal to 1), there is a very large overlapping part between the input regions connected to the two adjacent hidden units. If there is a very large stride, there is a smaller overlapping part between the input regions connected to the two adjacent hidden units.

(3) Zero-padding: this means to add a zero around an input unit to change an overall size of the input unit, so as to control a space size of an output unit.

The following symbols are defined:

$W_1$: Size (width or height) of the input unit; F: Receptive field; $S_1$: Stride; P: Quantity of zeros added; and K: Depth, namely, depth of the output unit. A quantity of output hidden units may be calculated by using the following formula:

$$K = \frac{W_1 - F + 2P}{S_1} + 1 \tag{8}$$

If a calculation result is not an integer, it indicates that an existing parameter is not exactly suitable for an input. For example, the stride may be inappropriately set. In this case, a zero may be added or a step may be reset.

Description is provided below by using one-dimensional convolution as an example.

Figure 5:
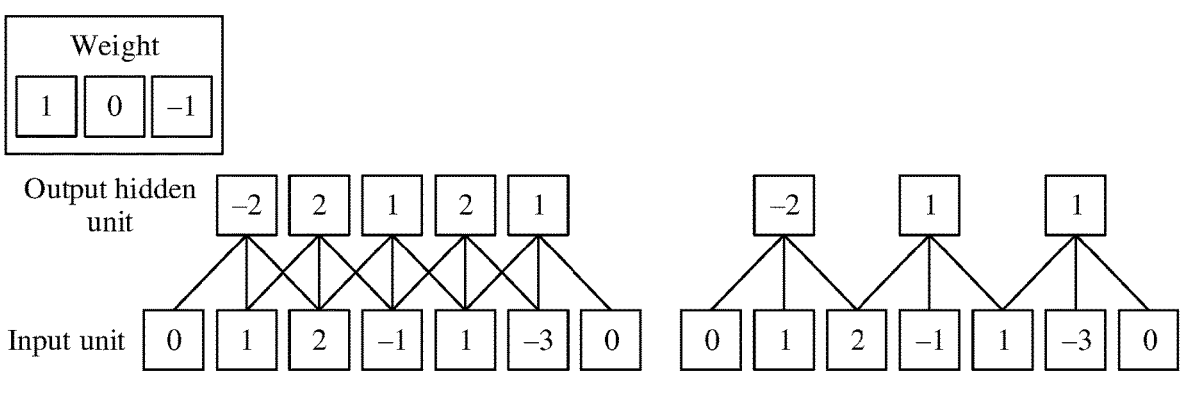
FIG. 5 is a schematic diagram of performing an operation in a one-dimensional convolutional neural network.

FIG. 5 shows an example of one-dimensional convolution. As shown in FIG. 5, in a left model, there are five input units, in other words, $W_1=5$; one zero is added to each of a left boundary and a right boundary of the input units, in other words, $P=1$; the stride is 1, in other words, $S_1=1$; and each output hidden unit is connected to three input units, and therefore the receptive field is a three-dimensional matrix, in other words, $F=3$. Based on the formula (8), it may be calculated that the quantity of output hidden units is $K=(5-3+2)/1+1=5$, which is consistent with the figure. In comparison with the left model, in a right model, the stride is changed to $S_1=2$, and the other parts remain unchanged. Based on the formula (8), it may be calculated that the quantity of output hidden units is $K=(5-3+2)/2+1=3$, which is consistent with the figure. If the stride is changed to $S_1=3$, the formula is not divisible, which indicates that the stride 3 cannot exactly match the size of the input unit.

There is a weight parameter in convolution, and the weight parameter may be an F-dimensional vector or matrix. A value of an element in the weight vector or the weight matrix may be an integer, a real number, a complex number, or the like. For example, a weight parameter shown in FIG. 5 is a three-dimensional vector: $[1\ 0\ -1]$. A method for calculating data output by the hidden unit may be the same as the foregoing method for calculating data output by the common neural network. For example, in the left model in FIG. 5, data output by a first hidden unit is $0*1+1*0+2*(-1)=-2$; data output by a second hidden unit is $2*1+(-1)*0+1*(-1)=1$; and data output by a third hidden unit is $1*1+(-3)*0+0*(-1)=1$.

Description is provided below by using two-dimensional convolution as an example.

In two-dimensional convolution, $W_1$ may be a $w_1*w_2$ matrix, F may be an $f_1*f_2$ matrix, $S_1$ may be an $s_1*s_2$ matrix, P may be a $p_1*p_2$ matrix, and K may be a $k_1*k_2$ matrix, where each of $w_1$, $f_1$, $s_1$, $p_1$, and $k_1$ represents a quantity of rows in the matrix, and each of $w_2$, $f_2$, $s_2$, $p_2$, and $k_2$ represents a quantity of columns in the matrix. A size of the output hidden unit may be calculated by using the following formula:

$$k_1 = \frac{w_1 - f_2 + 2p_1}{s_1} + 1, k_2 = \frac{w_2 - f_2 + 2p_2}{s_2} + 1 \qquad (9)$$

Figure 6:
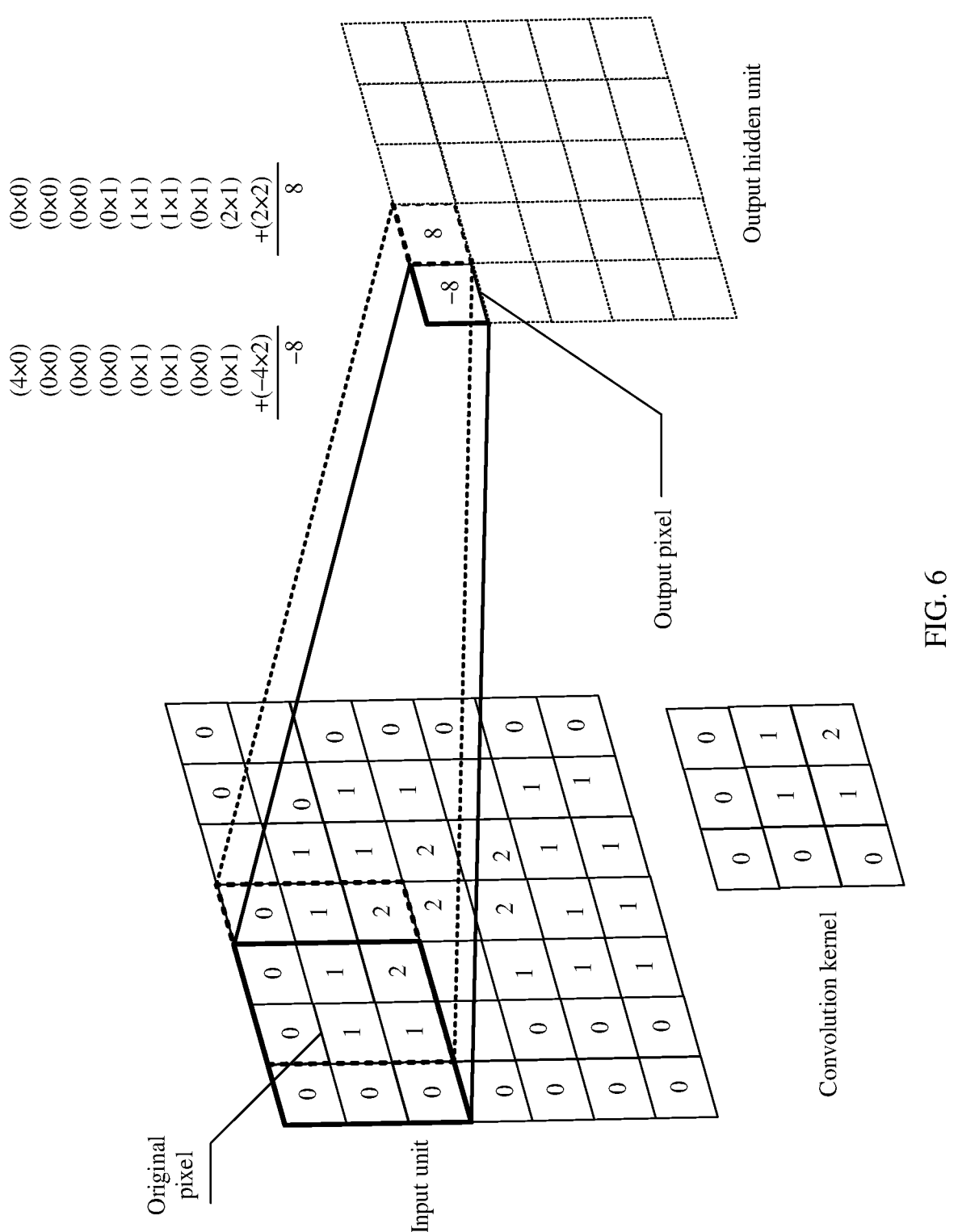
FIG. 6 is a schematic diagram of performing an operation in a two-dimensional convolutional neural network.

FIG. 6 shows an example of two-dimensional convolution. As shown in FIG. 6, the input unit is of 5*7 dimensions, in other words, $W_1$ is a 5*7 matrix, $w_1=5$, and $w_2=7$; one column is added to each of a left boundary and a right boundary of the input unit, in other words, P is a 1*0 matrix, $p_1=1$, and $p_2=0$; the stride $S_1$ is a 1*1 matrix, in other words, $s_1=1$, and $s_2=1$; and each output hidden unit is connected to nine input units, and therefore the receptive field F is a 3*3 matrix, in other words, $f_1=3$, and $f_2=3$. Based on the formula (9), it may be calculated that a quantity of output hidden units is as follows: $k_1=(5-3+2*1)/1+1=5$, and $k_2=(7-3+2*0)/1+1=5$. Therefore, as shown in FIG. 6, the output hidden unit is of 5*5 dimensions, in other words, K is a 5*5 matrix.

There is a weight parameter in convolution, and the weight parameter may be an F-dimensional vector or matrix. A value of an element in the weight vector or the weight matrix may be an integer, a real number, a complex number, or the like. For example, a weight parameter shown in FIG. 6 is a 3*3-dimensional matrix:

$$\begin{bmatrix} 4 & 0 & 0 \\ 0 & 0 & 0 \\ 0 & 0 & -4 \end{bmatrix}.$$

A method for calculating data output by the hidden unit may be the same as the foregoing method for calculating data output by the common neural network. For example, in FIG. 6, data output by a first hidden unit in the first row is $-8$; and data output by a second hidden unit in the second row is 8.

A configuration parameter in this step may be one or more of the size (width or height) of the input unit, the receptive field, the stride, the quantity of zeros added, the depth, the depth of the output unit, the weight matrix, and the like.

(3) Rectified linear unit layer: nonlinear mapping is performed on a result output from the convolutional layer.

Figure 7:
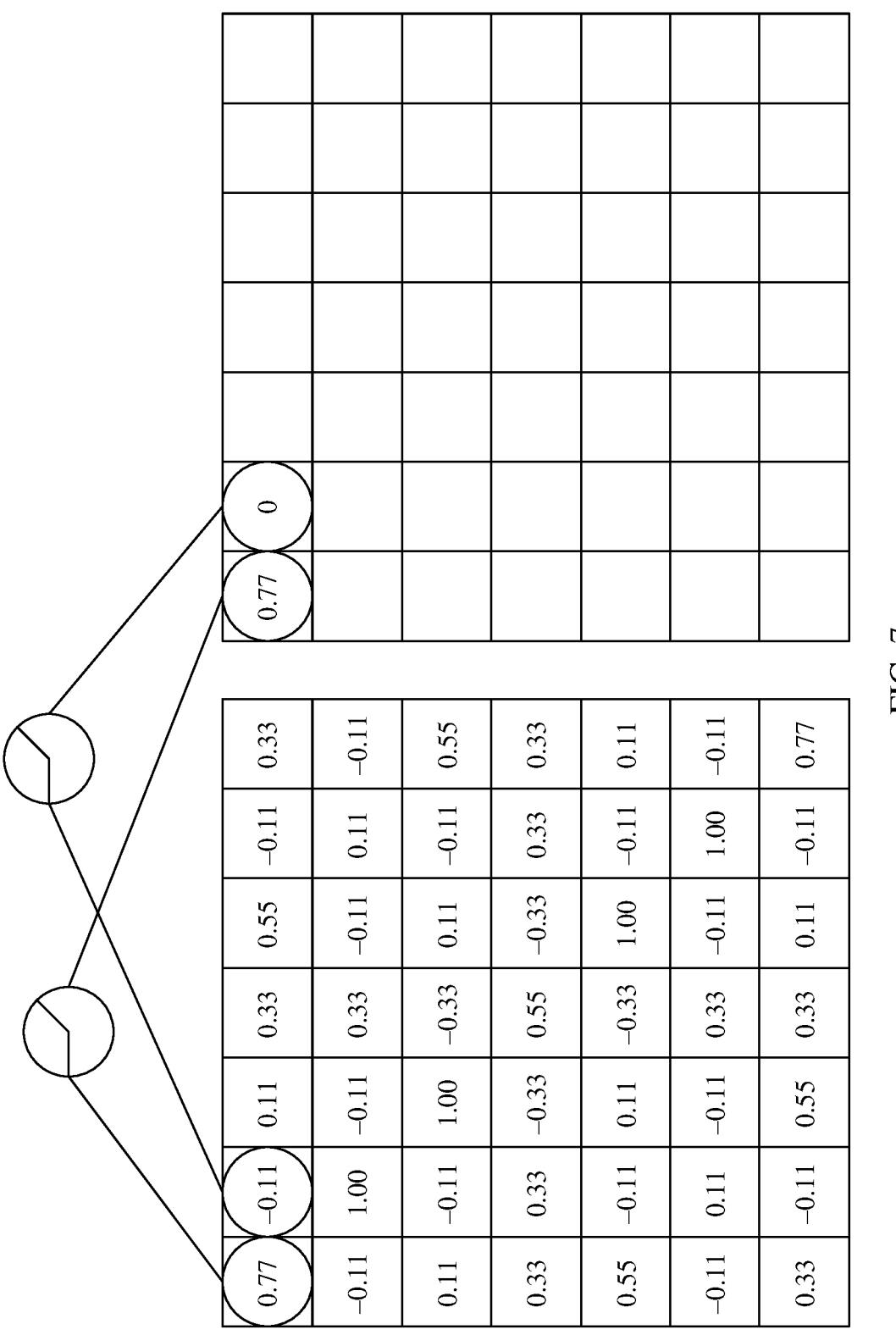
FIG. 7 is a schematic diagram of performing an operation at a rectified linear unit layer in a convolutional neural network.

Usually, an activation function used in the convolutional neural network may be an ReLU function. The ReLU function is characterized by a high convergence speed and easiness of calculating a gradient. There is also a simple calculation formula (formula (4)). That is, if a negative value is input, 0 is output; or if a positive value is input, the positive value is output. As shown in FIG. 7, if a first input value in the first row is 0.77, max(0, 0.77) is used to obtain an output value 0.77; if a second value in the second row is $-0.11$, max(0, $-0.11$) is used to obtain an output value 0; and by analogy, all output results are obtained.

A configuration parameter in this step may be an activation function algorithm, and the activation function may be one or more of the activation functions described above.

(4) Pooling layer: the pooling layer is sandwiched between consecutive convolutional layers, and is used to compress an amount of data and a quantity of parameters, to reduce overfitting. In brief, if high-dimensional data is input, a primary function of the pooling layer is to perform data compression. Therefore, pooling is downsampling, and is performed to reduce feature maps.

Feature invariance is similar to scale invariance of a feature often mentioned in image processing, and a pooling operation is to adjust an image size. For example, even if an image of a dog is reduced by half, it can still be recognized that there is an image of a dog. This indicates that a most important feature of a dog is retained in the image, and it can be determined that a dog is drawn in the image. In other words, in image compression, information removed is only some insignificant information, and information retained is a feature with scale invariance, and is a feature that can express an image most.

Feature dimension reduction: it is known that an initial input channel includes a very large amount of information and many features, but some information is not very useful or is repetitive for a channel learning task. Therefore, such redundant information may be removed, and a most important feature may be extracted. This is also a primary function of the pooling operation. Therefore, the pooling operation prevents overfitting to some extent, and facilitates optimization.

One or more of the following operations are usually performed at the pooling layer: (1) Maximum pooling: a maximum value is calculated. For example, if $N_1$ dimensions of input values are pooled into one output value, the output value is a maximum value in the $N_1$ values. (2) Mean pooling: a mean is calculated. For example, if $N_1$ dimensions of input values are pooled into one output value, the output value is a mean of the $N_1$ values. (3) Gaussian pooling: Refer to a Gaussian fuzzy method. (4) Trainable pooling: A training function f accepts $N_1$ points as inputs, and outputs $N_2$ points, where $N_2$ is less than $N_1$, to implement dimension reduction. (5) Overlapping pooling. (6) Spatial pyramid pooling.

Figure 8:
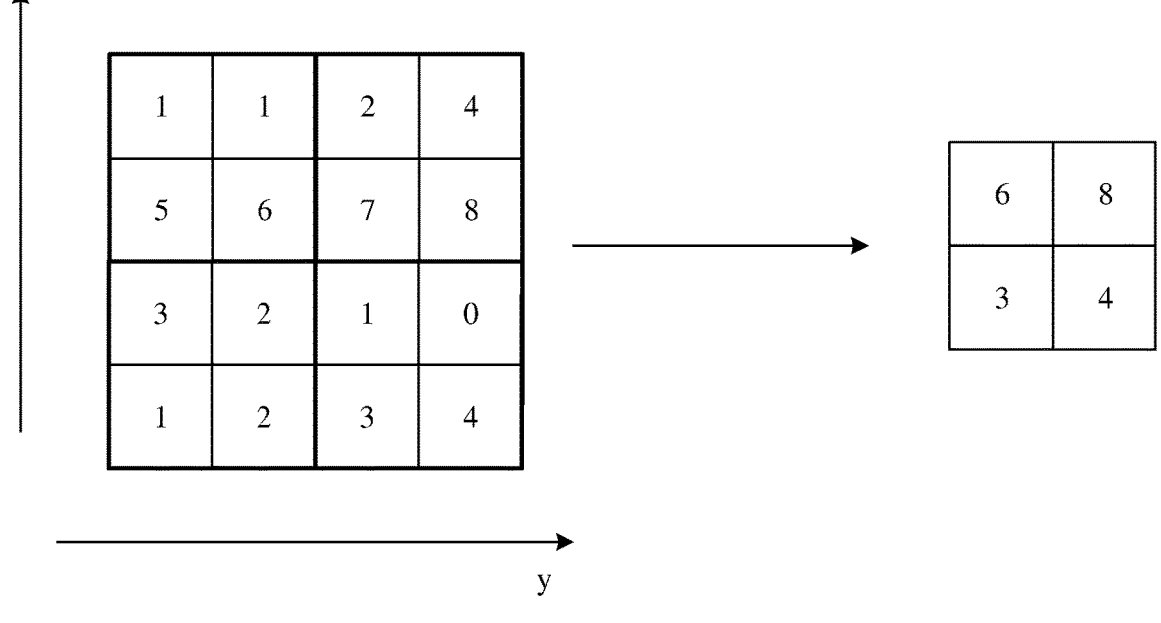
FIG. 8 is a schematic diagram of performing an operation at a polling layer in a convolutional neural network.

Description is provided below by using maximum pooling as an example. As shown in FIG. 8, description is provided by using an example in which an input matrix is a 4*4 matrix, and an output matrix is a 2*2 matrix. In this process, four input values need to be pooled into one output value. As shown in FIG. 8, a maximum value in each 2*2 receptive field is used as an output value. For example, if a maximum value in a first 2*2 receptive field of the input matrix is 6, a first element in the output matrix is 6, and by analogy, all output results are obtained.

In the pooling operation, a depth is kept unchanged. If a size of an input unit at the pooling layer is not an integer multiple of 2, a zero-padding manner usually may be used to enable the size of the input unit to be a multiple of 2, and then pooling is performed.

A size of a receiving unit is $W_1 * H_1 * D_1$, and two hyper-parameters are required: a spatial extent $F_1$ and a stride $S_2$. An output size is $W_2 * H_2 * D_2$, and no new weight may need to be introduced.

A configuration parameter in this step may be one or more of the spatial extent, the stride, a pooling algorithm, an input size (or the size of the receiving unit), the output size, and the like.

> (5) Fully connected layer: all neurons between two layers are connected by weights, and the fully connected layer is usually at a tail of the convolutional neural network. This is the same as a manner of connecting neurons in a conventional neural network. As described above, a value output by each neuron at the fully connected layer is obtained after an operation (for example, weighted summation or weighted summation plus bias) and nonlinear transformation are performed on a value output by a neuron at a previous layer.

Figure 9:
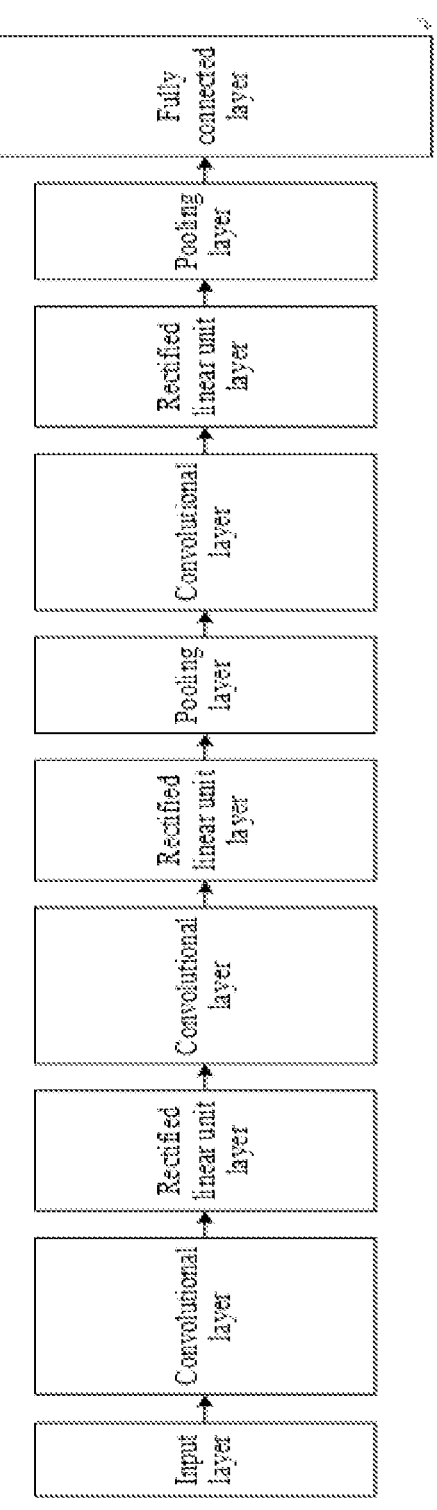
FIG. 9 is a schematic diagram of a structure of a convolutional neural network.

A convolutional neural network may be formed if one or more of the foregoing layers are connected, and there may be a plurality of operations at each layer, to form a deep neural network. For example, the convolutional neural network may include one or more convolutional layers, one or more rectified linear unit layers, one or more pooling layers, and one or more fully connected layers, and an arrangement sequence of the convolutional layer, the rectified linear unit layer, the pooling layer, and the fully connected layer is not limited. FIG. 9 is a schematic diagram of a structure of a convolutional neural network.

A configuration parameter of the channel learning model in this step may be one or more of quantities of layers, a sequence of the layers, a structure of the channel learning model, and the like.

The communication method provided in the embodiments of this application is described below in detail with reference to the accompanying drawings.

It should be understood that only for ease of understanding and description, the method provided in the embodiments of this application is described below in detail by using interaction between a first communications apparatus and a second communications apparatus as an example. However, this should constitute no limitation on an execution body of the method provided in this application. For example, a first communications apparatus shown in the following embodiments may be replaced with a component (for example, a chip or a chip system) disposed in the first communications apparatus, and a second communications apparatus shown in the following embodiments may be replaced with a component (for example, a chip or a chip system) disposed in the second communications apparatus.

A specific structure of the execution body of the method provided in the embodiments of this application is not specifically limited in the embodiments shown below, provided that communication can be performed according to the method provided in the embodiments of this application and by running a program in which code of the method provided in the embodiments of this application is recorded. For example, the method provided in the embodiments of this application may be performed by the first communications apparatus or the second communications apparatus, or may be performed by a functional module that is in the first communications apparatus or the second communications apparatus and that can invoke and execute a program.

The communication method provided in the embodiments of this application is described below in detail with reference to FIG. 10 to FIG. 17.

It should be noted that in the following embodiments, the first communications apparatus may be a terminal device or a component (for example, a chip or a chip system) disposed in a terminal device, and the second communications apparatus may be a network device or a component (for example, a chip or a chip system) disposed in a network device.

Alternatively, the first communications apparatus may be a network device or a component (for example, a chip or a chip system) disposed in a network device, and the second communications apparatus may be a terminal device or a component (for example, a chip or a chip system) disposed in a terminal device.

Alternatively, the first communications apparatus may be a terminal device or a component (for example, a chip or a chip system) disposed in a terminal device, and the second communications apparatus may be a terminal device or a component (for example, a chip or a chip system) disposed in a terminal device.

Alternatively, the first communications apparatus may be a network device or a component (for example, a chip or a chip system) disposed in a network device, and the second communications apparatus may be a network device or a component (for example, a chip or a chip system) disposed in a network device.

It should be further noted that in the following embodiments, a first channel learning model is deployed on a side of the first communications apparatus, and a second channel learning model is deployed on a side of the second communications apparatus. If it is not explicitly indicated that a channel learning model in the following embodiments is the first channel learning model or the second channel learning model, the channel learning model may be the first channel learning model and/or the second channel learning model.

It should be further noted that the embodiments of this application may be independent of each other, or may be combined with each other. Specifically, this is not limited in this application.

It should be further noted that channel learning model training in the embodiments of this application may also be briefly referred to as channel learning training. The channel learning model training may include at least one of the following: determining the first channel learning model, determining the second channel learning model, determining first channel information, determining second channel information, and the like.

It should be further noted that for a table in the embodiments of this application, in actual application, one or more rows and one or more columns in the table may be used, for example, at least one row and at least one column are used.

It should be further noted that in the embodiments of this application, "greater than" may be replaced with "greater than or equal to", and "less than" may be replaced with "less than or equal to".

Figure 10:
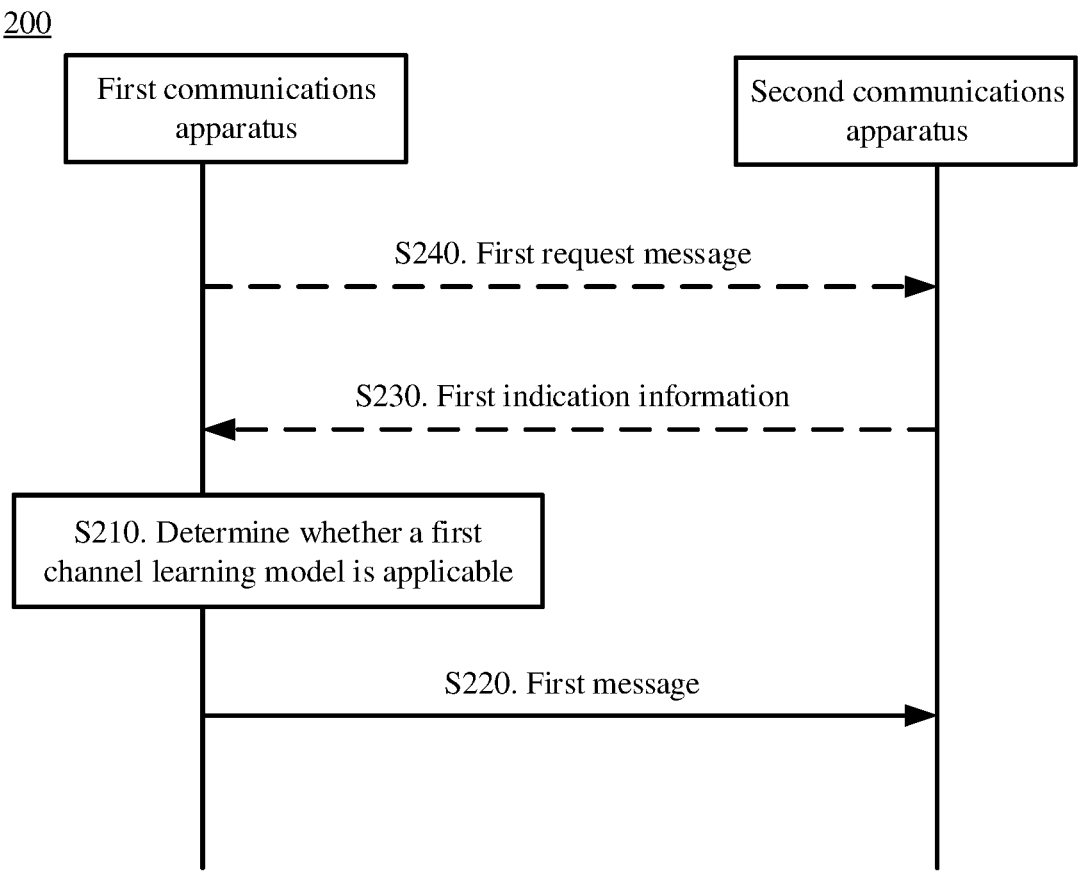
FIG. 10 is a schematic flowchart of a communication method according to an embodiment of this application.

FIG. 10 is a schematic flowchart of a communication method 200 according to an embodiment of this application from a perspective of device interaction. The method 200 shown in FIG. 10 may include S210 to S240. The steps in the method 200 are described below in detail.

S210. A first communications apparatus determines whether a first channel learning model is applicable.

The first channel learning model is used to determine first channel information based on target channel information, and a data amount of the first channel information is less than a data amount of the target channel information. Therefore, it may alternatively be understood as that the first channel learning model is used to compress the target channel information to obtain the first channel information.

Optionally, the data amount of the channel information may refer to a dimension of the channel information.

For example, if a quantity of antenna ports of a transmit end (for example, the first communications apparatus or a second communications apparatus) is $A_2$, and a quantity of antenna ports of a receive end (for example, the first communications apparatus or the second communications apparatus) is $A_3$, the target channel information between the transmit end and the receive end may be an $A_2*A_3$-dimensional matrix, and the data amount of the target channel information may be expressed by using $A_2*A_3$. If an element in the matrix of the target channel information is a complex number, and a real part and an imaginary part of each element are separately expressed, the data amount of the target channel information may alternatively be expressed as $A_2*A_3*2$.

For example, if a dimension of a matrix of the first channel information obtained by processing the matrix of the target channel information by using the first channel learning model is $B_2$, the data amount of the first channel information may be expressed by using $B_2$.

Optionally, the data amount of the channel information may alternatively refer to an information amount included in the channel information, or the like.

Optionally, the target channel information may be considered as an input to the first channel learning model, and the first channel information may be considered as an output of the first channel learning model. The data amount of the target channel information may be an information dimension of the input, and the data amount of the first channel information may be an information dimension of the output.

The first channel information is used to obtain second channel information by using a second channel learning model, and a data amount of the second channel information is the same as or similar to the data amount of the target channel information. Optionally, the second channel information may be used to perform data transmission. For example, the second communications apparatus may determine scheduling information for data transmission or determine precoding for data transmission based on the second channel information.

It should be understood that the first channel learning model corresponds to the second channel learning model. Therefore, that a first communications apparatus determines whether a first channel learning model is applicable may be understood as that the first communications apparatus determines whether the first channel learning model and the second channel learning model are applicable. That is, when determining that the first channel learning model is not applicable, the first communications apparatus may determine that the second channel learning model is also not applicable; or when determining that the first channel learning model is applicable, the first communications apparatus may determine that the second channel learning model is also applicable.

The target channel information is not limited in this embodiment of this application. For example, when the first communications apparatus is a terminal device, the target channel information may be downlink channel information. For another example, when the first communications apparatus is a network device, the target channel information may be uplink channel information. For another example, when the first communications apparatus is a terminal device, the target channel information may be uplink channel information, or the target channel information may be uplink channel information and downlink channel information, and the first communications apparatus may determine, based on partial reciprocity between uplink and downlink channels, the uplink channel information, and the downlink channel information, whether the first channel learning model and/or the second channel learning model are/is applicable, or determine a new first channel learning model and/or a new second channel learning model. For another example, when the first communications apparatus is a network device, the target channel information may be downlink channel information, or the target channel information may be uplink channel information and downlink channel information, and the second communications apparatus may determine, based on partial reciprocity between uplink and downlink channels, the uplink channel information, and the downlink channel information, whether the first channel learning model and/or the second channel learning model are/is applicable, or determine a new first channel learning model and/or a new second channel learning model.

The first communications apparatus may periodically determine whether the first channel learning model is applicable. For example, the first communications apparatus starts a timer after determining, for an $i^{th}$ time, whether the first channel learning model is applicable, and further, when the timer expires, the first communications apparatus determines, for an $(i+1)^{th}$ time, whether the first channel learning model is applicable.

In this manner, overheads of signaling exchange between the first communications apparatus and the second communications apparatus may be reduced, and degradation of communication performance caused when the first channel learning model is not applicable may be avoided because the first communications apparatus periodically determines whether the first channel learning model is applicable.

Alternatively, when receiving first indication information, the first communications apparatus may determine whether the first channel learning model is applicable. In this case, before S210, the method 200 may further include S230: the second communications apparatus sends the first indication information. Correspondingly, in S230, the first communications apparatus receives the first indication information.

In this manner, the second communications apparatus may indicate, by using signaling, the first communications apparatus to determine whether the first channel learning model is applicable, so that when finding that the first channel learning model is not applicable, the second communications apparatus indicates, in a timely manner, the first communications apparatus to perform verification, to reduce a delay of determining whether the first channel learning model is applicable. In addition, when finding, in a timely manner, that first channel learning is not applicable, the second communications apparatus may update the first channel learning model in a timely manner, to avoid degradation of communication performance caused when the first channel learning model is not applicable.

The first indication information is used to indicate the first communications apparatus to perform channel learning model training, in other words, may be used to indicate the first communications apparatus to determine whether the first channel learning model is applicable.

Optionally, the first indication information may be further used to indicate one or more of the following:

a resource used to transmit a first message, content in the first message, a manner of sending the first message, and a channel learning model training parameter. The first message is used to indicate that the first channel learning model is not applicable. The training parameter may include at least one of the following: a channel learning model training time and configuration information of a reference signal for channel learning model training.

The resource used to transmit the first message may be a resource on a physical uplink shared channel (PUSCH)/physical downlink shared channel (PDSCH), a resource on a physical uplink control channel (PUCCH)/physical downlink control channel (PDCCH), or another specific resource. For example, the resource used to transmit the first message may be a resource 1 or a resource 2.

The content in the first message may include one or more of the following: a rank value, a channel quality indicator (CQI), the first channel information, and a channel learning model training result (for example, information indicating whether the first channel learning model is applicable, and/or one or more parameters used to update the second channel learning model).

For a manner in which the first communications apparatus feeds back the rank value, the CQI, and the first channel information to the second communications apparatus, refer to the conventional technology. For brevity, details are not described in this embodiment of this application. In addition, a manner in which the first communications apparatus feeds back the channel learning model training result is described below in detail. Details are not described herein.

The manner of sending the first message may include one or more of the following: periodic sending, semi-persistent sending, aperiodic sending, a manner of feeding back a differential value, a manner of feeding back an absolute value, and a manner of feeding back a relative value.

Periodic sending: the first communications apparatus periodically sends the first message, for example, sends the first message based on a period T.

Semi-persistent sending: the first communications apparatus persistently sends the first message in a period of time. For example, the first communications apparatus persistently sends the first message in 10 s after receiving the first indication information.

Aperiodic sending: for example, the first communications apparatus sends the first message when receiving the first indication information.

The three manners of feeding back a differential value, feeding back an absolute value, and feeding back a relative value are described below in detail. For brevity, details are not described herein.

The channel learning model training parameter is a parameter used by the first communications apparatus to train the first channel learning model and/or the second channel learning model. The channel learning model training time may be periodic or aperiodic.

When the channel learning model is periodically trained, the channel learning model training time indicated in the first indication information may be a training period. Specifically, the channel learning model training period may be indicated by indicating a quantity of subframes, a quantity of slots, or a quantity of radio frames. For example, if the quantity of subframes indicated in the first indication information is 7, the channel learning model training period is 7 subframes. Alternatively, the channel learning model training period may be indicated by indicating milliseconds, seconds, minutes, or hours. For example, if the time indicated in the first indication information is 5 seconds, the channel learning model training period is 5 seconds.

The channel learning model training period may be related to a first parameter. For example, in some scenarios (for example, a high-speed moving scenario), a channel environment between the first communications apparatus and the second communications apparatus changes at a relatively high speed, and the channel learning model may be trained based on a relatively small period. For another example, in some scenarios (for example, an indoor scenario), a channel environment between the first communications apparatus and the second communications apparatus changes at a relatively low speed, and the channel learning model may be trained based on a relatively large period.

When the channel learning model is aperiodically trained, the channel learning model training time indicated in the first indication information may be a training period and a quantity of periods. Optionally, in this case, another parameter used for channel model training may be preconfigured by using higher layer signaling, and the first indication information may indicate the channel learning model training time, to trigger channel learning model training.

Optionally, before S210, the method 200 may further include S240: the first communications apparatus sends a first request message. Correspondingly, in S240, the second communications apparatus receives the first request message.

The first request message is used to request one or more of the following: an operation of performing channel learning model training, an operation of sending the first message, and the first indication information.

In this manner, the first communications apparatus may request, by using signaling, to determine whether the first channel learning model is applicable, so that when finding that the first channel learning model is not applicable, the first communications apparatus requests verification from the second communications apparatus in a timely manner, to reduce a delay of determining whether the first channel learning model is applicable. In addition, when finding, in a timely manner, that the first channel learning model is not applicable, the first communications apparatus may update the first channel learning model in a timely manner, to avoid degradation of communication performance caused when the first channel learning model is not applicable.

A method for determining, by the first communications apparatus, whether the first channel learning model is applicable is not limited in this embodiment of this application.

The first communications apparatus may determine, by using one or more of the following implementations, whether the first channel learning model is applicable. When the first communications apparatus determines that the first channel learning model is not applicable, the first communications apparatus and/or the second communications apparatus may adjust the first channel learning model in a timely manner, to improve accuracy and applicability of the channel learning model, so as to improve communication performance.

A manner in which the first communications apparatus determines whether the first channel learning model and/or the second channel learning model are/is applicable is provided below. The manner in which the first communications apparatus determines whether the channel learning model is applicable may be used as an independent embodiment, or may be combined with another embodiment. Specifically, this is not limited in this embodiment of this application. The following one or more manners of determining whether the channel learning model is applicable may be used independently or jointly. Specifically, this is not limited in this embodiment of this application.

It should be noted that in this embodiment of this application, whether the channel learning model is applicable may alternatively mean whether the channel learning model matches, whether the channel learning model is accurate, whether the channel learning model is outdated, whether there is an error in the channel learning model, or the like.

In an implementation, the first communications apparatus may determine, based on a long-term statistical characteristic of a target channel, whether the channel learning model is applicable. For example, when the first communications apparatus determines that the long-term statistical characteristic of the target channel changes relatively greatly, it indicates that a channel feature or a channel environment between the first communications apparatus and the second communications apparatus changes relatively greatly. Therefore, the first communications apparatus may determine that the channel learning model is not applicable.

For example, the first communications apparatus may determine, based on whether a variation of the long-term statistical characteristic of the target channel is greater than or equal to a first preset threshold, whether the first channel learning model is applicable.

The first preset threshold may be predefined in a protocol, may be indicated by the second communications apparatus to the first communications apparatus, or may be preconfigured. This is not limited in this embodiment of this application.

The long-term statistical characteristic of the target channel may include at least one of the following: a rank value, a large-scale characteristic, a channel covariance matrix, a channel correlation matrix, a coherent time, a coherent bandwidth, and the like.

The large-scale characteristic of the channel may be one or more of the following: a delay spread, a Doppler spread, a Doppler shift, an average gain, an average delay, an angle of arrival (AOA), an angle of arrival spread (AAS), an angle of departure (AOD), an angle of departure spread (ADS), a spatial RX parameter, and a spatial correlation.

The first communications apparatus may determine the long-term statistical characteristic of the target channel based on a signal from the second communications apparatus, and further determine, based on the long-term statistical characteristic of the target channel, whether the first channel learning model is applicable. The signal from the second communications apparatus may be a reference signal or a data signal. The reference signal may be a demodulation reference signal (DMRS), a channel state information reference signal (CSI-RS), a phase tracking reference signal (PTRS), a tracking reference signal (TRS), a synchronization signal and physical broadcast channel (PBCH) block (SSB), a sounding reference signal (SRS), or the like. The data signal may be a signal transmitted on a PDSCH, a PDCCH, a PUSCH, or a PUCCH.

For example, if the first communications apparatus is a terminal device, and the second communications apparatus is a network device, the terminal device may determine the long-term statistical characteristic of the target channel based on the reference signal and/or the data signal sent by the network device. The reference signal may be at least one of a CSI-RS, a DMRS, a PTRS, a TRS, and an SSB, and the data signal may be at least one of a signal transmitted on the PDSCH and a signal transmitted on the PDCCH. The target channel may be a downlink channel.

Optionally, when the variation of the long-term statistical characteristic of the target channel is greater than or equal to (or greater than) the first preset threshold, it indicates that the channel feature or the channel environment between the first communications apparatus and the second communications apparatus changes relatively greatly, and therefore the first communications apparatus may determine that the first channel learning model is not applicable. When the long-term statistical characteristic of the target channel is less than (or less than or equal to) the first preset threshold, it indicates that there is a relatively stable channel feature or channel environment between the first communications apparatus and the second communications apparatus, and therefore the first communications apparatus may determine that the first channel learning model is applicable.

For example, the long-term statistical characteristic of the target channel is the rank value. When determining that the rank value changes relatively greatly, the first communications apparatus may determine that the first channel learning model is not applicable. For example, when determining that a variation of the rank value is greater than or equal to a preset threshold #1 (an example of the first preset threshold), the first communications apparatus may determine that the first channel learning model is not applicable. The preset threshold #1 may be $R_1$, and $R_1$ is a positive integer. For example, $R_1$ is 2. That is, when the variation of the rank value is greater than or equal to 2, the first communications apparatus may determine that the first channel learning model is not applicable. For example, when the first communications apparatus moves from an environment in which there are sparse reflectors to an environment in which there are abundant reflectors, a quantity of paths on the target channel is increased, and therefore the rank value changes. In this case, the first channel learning model may no longer be applicable. A larger rank value indicates that an applicable channel learning model may be more complex, for example, the channel learning model may include a larger quantity of layers. For example, when the first communications apparatus moves from an indoor scenario to an outdoor scenario, the statistical characteristic of the channel also changes, and the first communications apparatus may determine that the first channel learning model may not be applicable.

For example, the long-term statistical characteristic of the target channel is the Doppler shift. When determining that the Doppler shift changes relatively greatly, the first communications apparatus may determine that the first channel learning model is not applicable. Usually, the Doppler shift may refer to a change in a phase and a frequency that is caused due to a propagation distance difference when a mobile station moves in a specific direction at a constant rate. The Doppler shift reveals a rule in which an attribute of a wave changes during movement. For example, when a variation of the Doppler shift is greater than or equal to a preset threshold #2 (an example of the first preset threshold), the first communications apparatus may determine that the first channel learning model is not applicable. The preset threshold #2 may be $F_2$, and $F_2$ is a real number. For example, $F_2$ is 2. That is, when the variation of the Doppler shift is greater than or equal to 2, the first communications apparatus may determine that the first channel learning model is not applicable. For example, the Doppler shift may reflect a moving speed of the first communications apparatus. When the first communications apparatus moves from a walking scenario to a vehicle-mounted scenario, the moving speed of the first communications apparatus is increased, and the first channel learning model may no longer be applicable. For example, the Doppler shift is related to the moving speed of the first communications apparatus and an angle between a moving direction of the first communications apparatus and an incident direction of a radio wave. A formula of calculating the Doppler shift may be as follows:

$$f_d = \frac{1}{2\pi}\frac{\Delta\varphi}{\Delta t} = \frac{v}{\lambda}\cos\theta, \tag{10}$$

where v is the moving speed, $\lambda$ is a wavelength, and $\theta$ is the angle between the moving direction and the incident direction of the radio wave.

Optionally, the first communications apparatus may determine, based on a variation of the moving speed of the first communications apparatus, whether the first channel learning model is applicable. For example, when the variation of the moving speed is greater than a preset threshold #3 (an example of the first preset threshold), the first communications apparatus may determine that the first channel learning model is not applicable. The preset threshold #3 may be $S_3$, $S_3$ is a real number, and $S_3$ may be in a unit of m/s or km/h. That is, when the variation of the speed of the first communications apparatus is greater than or equal to $S_3$, the first communications apparatus may determine that the first channel learning model is not applicable. For example, when the first communications apparatus moves from the walking scenario to the vehicle-mounted scenario, and the variation of the speed is relatively large, the first channel learning model may no longer be applicable.

In this implementation, the first communications apparatus may determine, based on the long-term statistical characteristic of the target channel, whether the channel learning model is applicable, in other words, determine, without performing channel learning model training, whether the first channel learning model is applicable, thereby reducing processing complexity of the first communications apparatus. In addition, whether the channel learning model is applicable may be determined without assistance of the second communications apparatus, and therefore signaling exchange is reduced. Therefore, this manner is simple and convenient.

In another implementation, the first communications apparatus may determine, based on received first scheduling information, whether the first channel learning model is applicable. The first scheduling information may be determined by the second communications apparatus based on the second channel information, and the second communications apparatus may send the first scheduling information to the first communications apparatus.

The first scheduling information may include at least one of the following: a modulation and coding scheme (MCS) indication, a transport block size (TBS) indication, a rank indication, an antenna port indication, and the like. The first scheduling information may be downlink control information (DCI) at a physical layer, or may be scheduling information in higher layer signaling. Specifically, for content and an indication manner included in the first scheduling information, refer to the conventional technology. For brevity, details are not described in this embodiment of this application.

The MCS indication may be used to indicate a modulation scheme (or a modulation order) and a code rate for data transmission. For example, an indication manner in the following table may be used for the MCS indication (Table 1 and Table 2). A modulation order in the second column and a target code rate may be determined by indicating an MCS index in the first column in the following table. A modulation order 2 represents quadrature phase shift keying (QPSK), a modulation order 4 represents 16 quadrature amplitude modulation (16QAM, quadrature amplitude modulation), a modulation order 6 represents 64QAM, and a modulation order 6 represents 256QAM. Alternatively, another indication manner may be used for the MCS indication. Specifically, this is not limited in this application. For example, the modulation scheme and the code rate may be separately indicated.

TABLE 1

| MCS index $I_{MCS}$ | Modulation order $Q_m$ | Target code rate Rx [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | Reserved | |
| 30 | 4 | Reserved | |
| 31 | 6 | Reserved | |

TABLE 2

| MCS index $I_{MCS}$ | Modulation order $Q_m$ | Target code rate Rx [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | Reserved | |
| 29 | 4 | Reserved | |
| 30 | 6 | Reserved | |
| 31 | 8 | Reserved | |

The transport block size indication may be used to indicate a bit size for data transmission. For example, in a specific time-frequency resource, a bit size of a transport block may be determined based on a modulation scheme and a code rate. For example, the bit size of the transport block is equal to a quantity of resource units*the modulation scheme*the code rate*a quantity of layers.

A layer quantity indication may be used to indicate a quantity of layers or a quantity of streams for data transmission. The quantity of layers or the quantity of streams may correspond to a quantity of codewords. For example, the quantity of layers or the quantity of streams that is less than or equal to 4 corresponds to transmission of one codeword, and the quantity of layers or the quantity of streams that is greater than 4 corresponds to transmission of two codewords.

The antenna port indication may be used to indicate a DMRS antenna port of data. A terminal device may determine a quantity of antenna ports based on the antenna port indication. For example, an indication manner in the following table may be used for the antenna port indication (Table 3 and Table 4). A DMRS port may be determined by indicating a value in the first column in the following table. The DMRS port includes a DMRS antenna port number. A quantity of DMRS antenna ports may be determined based on a quantity of DMRS antenna port numbers. The quantity of DMRS antenna ports may correspond to a quantity of layers (a quantity of streams) of the data.

For example, when the value in Table 3 is 2, the DMRS ports are 0 and 1, in other words, the quantity of DMRS antenna ports is 2, and the quantity of layers (the quantity of streams) of the data is 2. For example, in the case of one codeword in Table 4, when the value is 10, the DMRS ports are 0 to 3, in other words, the quantity of DMRS antenna ports is 4, and the quantity of layers (the quantity of streams) of the data is 4. For example, in the case of two codewords in Table 4, when the value is 1, the DMRS ports are 0, 1, 2, 3, 4, and 6, in other words, the quantity of DMRS antenna ports is 5, and the quantity of layers (the quantity of streams) of the data is 5.

TABLE 3

| | One codeword: A codeword 0 is enabled, and a codeword 1 is disabled | |
|---|---|---|
| Value | Quantity of DMRS code division multiplexing (code division multiple, CDM) groups without data | DMRS port |
| 0 | 1 | 0 |
| 1 | 1 | 1 |
| 2 | 1 | 0 and 1 |
| 3 | 2 | 0 |
| 4 | 2 | 1 |
| 5 | 2 | 2 |
| 6 | 2 | 3 |
| 7 | 2 | 0 and 1 |
| 8 | 2 | 2 and 3 |
| 9 | 2 | 0-2 |
| 10 | 2 | 0-3 |
| 11 | 2 | 0 and 2 |
| 12-15 | Reserved | Reserved |

TABLE 4

| | One codeword: A codeword 0 is enabled, and a codeword 1 is disabled | | | | Two codewords: A codeword 0 is enabled, and a codeword 1 is disabled | | |
|---|---|---|---|---|---|---|---|
| Value | Quantity of DMRS CDM groups without data | DMRS port | Quantity of front-load symbols | Value | Quantity of DMRS CDM groups without data | DMRS port | Quantity of front-load symbols |
| 0 | 1 | 0 | 1 | 0 | 2 | 0-4 | 2 |
| 1 | 1 | 1 | 1 | 1 | 2 | 0, 1, 2, 3, 4, and 6 | 2 |
| 2 | 1 | 0 and 1 | 1 | 2 | 2 | 0, 1, 2, 3, 4, 5, and 6 | 2 |
| 3 | 2 | 0 | 1 | 3 | 2 | 0, 1, 2, 3, 4, 5, 6, and 7 | 2 |
| 4 | 2 | 1 | 1 | 4-31 | Reserved | Reserved | Reserved |
| 5 | 2 | 2 | 1 | | | | |
| 6 | 2 | 3 | 1 | | | | |
| 7 | 2 | 0 and 1 | 1 | | | | |
| 8 | 2 | 2 and 3 | 1 | | | | |

TABLE 4-continued

| | One codeword: A codeword 0 is enabled, and a codeword 1 is disabled | | | | Two codewords: A codeword 0 is enabled, and a codeword 1 is disabled | | |
|---|---|---|---|---|---|---|---|
| Value | Quantity of DMRS CDM groups without data | DMRS port | Quantity of front-load symbols | Value | Quantity of DMRS CDM groups without data | DMRS port | Quantity of front-load symbols |
| 9 | 2 | 0-2 | 1 | | | | |
| 10 | 2 | 0-3 | 1 | | | | |
| 11 | 2 | 0 and 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0 and 1 | 2 | | | | |
| 21 | 2 | 2 and 3 | 2 | | | | |
| 22 | 2 | 4 and 5 | 2 | | | | |
| 23 | 2 | 6 and 7 | 2 | | | | |
| 24 | 2 | 0 and 4 | 2 | | | | |
| 25 | 2 | 2 and 6 | 2 | | | | |
| 26 | 2 | 0, 1, and 4 | 2 | | | | |
| 27 | 2 | 2, 3, and 6 | 2 | | | | |
| 28 | 2 | 0, 1, 4, and 5 | 2 | | | | |
| 29 | 2 | 2, 3, 6, and 7 | 2 | | | | |
| 30 | 2 | 0, 2, 4, and 6 | 2 | | | | |
| 31 | Reserved | Reserved | Reserved | | | | |

Optionally, an indication manner in another table may alternatively be used for the antenna port indication. For example, an indication manner in Table 7.3.1.2.2-3 and Table 7.3.1.2.2-4 in the 3GPP technical specification (TS) 38.212 is used, or an indication manner in another table may be used for the antenna port indication. This is not limited in this application.

In an example, the first communications apparatus may determine, based on a difference between measured CQI information and the first scheduling information, whether the first channel learning model is applicable.

For example, the CQI information measured by the first communications apparatus may reflect a modulation scheme and/or a code rate suitable for data. Therefore, the first communications apparatus may determine, based on the difference between the measured CQI information and the first scheduling information, whether the first channel learning model is applicable.

In another example, the first communications apparatus may determine, based on the first scheduling information and second scheduling information, whether the first channel learning model is applicable. The second scheduling information is determined by the first communications apparatus based on a target channel.

In an example, the first communications apparatus may determine, based on whether a difference between the first scheduling information and the second scheduling information is greater than or equal to a preset difference threshold, whether the first channel learning model is applicable. The preset difference threshold may be predefined in a protocol, may be indicated by the second communications apparatus to the first communications apparatus, or may be preconfigured. This is not limited in this embodiment of this application.

The scheduling information of the data may reflect a quality status of a channel. Therefore, the first communications apparatus may determine appropriate scheduling information (namely, the second scheduling information) of the data based on the measured target channel (or an actual channel). The second communications apparatus may determine the second channel information based on the second channel learning model and the first channel information fed back by the first communications apparatus, and may determine the scheduling information (namely, the first scheduling information) of the data based on the second channel information. When there is a relatively large difference between the second scheduling information determined by the first communications apparatus and the first scheduling information indicated by the second communications apparatus to the first communications apparatus, it indicates that there is a relatively large difference between the second channel information and the target channel information, in other words, the first channel learning model is not applicable. Therefore, the first communications apparatus may determine, in at least one of the following manners, whether the first channel learning model is applicable.

For example, when the difference between the first scheduling information and the second scheduling information is greater than or equal to the preset difference threshold, the first communications apparatus determines that the first channel learning model is not applicable; or when the difference between the first scheduling information and the second scheduling information is less than the preset difference threshold, the first communications apparatus determines that the first channel learning model is applicable.

The preset difference threshold may be at least one of a difference threshold of a modulation order, a difference threshold of a code rate, a difference threshold of an MCS index, a difference threshold of a rank value, a difference threshold of a TBS, and a difference threshold of an antenna port.

For example, the preset difference threshold is the difference threshold of the modulation order. The difference threshold of the modulation order may b $N_3$, and $N_3$ is a real number. For example, $N_3$ is 1, 2, 3, 4, 1/2, 3/2, or 5/2.

For example, when a difference between an order of a modulation scheme determined by the first communications apparatus and an order of a modulation scheme indicated in the first scheduling information is greater than or equal to (greater than) the difference threshold of the modulation order, the first communications apparatus determines that the first channel learning model is not applicable.

For another example, when a difference between an order of a modulation scheme determined by the first communications apparatus and an order of a modulation scheme indicated in the first scheduling information is less than (less than or equal to) the difference threshold of the modulation order, the first communications apparatus determines that the first channel learning model is applicable.

For example, if the difference threshold of the modulation order is 2, the modulation scheme that is determined by the first communications apparatus and that is applicable to data transmission is quadrature phase shift keying (QPSK) (the order is 2), and the modulation scheme indicated in the first scheduling information is 64 quadrature amplitude modulation (QAM) (the order is 4), the first communications apparatus determines that the first channel learning model is not applicable.

For example, if the difference threshold of the modulation order is 4, the modulation scheme that is determined by the first communications apparatus and that is applicable to data transmission is 64QAM (the order is 4), and the modulation scheme indicated in the first scheduling information is QPSK (the order is 2), the first communications apparatus determines that the first channel learning model is applicable.

For example, if the difference threshold of the modulation order is 2, the modulation scheme that is determined by the first communications apparatus and that is applicable to data transmission is 64QAM (the order is 4), and the modulation scheme indicated in the first scheduling information is QPSK (the order is 2), the first communications apparatus determines that the first channel learning model is not applicable.

For example, when the order of the determined modulation scheme is less than the order of the modulation scheme indicated in the first scheduling information, and the difference between the order of the determined modulation scheme and the order of the modulation scheme indicated in the first scheduling information is greater than or equal to the difference threshold of the modulation order, the first communications apparatus may determine that the first channel learning model is not applicable. In other words, when the difference between the order of the determined modulation scheme and the order of the modulation scheme indicated in the first scheduling information is greater than or equal to (greater than) the difference threshold of the modulation order, and the order of the determined modulation scheme is less than the order of the modulation scheme indicated in the first scheduling information, the first communications apparatus determines that the first channel learning model is not applicable.

For another example, when the order of the determined modulation scheme is greater than or equal to the order of the modulation scheme indicated in the first scheduling information, the first communications apparatus may determine that the first channel learning model is applicable.

For example, if the difference threshold of the modulation order is 2, the modulation scheme that is determined by the first communications apparatus and that is applicable to data transmission is 64QAM (the order is 4), and the modulation scheme indicated in the first scheduling information is QPSK (the order is 2), the first communications apparatus determines that the first channel learning model is applicable.

For example, if the difference threshold of the modulation order is 2, the modulation scheme that is determined by the first communications apparatus and that is applicable to data transmission is QPSK (the order is 2), and the modulation scheme indicated in the first scheduling information received by the first communications apparatus is 64QAM (the order is 4), the first communications apparatus may determine that the channel learning model is not applicable. In this case, a modulation order of data transmitted by the second communications apparatus to the first communications apparatus based on the second channel information determined based on the channel learning model is relatively high, and the first communications apparatus possibly cannot correctly receive the data. For example, the preset difference threshold is the difference threshold of the code rate. The difference threshold of the code rate may be $M_1$, and $M_1$ is a real number. For example, $M_1$ is 200/1024, 250/1024, 300/1024, or 500/1024.

For example, when a difference between a code rate determined by the first communications apparatus and a code rate indicated in the first scheduling information is greater than or equal to (greater than) the difference threshold of the code rate, the first communications apparatus determines that the first channel learning model is not applicable.

For another example, when a difference between a code rate determined by the first communications apparatus and a code rate indicated in the first scheduling information is less than (less than or equal to) the difference threshold of the code rate, the first communications apparatus determines that the first channel learning model is applicable.

For example, if the difference threshold of the code rate is 200/1024, the code rate that is determined by the first communications apparatus and that is applicable to data transmission is 400/1024, and the code rate indicated in the first scheduling information is 658/1024, the first communications apparatus may determine that the first channel learning model is not applicable.

For example, when the determined code rate is less than the code rate indicated in the first scheduling information, and the difference between the determined code rate and the code rate indicated in the first scheduling information is greater than or equal to the difference threshold of the code rate, the first communications apparatus may determine that the first channel learning model is not applicable.

In other words, when the difference between the determined code rate and the code rate indicated in the first scheduling information is greater than or equal to (greater than) the difference threshold of the code rate, and the determined code rate is less than the code rate indicated in the first scheduling information, the first communications apparatus determines that the first channel learning model is not applicable.

For another example, when the determined code rate is greater than or equal to the code rate indicated in the first scheduling information, the first communications apparatus may determine that the first channel learning model is applicable.

For example, if the difference threshold of the code rate is 200/1024, the code rate that is determined by the first communications apparatus and that is applicable to data transmission is 400/1024, and the code rate indicated in the first scheduling information received by the first communications apparatus is 658/1024, the first communications apparatus may determine that the channel learning model is not applicable. In this case, a code rate of data transmitted by the second communications apparatus to the first communications apparatus based on the second channel information determined based on the first channel learning model is relatively high, and the first communications apparatus possibly cannot correctly receive the data.

For example, the preset difference threshold is the difference threshold of the MCS index. The difference threshold of the MCS index may be $P_1$, and $P_1$ is an integer. For example, $P_1$ is 1, 2, 3, 4, 5, 6, 8, or 10.

For example, when a difference between an MCS index determined by the first communications apparatus and an MCS index indicated in the first scheduling information is greater than or equal to (greater than) the difference threshold of the MCS index, the first communications apparatus determines that the first channel learning model is not applicable.

For another example, when a difference between an MCS index determined by the first communications apparatus and an MCS index indicated in the first scheduling information is less than (less than or equal to) the difference threshold of the MCS index, the first communications apparatus determines that the first channel learning model is applicable. For example, if the difference threshold of the MCS index is 4, the MCS index that is determined by the first communications apparatus and that is applicable to data transmission is 4, and the MCS index indicated in the first scheduling information is 10, the first communications apparatus may determine that the first channel learning model is not applicable.

For example, when the determined MCS index is less than the MCS index indicated in the first scheduling information, and the difference between the determined MCS index and the MCS index indicated in the first scheduling information is greater than or equal to the difference threshold of the MCS index, the first communications apparatus may determine that the first channel learning model is not applicable.

In other words, when the difference between the MCS index determined by the first communications apparatus and the MCS index indicated in the first scheduling information is greater than or equal to (greater than) the difference threshold of the MCS index, and a value of the determined MCS index is less than a value of the MCS index indicated in the first scheduling information, the first communications apparatus determines that the first channel learning model is not applicable.

For another example, when the determined MCS index is greater than or equal to the MCS index indicated in the first scheduling information, the first communications apparatus may determine that the first channel learning model is applicable.

For example, if the difference threshold of the MCS index is 4, the MCS index that is determined by the first communications apparatus and that is applicable to data transmission is 4, and the MCS index indicated in the first scheduling information received by the first communications apparatus is 10, the first communications apparatus may determine that the channel learning model is not applicable. In this case, an MCS index of data transmitted by the second communications apparatus to the first communications apparatus based on the second channel information is relatively large, and the first communications apparatus possibly cannot correctly receive the data.

For example, the preset difference threshold is the difference threshold of the TBS. The difference threshold of the TBS may be Q, and Q is an integer. For example, Q is 32, 64, 128, 256, 612, or 1024.

For example, when a difference between a TBS determined by the first communications apparatus and a TBS indicated in the first scheduling information is greater than or equal to (greater than) the difference threshold of the TBS, the first communications apparatus determines that the first channel learning model is not applicable. For another example, when a difference between a TBS determined by the first communications apparatus and a TBS indicated in the first scheduling information is less than (less than or equal to) the difference threshold of the TBS, the first communications apparatus determines that the first channel learning model is applicable.

For example, if the difference threshold of the TBS is 64, the TBS that is determined by the first communications apparatus and that is applicable to data transmission is 288, and the TBS indicated in the first scheduling information is 522, the first communications apparatus may determine that the first channel learning model is not applicable.

For example, when the determined TBS is less than the TBS indicated in the first scheduling information, and the difference between the determined TBS and the TBS indicated in the first scheduling information is greater than or equal to the difference threshold of the TBS, the first communications apparatus may determine that the first channel learning model is not applicable.

In other words, when the difference between the TBS determined by the first communications apparatus and the TB S indicated in the first scheduling information is greater than or equal to (greater than) the difference threshold of the TBS, and the determined TBS is less than the TBS indicated in the first scheduling information, the first communications apparatus determines that the first channel learning model is not applicable.

For another example, when the determined TBS is greater than or equal to the TB S indicated in the first scheduling information, the first communications apparatus may determine that the first channel learning model is applicable.

For example, if the difference threshold of the TBS is 64, the TBS that is determined by the first communications apparatus and that is applicable to data transmission is 288, and the TBS indicated in the first scheduling information received by the first communications apparatus is 522, the first communications apparatus may determine that the first channel learning model is not applicable. In this case, a TBS of data transmitted by the second communications apparatus to the first communications apparatus based on the second channel information determined based on the first channel learning model is excessively large, and the first communications apparatus cannot correctly receive the data.

It should be understood that description is provided above only by using an example in which the first communications apparatus determines, based on a difference between one piece of information in the first scheduling information and one piece of information in the second scheduling information, whether the first channel learning model is applicable. Optionally, the first communications apparatus may alternatively determine, based on differences between a plurality of pieces of information in the first scheduling information and a plurality of pieces of information in the second scheduling information, whether the first channel learning model is applicable. In other words, when the difference between the determined code rate and the code rate indicated in the first scheduling information is greater than or equal to the difference threshold of the code rate, and the difference between the determined TBS and the TBS indicated in the first scheduling information is greater than or equal to the difference threshold of the TBS, the first communications apparatus may determine that the first channel learning model is not applicable.

It should be further understood that description is provided above only by using an example in which the first communications apparatus determines, based on whether the difference between the first scheduling information and the second scheduling information is greater than or equal to the preset difference threshold, whether the first channel learning model is applicable. Optionally, the first communications apparatus may determine, based on whether a similarity between the first scheduling information and the second scheduling information is less than a preset similarity threshold, whether the first channel learning model is applicable. The preset similarity threshold may be predefined in a protocol, may be indicated by the second communications apparatus to the first communications apparatus, or may be preconfigured. This is not limited in this embodiment of this application.

In an example, the first communications apparatus may determine, based on the first scheduling information, the second scheduling information, and a first mapping relationship, whether the first channel learning model is applicable. The first mapping relationship is used to indicate a correspondence between the scheduling information and whether the channel learning model is applicable.

Table 5 shows an example of the first mapping relationship. For example, the first mapping relationship may be one or more rows in the following table. The first mapping relationship may be predefined in a protocol, or may be notified by the second communications apparatus to the first communications apparatus by using signaling. Specifically, this is not limited in this embodiment of this application.

TABLE 5

| Second scheduling information | First scheduling information | Whether the first channel learning model is applicable |
|---|---|---|
| Modulation scheme: QPSK | Modulation scheme: QPSK | Applicable |
| Modulation scheme: QPSK | Modulation scheme: ≥16QAM and 64QAM | Not applicable |
| Modulation scheme: 16QAM | Modulation scheme: QPSK and 16QAM | Applicable |
| Modulation scheme: 16QAM | Modulation scheme: 64QAM and 256QAM | Not applicable |
| Code rate: 1/2 | Code rate: ≥2/3 | Not applicable |
| Code rate: 2/3 | Code rate: 3/4 and 5/6 | Not applicable |
| . . . | . . . | . . . |
| MCS index: 0-10 | MCS index: ≥12 | Not applicable |
| MCS index: m | MCS index: ≥m + p, where p is an integer | Not applicable |

50

TABLE 5-continued

| Second scheduling information | First scheduling information | Whether the first channel learning model is applicable |
|---|---|---|
| Quantity of DMRS ports: 2 | Quantity of DMRS ports: ≥4 | Not applicable |
| Quantity of DMRS ports: r | Quantity of DMRS ports: ≥r + $r_1$, where $r_1$ is an integer | Not applicable |

For example, if the modulation scheme determined by the first communications apparatus is QPSK, and the scheduling scheme indicated in the first scheduling information is QPSK, the first communications apparatus determines, based on Table 5, that the first channel learning model is applicable. For another example, if the code rate determined by the first communications apparatus is 2/3, and the code rate indicated in the first scheduling information is 3/4, the first communications apparatus may determine, based on Table 5, that the first channel learning model is not applicable.

In this implementation, the first communications apparatus may determine, based on the first scheduling information sent by the second communications apparatus, whether the channel learning model is applicable, in other words, determine, without performing channel learning model training, whether the first channel learning model is applicable, thereby reducing processing complexity of the first communications apparatus. In addition, whether the first channel learning model is applicable is determined based on the scheduling information determined by the first communications apparatus and the scheduling information determined by the second communications apparatus, and therefore communication performance based on the first channel learning model can be ensured. When the first communications apparatus and the second communications apparatus reach an agreement on understanding, there is a relatively simple and convenient manner of determining whether the channel learning model is applicable.

In still another implementation, the first communications apparatus may determine, based on data transmission performance, whether the first channel learning model is applicable.

The data transmission performance is related to the second channel information. Therefore, the data transmission performance may reflect a similarity between the second channel information and the target channel information, and further may reflect performance of the first channel learning model and/or performance of the second channel learning model, that is, whether the first channel learning model and/or the second channel learning model are/is applicable.

The data transmission performance may include transmission performance of first data and/or transmission performance of second data. The first data is sent by the first communications apparatus based on the target channel information, and the second data is sent by the second communications apparatus based on the second channel information. For example, when the first communications apparatus is a terminal device, and the second communications apparatus is a network device, the first data may be uplink data, and the second data may be downlink data.

The first communications apparatus may determine, based on data transmission correctness performance or data transmission acknowledgement (acknowledgement, ACK)/negative acknowledgement (NACK) performance, whether the first channel learning model is applicable.

The data transmission correctness performance may be measured by using a data transmission correctness rate in a period of time. The data transmission ACK/NACK performance may be measured by using a proportion of ACKs/NACKs received or sent in a period of time.

Specifically, a time length of the period of time may be expressed in milliseconds (ms), seconds (s), minutes (min), hours (h), days, months, or the like. Alternatively, a time length of the period of time may be expressed in slots, subframes, radio frames, transmission time intervals (TTI), or the like. The period of time may be a unit of T time lengths, and T may be a real number. For example, the period of time may be a time length such as 10 ms, 20 ms, 0.5 s, 1 s, or 10 s, or may be 10 slots, 20 subframes, or 10 radio frames.

In an example, the first communications apparatus may determine, based on a relationship between the data transmission correctness rate or the proportion of ACKs received or sent in the period of time and a preset threshold #4, whether the first channel learning model is applicable. The preset threshold #4 may be predefined in a protocol, may be indicated by the second communications apparatus to the first communications apparatus, or may be preconfigured. This is not limited in this embodiment of this application.

For example, when determining that the data transmission correctness rate or the proportion of ACKs received or sent in the period of time is less than (or less than or equal to) the preset threshold #4, the first communications apparatus determines that the first channel learning model is not applicable. For another example, when determining that the data transmission correctness rate or the proportion of ACKs received or sent in the period of time is greater than or equal to (or greater than) the preset threshold #4, the first communications apparatus determines that the first channel learning model is applicable.

For example, if the period of time is 10 s, and the preset threshold #4 is 90%, when determining that the data transmission correctness rate or the proportion of ACKs received or sent in the 10 s is less than 90%, the first communications apparatus determines that the first channel learning model is not applicable.

In another example, the first communications apparatus determines, based on a relationship between a quantity of data transmission failures or a quantity of NACKs received or sent in a period of time and a preset threshold #5, whether the first channel learning model is applicable. The preset threshold #5 may be predefined in a protocol, may be indicated by the second communications apparatus to the first communications apparatus, or may be preconfigured. This is not limited in this embodiment of this application.

For example, when determining that the quantity of data transmission failures or the quantity of NACKs received or sent in the period of time is greater than (or greater than or equal to) the preset threshold #5, the first communications apparatus determines that the first channel learning model is not applicable. For another example, when determining that the quantity of data transmission failures or the quantity of NACKs received or sent in the period of time is less than or equal to (or less than) the preset threshold #5, the first communications apparatus determines that the first channel learning model is applicable.

For example, if the period of time is 10 s, and the preset threshold #5 is 5, when determining that the quantity of data transmission failures or the quantity of NACKs received or sent in the 10 s is greater than 5, the first communications apparatus determines that the first channel learning model is not applicable.

Optionally, the data transmission performance may alternatively refer to at least one of a throughput, a throughput rate, spectral efficiency, and other performance. For example, when the data transmission performance is less than (or less than or equal to) a preset threshold #6, the first communications apparatus may determine that the first channel learning model is not applicable. The preset threshold #6 may be predefined in a protocol, may be indicated by the second communications apparatus to the first communications apparatus, or may be preconfigured. This is not limited in this embodiment of this application.

In this implementation, the first communications apparatus may determine, based on the data transmission performance, whether the first channel learning model is applicable, in other words, may determine, without performing channel learning model training, whether the first channel learning model is applicable, thereby reducing processing complexity of the first communications apparatus. In addition, in this manner of determining, based on the data transmission performance, whether the first channel learning model is applicable, accuracy of the first channel learning model is measured by using final communication performance, and therefore communication performance based on the first channel learning model can be ensured, in other words, this manner helps improve communication performance.

In still another implementation, when the first communications apparatus is a terminal device, the first communications apparatus may determine, based on whether a scenario changes, whether the first channel learning model is applicable. The scenario may be at least one of the following: an indoor still scenario, an outdoor still scenario, a low-speed moving scenario, a high-speed moving scenario, a suburban scenario, an urban scenario, a macro base station, a micro base station, a vehicle-mounted scenario, a V2X scenario, a scenario defined in a 3GPP protocol, and the like.

Different scenarios may correspond to different channel environments, and consequently the first channel learning model is not applicable. For example, in some scenarios, a channel between the first communications apparatus and the second communications apparatus is a direct path; while in some scenarios, a channel between the first communications apparatus and the second communications apparatus is a non-direct path. For another example, in some scenarios, there are a relatively small quantity of reflectors between the first communications apparatus and the second communications apparatus, and correspondingly, there is a simple channel between the first communications apparatus and the second communications apparatus; while in some scenarios, there are a relatively large quantity of reflectors between the first communications apparatus and the second communications apparatus, and correspondingly, there is a complex channel between the first communications apparatus and the second communications apparatus.

Therefore, when the scenario in which the first communications apparatus is located changes, the first channel learning model may not be applicable. For example, if the first communications apparatus moves from an indoor scenario to an outdoor scenario, the first communications apparatus may determine that the first channel learning model is not applicable. For another example, if the first communications apparatus moves from a macro base station to a micro base station, the first communications apparatus may determine that the first channel learning model is not applicable.

In this implementation, the first communications apparatus may determine, based on the scenario, whether the first channel learning model is applicable, in other words, determine, without performing channel learning model training, whether the first channel learning model is applicable, thereby reducing processing complexity of the first communications apparatus. In addition, in this manner of determining, based on the scenario, whether the first channel learning model is applicable, the first communications apparatus may independently determine, without depending on assistance of the second communications apparatus, whether the first channel learning model is applicable. Therefore, this manner is simple and convenient.

Optionally, when the first communications apparatus is a network device, and the second communications apparatus is a terminal device, the first communications apparatus may determine, based on whether a scenario in which the second communications apparatus is located changes, whether the first channel learning model is applicable. Optionally, in this case, the first communications apparatus may further receive scenario information sent by the second communications apparatus.

In still another implementation, the first communications apparatus may determine, based on a performance indicator of the first channel learning model, whether the first channel learning model is applicable.

The first communications apparatus may determine, based on a difference or a similarity between the target channel information and the first channel information, whether the first channel learning model is applicable. For example, the first communications apparatus may compress the target channel information based on the first channel learning model, to obtain the first channel information, and compare features of the target channel information and the first channel information, to determine an error of the first channel learning model, so as to determine whether the first channel learning model is applicable.

For example, the first communications apparatus may determine, based on whether the performance indicator of the first channel learning model is less than a second preset threshold, whether the first channel learning model is applicable. The second preset threshold may be predefined in a protocol, may be indicated by the second communications apparatus to the first communications apparatus, or may be preconfigured. This is not limited in this embodiment of this application.

In an example, the performance indicator of the first channel learning model is continuity (CT). A value of CT is used to measure whether a relative distance relationship can be maintained after a high-dimensional data point is mapped to space of a low-dimensional data point.

If a set of $K_1$ nearest neighbor points of a data point $u_i$ in the target channel information is $U_i^{K_1}=\{u_{i,1}, u_{i,2}, u_{i,3}, \ldots, u_{i,K_1}\}$, the data point $u_i$ in the target channel information is mapped to a data point $v_i$ in the first channel information, and a set of $K_1$ nearest neighbor points of $v_i$ is $V_i^{K_1}=\{v_{i,1}, v_{i,2}, v_{i,3}, \ldots, v_{i,K_1}\}$, CT represents whether a ranking of a mapping point $v_{i,k}$ of $u_{i,k}$ in $V_i^{K_1}$ is the same as a ranking of $u_{i,k}$ in $U_i^{K_1}$. CT may be expressed by using a formula (1):

$$CT(K_1) = 1 - \frac{2}{LK_1(2L - 3K_1 - 1)}\Sigma_{i=1}^{L}\Sigma_{k \in V_i^{K_1}(u_i)}(\hat{r}(i, k) - K_1), \quad (11)$$

where k represents that the ranking of the data point $u_{i,k}$ in the set $U_i^{K_1}$ of $u_i$ is k, $V_i^{K_i}(u_i)$ represents a data point set of the set of $K_1$ nearest neighbor points of $u_i$ in mapping space (however, a point in this set is not necessarily in a set that is of $K_1$ nearest neighbor points of $v_i$ corresponding to $u_i$ and that is in the mapping space), $\hat{r}(i,k)$ represents the ranking of the mapping point $v_{i,k}$ of the data point $u_{i,k}$ in the set $V_i^{K_1}$ of $v_i$, and L is a quantity of data points.

The value of CT ranges from 0 to 1. If the value of CT is relatively small, it indicates that a neighbor point in the target channel information (high-dimensional data point) is not a neighbor point after being mapped to the first channel information (low-dimensional data point). In other words, in this case, an effective feature of the target channel information is not retained in the first channel information determined based on the first channel learning model. Therefore, performance of the first channel learning model is poor, in other words, the first channel learning model is not applicable. If the value of CT is relatively large (approximates to 1), it indicates that after a data point in the target channel information is mapped to the first channel information, a neighbor feature is retained. In other words, in this case, an effective feature of the target channel information is retained in the first channel information determined based on the first channel learning model. Therefore, performance of the first channel learning model is relatively good, in other words, the first channel learning model is applicable.

Therefore, when determining that the value of CT is greater than or equal to a preset threshold #7, the first communications apparatus may determine that the first channel learning model is applicable; or when determining that the value of CT is less than a preset threshold #7, determine that the first channel learning model is not applicable.

In another example, the performance indicator of the first channel learning model is trustworthiness (TW). A value of TW is used to measure whether a neighbor point in space of a high-dimensional data point is still a neighbor point after being mapped to space of a low-dimensional data point.

If a set of $K_1$ nearest neighbor points of a data point $u_i$ in the target channel information is $U_i^{K_1}=\{u_{i,1}, u_{i,2}, u_{i,3}, \ldots, u_{i,K_1}\}$, the data point $u_i$ in the target channel information is mapped to a data point $v_i$ in the first channel information, and a set of $K_1$ nearest neighbor points of $v_i$ is $V_i^{K_1}=\{v_{i,1}, v_{i,2}, v_{i,3}, \ldots, v_{i,K_1}\}$, TW represents whether a mapping point $v_{i,k}$ of $u_{i,k}$ in the set $U_i^{K_1}$ of $u_i$ still falls within the set $V_i^{K_1}$ of $v_i$. TW may be expressed by using a formula (2):

$$TW(K_1) = 1 - \frac{2}{LK_1(2L - 3K_1 - 1)}\Sigma_{i=1}^{L}\Sigma_{k \in U_i^{K_1}(v_i)}(r(i, k) - K_1), \quad (12)$$

where k represents that a ranking of the mapping point $v_{i,k}$ of the data point $u_{i,k}$ in the set $V_i^{K_1}$ of $v_i$ is k, $U_i^{K_1}(v_i)$ represents incorrect neighbor points, namely, points that fall within the set $V_i^{K_1}$ of $v_i$, but do not fall within the set $U_i^{K_1}$ of $u_i$, r(i,k) represents a ranking of the data point $u_{i,k}$ corresponding to the mapping point $v_{i,k}$ in the set $U_i^{K_1}$ of $u_i$, and L is a quantity of data points.

The value of TW ranges from 0 to 1. If the value of TW is relatively small, it indicates that a neighbor point in the first channel information (low-dimensional data point) is not a neighbor point in the target channel information (high-dimensional data point). In other words, in this case, an effective feature of the target channel information is not retained in the first channel information determined based on the first channel learning model. Therefore, performance of the first channel learning model is poor, in other words, the first channel learning model is not applicable. If the value of TW is relatively large (approximates to 1), it indicates that a data point in the first channel information is a neighbor point in the target channel information. In other words, in this case, an effective feature of the target channel information is retained in the first channel information determined based on the first channel learning model. Therefore, performance of the first channel learning model is relatively good, in other words, the first channel learning model is applicable.

Therefore, when determining that the value of TW is greater than or equal to a preset threshold #8, the first communications apparatus may determine that the first channel learning model is applicable; or when determining that the value of TW is less than a preset threshold #8, determine that the first channel learning model is not applicable.

In this implementation, the first communications apparatus may determine, based on the performance indicator of the first channel learning model, whether the first channel learning model is applicable, in other words, determine, by performing channel learning model training, whether the first channel learning model is applicable. In this manner, the first communications apparatus may determine, without depending on assistance of the second communications apparatus, whether the channel learning model is applicable. Therefore, this manner is simple and convenient.

For another example, the first communications apparatus may determine, based on an error between the target channel information and the second channel information, whether the first channel learning model is applicable.

Specifically, after determining the first channel information based on the first channel learning model and the target channel information, the first communications apparatus determines the second channel information based on the first channel information and the second channel learning model, and further determines, based on the error between the target channel information and the second channel information, whether the first channel learning model is applicable.

It should be understood that in this case, both the first channel learning model and the second channel learning model are deployed on a side of the first communications apparatus. For example, the first communications apparatus may predetermine a configuration parameter of the first channel learning model and a configuration parameter of the second channel learning model, and further determine the first channel learning model and the second channel learning model. For another example, the second communications apparatus may predetermine a configuration parameter of the first channel learning model and a configuration parameter of the second channel learning model, and further send the configuration parameter of the first channel learning model and the configuration parameter of the second channel learning model to the first communications apparatus. Correspondingly, the first communications apparatus determines the first channel learning model and the second channel learning model based on the configuration parameter of the first channel learning model and the configuration parameter of the second channel learning model.

Optionally, in this implementation, a solution in which the first communications apparatus determines whether the first channel learning model is applicable may also be applied to a case in which the first communications apparatus determines whether the first channel learning model and the second channel learning model are applicable, or may also be applied to a case in which the first communications apparatus determines whether the second channel learning model is applicable. Specifically, this is not limited in this application.

When the error between the target channel information and the second channel information is greater than or equal to a preset threshold #9, the first communications apparatus may determine that the first channel learning model is not applicable; or when the error between the target channel information and the second channel information is less than a preset threshold #9, determine that the first channel learning model is applicable.

A manner of calculating the error between the target channel information and the second channel information is not limited in this embodiment of this application.

In an example, the first communications apparatus may determine, based on a mean square error (MSE) between the target channel information and the second channel information, whether the first channel learning model is applicable.

If channel data that is between an $a_2{}^{th}$ transmit port and an $a_3{}^{th}$ receive port and that is obtained in a $t^{th}$ channel measurement is expressed as $h_{t,a_2,a_3}$ (an example of the target channel information), and channel data restored by the first communications apparatus based on the second channel learning model is expressed as $\hat{h}_{t,a_2,a_3}$ (an example of the second channel information), the error between the target channel information and the second channel information may be expressed as follows:

$$MSE = \frac{1}{T}\Sigma_{t=0}^{T-1}\Sigma_{a_2=0}^{A_2-1}\Sigma_{a_3=0}^{A_3-1}\left|h_{t,a_2,a_3} - \hat{h}_{t,a_2,a_3}\right|^2, \tag{13}$$

where

A$_2$ represents a quantity of transmit ports, and $0 \leq a_2 \leq A_2-1$; A$_3$ represents a quantity of receive ports, and $0 \leq a_3 \leq A_3-1$; and T represents a quantity of channel measurements, namely, a quantity of training samples, and $0 \leq t \leq T-1$.

Optionally, the MSE between the target channel information and the second channel information may alternatively be calculated by using the following formula:

$$MSE = \frac{1}{T}\Sigma_{t=0}^{T-1}\Sigma_{a_2=0}^{A_2-1}\Sigma_{a_3=0}^{A_3-1}\left|\bar{h}_{t,a_2,a_3} - \bar{\hat{h}}_{t,a_2,a_3}\right|^2; \tag{14}$$

$$MSE = \frac{1}{T}\sum_{t=0}^{T}\frac{\Sigma_{a_2=0}^{A_2-1}\Sigma_{a_3=0}^{A_3-1}\left|\bar{h}_{t,a_2,a_3} - \bar{\hat{h}}_{t,a_2,a_3}\right|^2}{A}; \tag{15}$$

or $$MSE = \frac{1}{T}\sum_{t=0}^{T}\frac{\left\|\bar{H}_t - \bar{\hat{H}}_t\right\|^2}{\left\|\bar{H}_t\right\|}, \tag{16}$$

where $\bar{h}_{t,a_2,a_3}$ (an example of the target channel information) represents data obtained after $h_{t,a_2,a_3}$ is normalized, for example, $\bar{h}_{t,a_2,a_3}$ is a modulus (or norm) of $h_{t,a_2,a_3}$ divided by a matrix $H_t$, $H_t$ represents a matrix that includes $h_{t,a_2,a_3}$ ($a_2=1, 2, \ldots,$ and $A_2-1$; and $a_3=1, 2, \ldots,$ and $A_3-1$), $\bar{H}_t$ (an example of the target channel information) represents a channel matrix that includes $\bar{h}_{t,a_2,a_3}$ ($a_2=1, 2, \ldots,$ and $A_2-1$; and $a_3=1, 2, \ldots,$ and $A_3-1$)

$\tilde{\bar{h}}_{t,a_2,a_3}$ (an example of the second channel information) represents data obtained after $\tilde{h}_{t,a_2,a_3}$ is normalized, for example, $\tilde{\bar{h}}_{t,a_2,a_3}$ is a modulus (or norm) of $\tilde{h}_{t,a_2,a_3}$ divided by a matrix $\tilde{H}_t$, $\tilde{H}_t$ represents a matrix that includes $\tilde{h}_{t,a_2,a_3}$ ($a_2$=1, 2, . . . , and $A_2$−1; and $a_3$=1, 2, . . . , and $A_3$−1), $\tilde{\bar{H}}_t$ (an example of the second channel information) represents a channel matrix that includes $\tilde{\bar{h}}_{t,a_2,a_3}$ ($a_2$=1, 2, . . . , and $A_2$−1; and $a_3$=1, 2, . . . , and $A_3$−1), "$\|\ \|$" represents a norm, and "$\|\ \|^2$" represents a square of a norm.

In another example, the first communications apparatus may determine, based on a normalized mean square error (NMSE) between the target channel information and the second channel information, whether the first channel learning model is applicable.

The NMSE between the target channel information and the second channel information may be calculated by using the following formula:

$$NMSE = \frac{1}{T}\sum_{t=0}^{T}\frac{\left\|\overline{H}_t - \tilde{\overline{H}}_t\right\|}{\|\overline{H}_t\|}; \tag{17}$$

$$NMSE = E\left\{\frac{1}{T}\sum_{t=0}^{T}\frac{\left\|\overline{H}_t - \tilde{\overline{H}}_t\right\|_2^2}{\|\overline{H}_t\|_2^2}\right\}; \tag{18}$$

or $$NMSE = \frac{1}{N}\left\{\frac{1}{T}\sum_{t=0}^{T}\frac{\left\|\tilde{H}_t \times \|H_t\|_F - H_t\right\|_F^2}{\|H_t\|_F^2}\right\}, \tag{19}$$

where

"$\|\ \|_F$" represents an F-norm.

In another example, the first communications apparatus may determine, based on a normalized mean correlation error (NMCE) between the target channel information and the second channel information, whether the first channel learning model is applicable.

The NMCE between the target channel information and the second channel information may be calculated by using the following formula:

$$NMCE = \left\|\frac{\tilde{H}^H\tilde{H}}{\left\|\tilde{H}^H\tilde{H}\right\|_F} - \frac{H^H H}{\left\|H^H H\right\|_F}\right\|_F, \tag{20}$$

where

H (an example of the target channel information) represents a channel matrix that includes $h_{a_2,a_3}$ ($a_2$=1, 2, . . . , and $A_2$−1; and $a_3$=1, 2, . . . , and $A_3$−1), $h_{a_2,a_3}$ represents channel data between an $a_2^{th}$ transmit port and an $a_3^{th}$ receive port, $\tilde{H}$ (an example of the second channel information) represents a channel matrix that includes $\tilde{h}_{a_2,a_3}$ ($a_2$=1, 2, . . . , and $A_2$−1; and $a_3$=1, 2, . . . , and $A_3$−1), and $\tilde{h}_{a_2,a_3}$ represents channel data restored by the first communications apparatus based on the second channel learning model.

In addition, it may be found, with reference to construction ideas of a Type I codebook and a Type II codebook in the conventional technology (for example, a 36-series protocol in an LTE protocol or a 38-series protocol in an NR protocols), that if a primary or secondary eigenvector of a correlation matrix $H^H H$ (or a right singular vector of H) of a real downlink channel is used as an estimation value of the downlink channel, very good performance can be achieved. In other words, a core of the channel learning model lies in characterization of an eigenvector of the correlation matrix of the downlink channel. Based on this, the following two forms of loss functions are provided. The loss function may be used as an indicator for measuring the first channel learning model.

In an example, the first communications apparatus may determine, based on a normalized mean correlation singular error (NMCSE) between the target channel information and the second channel information, whether the first channel learning model is applicable.

After singular value decomposition (SVD) is performed on H (an example of the target channel information), it may be obtained that $H=UDV^H$, where D is a singular value matrix of H, and U and V are orthogonal matrices. Therefore, it may be obtained that $H^H H=VD^H DV^H$. Further, the NMSCE may be expressed by using the following formula:

$$NMCSE = \left\|\frac{\hat{H}^H D^H D\hat{H}}{\left\|\hat{H}^H D^H D\hat{H}\right\|_F} - \frac{H^H H}{\left\|H^H H\right\|_F}\right\|_F. \tag{21}$$

In a more direct manner, a primary or secondary eigenvector of a target channel is used as a label (denoted as $H_{eig}$). In this case, the following form of loss function may be used:

$$NMCSE = \left\|\frac{\hat{H}^H D^H D\hat{H}}{\left\|\hat{H}^H D^H D\hat{H}\right\|_F} - \frac{H^H H}{\left\|H^H H\right\|_F}\right\|_F + \tag{22}$$

$$\left\|\frac{\hat{H}^H \hat{H}}{\left\|\hat{H}^H \hat{H}\right\|_F} - \frac{H_{eig}^H H_{eig}}{\left\|H_{eig}^H H_{eig}\right\|_F}\right\|_F;$$

or $$NMCSE = \left\|\frac{\hat{H}^H \hat{H}}{\left\|\hat{H}^H \hat{H}\right\|_F} - \frac{H_{eig}^H H_{eig}}{\left\|H_{eig}^H H_{eig}\right\|_F}\right\|_F. \tag{23}$$

Optionally, the first communications apparatus may determine, based on a correspondence between one or more of the foregoing measurement indicators of the channel learning model and an error threshold, whether the first channel learning model is applicable. For example, when performance of the measurement indicator is greater than or equal to a specific threshold, the first communications apparatus determines that the first channel learning model is not applicable; or when performance of the measurement indicator is less than a specific threshold, the first communications apparatus determines that the first channel learning model is applicable.

In this implementation, the first communications apparatus may determine, based on the error between the target channel information and the second channel information, whether the first channel learning model is applicable, in other words, determine, by performing channel learning model training, whether the first channel learning model is applicable. In this manner, the first communications apparatus may determine, without depending on assistance of the second communications apparatus, whether the channel learning model is applicable. Therefore, this manner is simple and convenient. In addition, whether the first channel learning model is applicable is determined in consideration of features of both the target channel information and the second channel information. Therefore, it can be ensured that the first communications apparatus and the second communications apparatus obtain same or similar features of channel information, to help improve data transmission performance when data transmission is subsequently performed by using the channel information.

S220. The first communications apparatus sends the first message, where the first message is used to indicate whether the first channel learning model is applicable. Correspondingly, in S220, the second communications apparatus receives the first message, and determines, based on the first message, whether the first channel learning model is applicable.

When the first communications apparatus determines that the first channel learning model is not applicable, the first communications apparatus sends the first message. The first message is used to indicate that the first channel learning model is not applicable.

Correspondingly, the second communications apparatus receives the first message. When the first message is used to indicate that the first channel learning model is not applicable, the second communications apparatus may determine, based on the first message, that the first channel learning model is not applicable.

It may be understood that the first channel learning model corresponds to the second channel learning model, and when determining, based on the first message, that the first channel learning model is not applicable, the second communications apparatus may further determine that the second channel learning model is not applicable.

Optionally, the first communications apparatus may send the first message when determining that the first channel learning model is not applicable.

A manner in which the first message indicates that the first channel learning model is not applicable is not limited in this embodiment of this application.

In an example, the first message may be a Boolean (bool) variable. For example, when the first message is 0, it indicates that the first channel learning model is not applicable; or when the first message is 1, it indicates that the first channel learning model is applicable. For another example, when the first message is 0, it indicates that the first channel learning model is applicable; or when the first message is 1, it indicates that the first channel learning model is not applicable. Correspondingly, the second communications apparatus may determine, based on a value of the first message, whether the first channel learning model is applicable.

In another example, the first message may be channel learning feedback signaling, and the first message may include channel information. The first communications apparatus sends the first message to the second communications apparatus. Correspondingly, the second communications apparatus may determine, based on the channel information in the first message, whether the first channel learning model is applicable. Optionally, the channel information may include at least one of the following: a rank value, a CQI value, and a CRI value.

For example, the first message may include the rank value. When the rank value is 0, it indicates that the first channel learning model is not applicable. Correspondingly, the second communications apparatus may determine, based on the rank value in the first message, whether the first channel learning model is applicable.

Currently, the rank value fed back by the first communications apparatus may range from 1 to R, and R is a positive integer, for example, R=8. A bit quantity of a rank field may be determined based on a maximum quantity of layers supported by the first communications apparatus and a quantity of antenna ports. For example, the bit quantity of the rank field is obtained by rounding up $\log_2$(min(quantity of layers, quantity of antenna ports)), for example, by rounding up $\log_2$(R). For example, if the first communications apparatus supports a maximum of four layers, the rank value may range from 1 to 4, and the rank value may be indicated by using 2 bits. For another example, if the quantity of antenna ports is 8, and the first communications apparatus supports a maximum of four layers, the rank value may range from 1 to 4, and the rank value may be indicated by using 2 bits.

In this embodiment of this application, the rank value may range from 0 to R, and therefore in comparison with existing rank values, a case in which the rank value is 0 is added, and a bit quantity calculated based on an existing method for calculating the bit quantity of the rank field is insufficient to indicate different rank values. In this case, the bit quantity of the rank field may be obtained by rounding up $\log_2$(min (quantity of layers, quantity of antenna ports)+1), for example, by rounding up $\log_2$(R+1). For example, if the first communications apparatus supports a maximum of four layers, the rank value may range from 0 to 4, and the rank value may be indicated by using 3 bits. For example, "000" is used to indicate a rank value 0, "001" is used to indicate a rank value 1, "010" is used to indicate a rank value 2, "100" is used to indicate a rank value 3, and "101" is used to indicate a rank value 4. When the rank value is 0, it indicates that the first channel learning model is not applicable.

For another example, the first message may include the channel quality indicator (channel quality index, CQI) value. When the CQI value is 0, it indicates that the first channel learning model is not applicable. Correspondingly, the second communications apparatus may determine, based on the CQI value in the first message, whether the first channel learning model is applicable.

For another example, the first message may include the channel state information reference signal resource index (CRI) value. When the CRI value is 0, it indicates that the first channel learning model is not applicable. Correspondingly, the second communications apparatus may determine, based on the CRI value in the first message, whether the first channel learning model is applicable.

Currently, the CRI value fed back by the first communications apparatus corresponds to a quantity of resources used to send a reference signal. For example, if the quantity of resources used to send the reference signal is C, where C is a positive integer, the CRI value may range from 1 to C. A bit quantity of a CQI field may be determined based on a configured quantity of resources for the reference signal. For example, the bit quantity of the CRI field is obtained by rounding up $\log_2$(C). For example, if the configured quantity of resources for the reference signal is 2, the CRI value may range from 1 to 2, and the CRI value may be indicated by using 1 bit.

In this embodiment of this application, the CRI value may range from 0 to C, and therefore in comparison with existing CRI values, a case in which the CRI value is 0 is added, and a bit quantity calculated based on an existing method for calculating the bit quantity of the CRI field is insufficient to indicate different CRI values. In this case, the bit quantity of the CRI field may be obtained by rounding up $\log_2$(C+1). For example, if the configured quantity of resources for the reference signal is 2, the CRI value may range from 0 to 2, and the CRI value may be indicated by using 2 bits. For example, "00" is used to indicate a CRI value 0, "01" is used to indicate a CRI value 1, and "10" is used to indicate a CRI value 2. When the CRI value is 0, it indicates that the first channel learning model is not applicable.

In still another example, the first message may include the variation of the long-term statistical characteristic of the target channel. When the variation indicated in the first message is greater than or equal to the first preset threshold, it indicates that the first channel learning model is not applicable.

Optionally, the first communications apparatus may report the variation of the long-term statistical characteristic of the target channel in a differential reporting manner. For example, the first communications apparatus may report a differential value in a differential report in the first message. Correspondingly, the second communications apparatus may determine an offset level between the reported variation and a reference variable based on the differential value and the differential report; further, the second communications apparatus may determine the reported variation based on the offset level and the reference variable; and further, when determining that the variation is greater than or equal to the first preset threshold, the second communications apparatus may determine that the first channel learning model is not applicable. Table 6 shows an example of the differential report. For example, the differential value may be one or more rows in the following table. A correspondence in the following table may be predefined in a protocol, or may be notified by the second communications apparatus to the first communications apparatus by using signaling. Specifically, this is not limited in this embodiment of this application.

TABLE 6

| Differential value (differential value) | Offset level (offset level) |
|---|---|
| 0 | 0 |
| 1 | 1 |
| 2 | $\geq 2$ |
| 3 | $\leq -1$ |

Optionally, the first communications apparatus may report an absolute value of the variation of the long-term statistical characteristic of the target channel in the first message. Correspondingly, the second communications apparatus may determine the reported variation based on the reported absolute value; and further, when determining that the variation is greater than or equal to the first preset threshold, the second communications apparatus may determine that the first channel learning model is not applicable.

Optionally, the first communications apparatus may report the variation of the long-term statistical characteristic of the target channel by reporting a relative value. For example, the first communications apparatus may report a relative value in a relative value report in the first message. Correspondingly, the second communications apparatus may determine an offset level between the reported variation and a reference variable based on the relative value and the relative value report; further, the second communications apparatus may determine the reported variation based on the offset level and the reference variable; and further, when determining that the variation is greater than or equal to the first preset threshold, the second communications apparatus may determine that the first channel learning model is not applicable. Table 7 shows an example of the relative value report. For example, the relative value may be one or more rows in the following table. A correspondence in the following table may be predefined in a protocol, or may be notified by the second communications apparatus to the first communications apparatus by using signaling. Specifically, this is not limited in this embodiment of this application.

TABLE 7

| Relative value | Offset level |
|---|---|
| 0 | 1 |
| 1 | 1/2 |
| 2 | 1/4 |
| 3 | 2 |

In still another example, the first communications apparatus sends the first message on a specific resource, to indicate that the first channel learning model is not applicable. Correspondingly, the second communications apparatus may determine, based on the resource for receiving the first message, whether the first channel learning model is applicable.

For example, when the first communications apparatus sends the first message on the physical uplink shared channel (PUSCH)/physical downlink shared channel (PDSCH), it indicates that the first channel learning model is not applicable; or when the first communications apparatus sends the first message on the physical uplink control channel (PUCCH)/physical downlink shared channel (PDCCH), it indicates that the first channel learning model is applicable. For another example, when the first communications apparatus sends the first message on the PUSCH/PDSCH, it indicates that the first channel learning model is applicable; or when the first communications apparatus sends the first message on the PUCCH/PDCCH, it indicates that the first channel learning model is not applicable.

For another example, when the first communications apparatus sends the first message on the resource 1, it indicates that the first channel learning model is applicable; or when the first communications apparatus sends the first message on the resource 2, it indicates that the first channel learning model is not applicable.

For another example, when a size of the resource occupied by the first communications apparatus to send the first message is X resource units, it indicates that the first channel learning model is applicable; or when a size of the resource occupied by the first communications apparatus to send the first message is Y resource units, it indicates that the first channel learning model is not applicable. The resource unit may refer to a resource element (RE), a symbol, or a resource block (RB). Herein, X is a positive integer, or X may alternatively refer to a specific range. For example, X ranges from $X_1$ to $X_2$, or is greater than $X_1$ or less than $X_2$, where $X_1$ and $X_2$ are positive integers. Herein, Y is a positive integer, or Y may alternatively refer to a specific range. For example, Y ranges from $Y_1$ to $Y_2$, or is greater than $Y_1$ or less than $Y_2$, where $Y_1$ and $Y_2$ are positive integers.

Table 8 shows an example of a correspondence between different resources used to send the first message and whether the first channel learning model is applicable. For example, the correspondence may be one or more rows in the following table. A correspondence in the following table may be predefined in a protocol, or may be notified by the second communications apparatus to the first communications apparatus by using signaling. Specifically, this is not limited in this embodiment of this application.

TABLE 8

| Scenario | | |
|---|---|---|
| Resource information, Correspondence | The first channel learning model is applicable | The first channel learning model is not applicable |
| 0 | Resource 1 | Resource 2 |
| 1 | Resources 1 to 4 | Resources 5 to 8 |
| 2 | Resource corresponding to a quantity of REs that falls within a range 1 | Resource corresponding to a quantity of REs that falls within a range 2 |
| 3 | Resource corresponding to a quantity of symbols that falls within a range 3 | Resource corresponding to a quantity of symbols that falls within a range 4 |
| 4 | Resource corresponding to a quantity of RBs that falls within a range 5 | Resource corresponding to a quantity of RBs that falls within a range 6 |

In still another example, the first communications apparatus indicates, by using a bit quantity of the first message, that the first channel learning model is not applicable. Correspondingly, the second communications apparatus may determine, based on the bit quantity of the first message, whether the first channel learning model is applicable.

For example, if the bit quantity of the first message sent by the first communications apparatus is Z, it indicates that the first channel learning model is not applicable; and if the bit quantity of the first message sent by the first communications apparatus is $W_3$, it indicates that the first channel learning model is applicable. Herein, Z is a positive integer, or Z may alternatively refer to a specific range. For example, Z ranges from $Z_1$ to $Z_2$, Z is greater than $Z_1$, or Z is less than $Z_2$, where $Z_1$ and $Z_2$ are positive integers. Herein, $W_3$ is a positive integer, or W may alternatively refer to a specific range. For example, W is $W_3$, W is greater than $W_{3,1}$, or W is less than $W_{3,2}$, where $W_{3,1}$ and $W_{3,2}$ are positive integers.

For example, when the bit quantity of the first message sent by the first communications apparatus is 20 bits, it indicates that the first channel learning model is not applicable; or when the bit quantity of the first message sent by the first communications apparatus is 10 bits, it indicates that the first channel learning model is applicable.

For another example, when the bit quantity of the first message sent by the first communications apparatus is greater than 10 bits, it indicates that the first channel learning model is not applicable; or when the bit quantity of the first message sent by the first communications apparatus is less than 10 bits, it indicates that the first channel learning model is applicable.

Table 9 shows an example of a correspondence between the bit quantity of the first message and whether the first channel learning model is applicable. For example, the correspondence may be one or more rows in the following table. A correspondence in the following table may be predefined in a protocol, or may be notified by the second communications apparatus to the first communications apparatus by using signaling. Specifically, this is not limited in this application.

TABLE 9

| Scenario | | |
|---|---|---|
| Bit quantity of the first message Correspondence | The first channel learning model is applicable | The first channel learning model is not applicable |
| 0 | Bit quantity of the first message is Z | Bit quantity of the first message is W |
| 1 | Bit quantity of the first message is Z' | Bit quantity of the first message is W' |
| 2 | Bit quantity of the first message is Z" | Bit quantity of the first message is W" |
| 3 | Bit quantity of the first message is Z''' | Bit quantity of the first message is W'''' |

Definitions of W', W", and W''' are similar to that of $W_3$, and definitions of Z', Z", and Z''' are similar to that of Z. For brevity, details are not described in this embodiment of this application.

Optionally, the first communications apparatus may further determine, based on the bit quantity of the first message, a resource for sending the first message. Correspondingly, the second communications apparatus may determine the resource of the first message based on the bit quantity of the first message.

For example, when the bit quantity of the first message is Z, the first communications apparatus determines that an identifier of the resource occupied to send the first message is the resource 1. For another example, when the bit quantity of the first message is $W_3$, the first communications apparatus determines that an identifier of the resource occupied to send the first message is the resource 1.

For example, when the bit quantity of the first message is 20 bits, the first communications apparatus determines that an identifier of the resource occupied to send the first message is the resource 1; or when the bit quantity of the first message is 10 bits, the first communications apparatus determines that an identifier of the resource occupied to send the first message is the resource 2.

For another example, when the bit quantity of the first message is greater than 10 bits, the first communications apparatus determines that an identifier of the resource occupied to send the first message is the resource 1; or when the bit quantity of the first message is less than 10 bits, the first communications apparatus determines that an identifier of the resource occupied to send the first message is the resource 2.

For another example, when the bit quantity of the first message is Z, the first communications apparatus determines that a size of the resource occupied to send the first message is X resource units; or when the bit quantity of the first message is $W_3$, the first communications apparatus determines that a size of the resource occupied to send the first message is Y resource units.

Table 10 shows an example of a correspondence between the bit quantity of the first message and the resource for sending the first message. For example, the correspondence may be one or more rows in the following table. A correspondence in the following table may be predefined in a protocol, or may be notified by the second communications apparatus to the first communications apparatus by using signaling. Specifically, this is not limited in this application.

TABLE 10

| | Scenario | |
| Resource information Correspondence | Bit quantity of the first message is Z | Bit quantity of the first message is $W_3$ |
| --- | --- | --- |
| 0 | Resource 1 | Resource 2 |
| 1 | Resources 1 to 4 | Resources 5 to 8 |
| 2 | Resource corresponding to a quantity of REs that falls within a range 1 | Resource corresponding to a quantity of REs that falls within a range 2 |
| 3 | Resource corresponding to a quantity of symbols that falls within a range 3 | Resource corresponding to a quantity of symbols that falls within a range 4 |
| 4 | Resource corresponding to a quantity of RBs that falls within a range 5 | Resource corresponding to a quantity of RBs that falls within a range 6 |

In still another example, the first communications apparatus indicates, by using content in the first message, that the first channel learning model is not applicable. Correspondingly, the second communications apparatus may determine, based on the content in the first message, whether the first channel learning model is applicable.

Table 11 shows an example of a correspondence between the content in the first message and whether the first channel learning model is applicable. For example, the correspondence may be one or more rows in the following table. A correspondence in the following table may be predefined in a protocol, or may be notified by the second communications apparatus to the first communications apparatus by using signaling. Specifically, this is not limited in this application.

TABLE 11

| | Scenario | |
| Content in the first message Correspondence | The first channel learning model is applicable | The first channel learning model is not applicable |
| --- | --- | --- |
| 0 | Rank, CQI, and first channel information | Rank and CQI |
| 1 | CQI and first channel information | CQI |
| 2 | First channel information | Rank |
| 3 | First channel information | Rank and CQI |
| 4 | CQI and first channel information | Rank |

As shown in Table 11, if the first message includes the rank value, the CQI, and the first channel information, it indicates that the first channel learning model is applicable; if the first message includes the rank value and the CQI, it indicates that the first channel learning model is not applicable; if the first message includes the CQI and the first channel information, it indicates that the first channel learning model is applicable; if the first message includes the CQI, it indicates that the first channel learning model is not applicable; if the first message includes the first channel information, it indicates that the first channel learning model is applicable; if the first message includes the rank value, it indicates that the first channel learning model is not applicable; if the first message includes the CQI and the first channel information, it indicates that the first channel learning model is applicable; or if the first message includes the rank value, it indicates that the first channel learning model is not applicable.

Optionally, when the first communications apparatus determines that the first channel learning model is applicable, the first communications apparatus may feed back the first channel information in a differential reporting manner. When the first channel learning model is applicable, a value range of the first channel information determined by the first communications apparatus based on the first channel learning model and the target channel information is relatively stable. Therefore, a difference between a currently determined value of the first channel information and a previously determined value of the first channel information may be fed back, to reduce feedback overheads.

Optionally, the first message further includes one or more configuration parameters used to update the second channel learning model. Correspondingly, the second communications apparatus may update the second channel learning model based on the first message. The one or more configuration parameters may include at least one of the following: a type of the model, a structure of the model, an algorithm of the model, a weight vector of the model, a weight matrix of the model, a bias vector of the model, a bias matrix of the model, and an activation function of the model. Optionally, the first message may further include one or more configuration parameters used to update the first channel learning model.

Optionally, the one or more configuration parameters used to update the first channel learning model may alternatively be sent by using another message. The another message is different from the first message. Specifically, this is not limited in this embodiment of this application.

The type of the model includes a machine learning algorithm, a neural network model, or an auto-encoder model.

For example, when the channel learning model is a machine learning algorithm, the configuration parameter may include the algorithm of the model that is used to indicate a specific machine learning algorithm that is the channel learning model.

For another example, when the channel learning model is a neural network model, the configuration parameter may include the structure of the model that is used to indicate a specific neural network that is the channel learning model. The structure of the model may further include one or more of a quantity of dimensions of an input layer, a quantity of dimensions of an output layer, a quantity of hidden layers, a quantity of neurons at the hidden layer, a training algorithm, and a loss function. The configuration parameter may include one or more of a transformation algorithm, a weight matrix, a weight vector, a bias vector, a bias matrix, and an activation function.

For still another example, when the channel learning model is a convolutional neural network model, the configuration parameter may include the structure of the model that is used to indicate quantities of layers and/or a sequence of the layers. The configuration parameter may further include one or more of the following: a parameter (a preprocessing operation algorithm, a quantity of dimensions of input data, or a value range of input data) for an input layer, a parameter (a size of an input unit, a receptive field, a stride, a quantity of zeros added, a depth, a depth of an output unit, or a weight matrix) for a convolutional layer, a parameter (an activation function) for a rectified linear unit layer, a parameter (a pooling algorithm, a spatial extent, a stride, a size of an input unit, or a size of an output unit) for a pooling layer, and a parameter (a weight matrix, a weight vector, a bias matrix, or a bias vector) for a fully connected layer.

When determining that the first channel learning model is not applicable, the first communications apparatus may determine a new first channel learning model and a new second channel learning model, in other words, determine the one or more configuration parameters used to update the first channel learning model and the one or more configuration parameters used to update the second channel learning model, and send the one or more configuration parameters used to update the second channel learning model to the second communications apparatus, to update the previous second channel learning model. Therefore, one or more configuration parameters of the new second channel learning model may be considered as the one or more configuration parameters used to update the previous second channel learning model. Optionally, the first communications apparatus may send one or more configuration parameters that are in configuration parameters of the new second channel learning model and that are different from those of the previous second channel learning model to the second communications apparatus, to update the previous second channel learning model.

Optionally, when determining that the first channel learning model is not applicable, the first communications apparatus may determine a new second channel learning model, in other words, determine the one or more configuration parameters used to update the second channel learning model, and send the one or more configuration parameters of the new second channel learning model to the second communications apparatus, to update the previous second channel learning model.

A manner in which the first communications apparatus determines the one or more configuration parameters used to update the first channel learning model and/or the one or more configuration parameters used to update the second channel learning model is not limited in this embodiment of this application. In other words, a manner in which the first communications apparatus determines the first channel learning model and/or the second channel learning model is not limited in this embodiment of this application. A manner in which the first communications apparatus determines the first channel learning model and/or the second channel learning model is provided in the following embodiments. The manner in which the first communications apparatus determines the channel learning model may be used as an independent embodiment, or may be combined with another embodiment. Specifically, this is not limited in this embodiment of this application. The following one or more manners of determining the channel learning model may be used independently or jointly. Specifically, this is not limited in this embodiment of this application.

In an example, the first communications apparatus may determine the first channel learning model and/or the second channel learning model based on the first parameter.

The first parameter includes at least one of the following: a cell identifier of a cell in which a terminal device is located, a scenario in which the terminal device is located, a type of the terminal device, and a geographical location in which the terminal device is located.

Optionally, when the first communications apparatus is a terminal device, the first communications apparatus may determine the first parameter based on a cell, a scenario, or a geographical location in which the first communications apparatus is located, or a type of the first communications apparatus.

Optionally, when the first communications apparatus is a network device, and the second communications apparatus is a terminal device, the first communications apparatus may receive information that is related to the first parameter and that is sent by the second communications apparatus, and determine the first parameter.

The scenario in which the terminal device is located may be an indoor scenario, an outdoor scenario, a suburban scenario, an urban scenario, an external environment (for example, in the daytime, in the evening, a sunny day, a cloudy day, smooth traffic, or traffic congestion), or the like. For example, when the terminal device is located in the indoor scenario, the first communications apparatus may determine a first channel learning model and/or a second channel learning model corresponding to the indoor scenario, and further determine one or more configuration parameters used to update the first channel learning model and/or one or more configuration parameters used to update the second channel learning model.

The type of the terminal device may be a quantity of antenna ports, a processing capability, or the like of the terminal device.

Figure 11:
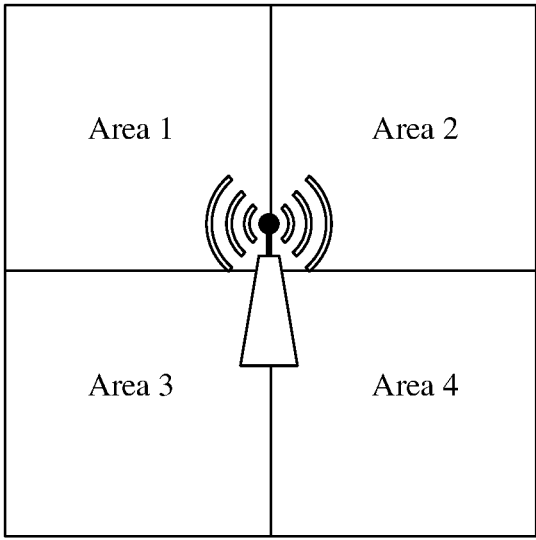
FIG. 11 is a schematic diagram of a location in which a terminal device is located.

The geographical location in which the terminal device is located may be three-dimensional coordinates, two-dimensional coordinates, positioning data, or the like. As shown in FIG. 11, if the geographical location in which the terminal device is located is an area 1, the first communications apparatus may determine a first channel learning model and/or a second channel learning model corresponding to the area 1, and determine one or more configuration parameters used to update the first channel learning model and/or one or more configuration parameters used to update the second channel learning model; or if the geographical location in which the terminal device is located is an area 2, the first communications apparatus may determine a first channel learning model and/or a second channel learning model corresponding to the area 2, and determine one or more configuration parameters used to update the first channel learning model and/or one or more configuration parameters used to update the second channel learning model.

Optionally, when the first communications apparatus is a network device, the one or more configuration parameters used to update the first channel learning model and/or the one or more configuration parameters used to update the second channel learning model that are sent by the first communications apparatus to the second communications apparatus may be at a terminal level, a cell level, or a terminal group level. The terminal level is used as an example. In this case, the first communications apparatus sends the one or more configuration parameters used to update the first channel learning model and/or the one or more configuration parameters used to update the second channel learning model to each second communications apparatus in a unicast manner. The cell level is used as an example. In this case, the first communications apparatus sends the one or more configuration parameters used to update the first channel learning model and/or the one or more configuration parameters used to update the second channel learning model to a plurality of second communications apparatuses in a cell in a broadcast manner. The terminal group level is used as an example. In this case, the first communications apparatus sends the one or more configuration parameters used to update the first channel learning model and/or the one or more configuration parameters used to update the second channel learning model to a plurality of second communications apparatuses in a terminal group in a broadcast or multicast manner.

Specifically, the first communications apparatus may determine the first channel learning model and the second channel learning model based on the first parameter from a configuration parameter set stored in a database #1.

The database #1 may be a database that stores information or data related to the channel learning model. For example, the database #1 may store the configuration parameter of the channel learning model.

The database #1 may be a local database in the first communications apparatus, or may be a database stored at a higher layer.

For example, the database #1 is a database stored at the higher layer. The database stored at the higher layer may be a database stored in a mobility management unit, a core network, a cloud, a central manager, an operator system, a first communications apparatus group management system, or a data center. In this case, the first communications apparatus may perform communication interaction with the higher layer, and determine the configuration parameter of the channel learning model from the database stored at the higher layer. For example, the first communications apparatus may download the configuration parameter of the channel learning model from the database at the higher layer based on the first parameter, and/or read, based on the first parameter, the configuration parameter of the channel learning model stored in the database, and further determine the first channel learning model and/or the second channel learning model. For another example, the first communications apparatus may receive the configuration parameter that is of the channel learning model and that is sent by a higher layer network element, and further determine the first channel learning model and/or the second channel learning model.

For example, the database #1 is a local database stored in the first communications apparatus. The first communications apparatus may download the configuration parameter of the channel learning model from the local database, and/or read the configuration parameter of the channel learning model stored in the database, and further determine the first channel learning model and/or the second channel learning model.

The configuration parameter of the channel learning model stored in the local database in the first communications apparatus may be preconfigured, or may be determined by the side of the first communications apparatus through training and learning and stored in the local database. Before applying the channel learning model, the first communications apparatus may determine the channel learning model from the local database based on the first parameter.

In this implementation, the first communications apparatus may determine the first channel learning model and/or the second channel learning model based on the first parameter, and further determine the configuration parameter used to update the second channel learning model, in other words, may determine a new channel learning model without performing channel learning model training, thereby reducing processing complexity of the first communications apparatus.

In another example, the first communications apparatus may train the first channel learning model and the second channel learning model, to obtain the first channel learning model and the second channel learning model, and further determine the one or more configuration parameters used to update the first channel learning model and/or the one or more configuration parameters used to update the second channel learning model.

A manner in which the first communications apparatus trains the first channel learning model and the second channel learning model may be:

(1) obtaining the target channel information based on a received reference signal;

(2) determining the first channel information based on the target channel information and the first channel learning model;

(3) determining the second channel information based on the first channel information and the second channel learning model;

(4) calculating the error between the second channel information and the target channel information;

(5) calculating a loss function based on the obtained error, calculating gradient information by using the loss function, and back-propagating the gradient information; and (6) updating the first channel learning model and the second channel learning model by using a gradient descent method.

After the first channel learning model and the second channel learning model are updated, if a value of the loss function is less than a preset threshold #10, the gradient information is used as the one or more configuration parameters used to update the second channel learning model, and is sent to the second communications apparatus.

If the value of the loss function is greater than or equal to the preset threshold #10, the first communications apparatus continues to train the first channel learning model and the second channel learning model based on the foregoing method, until the value of the loss function is less than the preset threshold #10. Further, a plurality of pieces of gradient information obtained in a plurality of training processes are accumulated, are used as the one or more configuration parameters used to update the second channel learning model, and are sent to the second communications apparatus.

Specifically, a training parameter used by the first communications apparatus to train the channel learning model may be preconfigured, or may be determined based on indication information from the second communications apparatus.

Optionally, when there are a plurality of configuration parameters used to update the channel learning model, the first communications apparatus may determine all of the plurality of configuration parameters by using a same method, or may determine all of the plurality of configuration parameters by using different methods.

Optionally, the first communications apparatus may determine, in a one-level manner or a multi-level manner, the configuration parameter used to update the channel learning model. The one-level manner is used as an example. In this case, the first communications apparatus may determine, by using one or more of the foregoing methods, the configuration parameter used to update the channel learning model. The multi-level manner is used as an example. In this case, the first communications apparatus may first determine, by using one or more of the foregoing methods, some configuration parameters used to update the channel learning model, and then determine, by using one or more of the foregoing methods, the other configuration parameters used to update the channel learning model. For example, the first communications apparatus determines a structure of the channel learning model from the database at the higher layer based on the first parameter, then determines a quantity of dimensions, an operation, and/or a function of the channel learning model from the local database based on the first parameter, and finally determines a variable of the channel learning model based on information that is related to the configuration parameter and that is from the second communications apparatus.

Optionally, if S230 in the method 200 is performed, the resource used to transmit the first message, the content in the first message, or the manner of sending the first message may be indicated in the first indication information. If S230 in the method 200 is not performed, the resource used to transmit the first message, the content in the first message, or the manner of sending the first message may be preconfigured, so that the second communications apparatus can correctly receive the first message.

Optionally, after S220, the method 200 may further include: the second communications apparatus sends a second message, where the second message is used to indicate the one or more configuration parameters used to update the first channel learning model. Correspondingly, the first communications apparatus receives the second message, and updates the first channel learning model based on the second message.

After receiving the first message and determining, based on the first message, that the first channel learning model is not applicable, the second communications apparatus may determine a new first channel learning model and a new second channel learning model, in other words, determine the one or more configuration parameters used to update the first channel learning model and/or the one or more configuration parameters used to update the second channel learning model, and send one or more configuration parameters of the new first channel learning model to the first communications apparatus, to update the first channel learning model. Therefore, the one or more configuration parameters of the new first channel learning model may be considered as the one or more configuration parameters used to update the previous first channel learning model. Optionally, the second communications apparatus may send one or more configuration parameters that are in configuration parameters of the new first channel learning model and that are different from those of the previous first channel learning model to the first communications apparatus, to update the previous first channel learning model.

A manner in which the second communications apparatus determines the one or more configuration parameters used to update the first channel learning model and/or the one or more configuration parameters used to update the second channel learning model is not limited in this embodiment of this application. In other words, a manner in which the second communications apparatus determines the first channel learning model and/or the second channel learning model is not limited in this embodiment of this application. A method for determining, by the second communications apparatus, the first channel learning model and/or the second channel learning model is provided in the following embodiments. The method for determining, by the second communications apparatus, the channel learning model may be used as an independent embodiment, or may be combined with another embodiment. Specifically, this is not limited in this embodiment of this application. The following one or more methods for determining the channel learning model may be used independently or jointly. Specifically, this is not limited in this application.

In an example, the second communications apparatus may determine the first channel learning model and/or the second channel learning model based on the first parameter.

The first parameter includes at least one of the following: a cell identifier of a cell in which a terminal device is located, a scenario in which the terminal device is located, a type of the terminal device, and a geographical location in which the terminal device is located.

Optionally, when the second communications apparatus is a terminal device, the second communications apparatus may determine the first parameter based on a cell, a scenario, or a geographical location in which the second communications apparatus is located, or a type of the second communications apparatus.

Optionally, when the second communications apparatus is a network device, and the first communications apparatus is a terminal device, the second communications apparatus may receive information that is related to the first parameter and that is sent by the first communications apparatus, and determine the first parameter.

The scenario in which the terminal device is located may be an indoor scenario, an outdoor scenario, a suburban scenario, an urban scenario, an external environment (for example, in the daytime, in the evening, a sunny day, a cloudy day, smooth traffic, or traffic congestion), or the like. For example, when the terminal device is located in the indoor scenario, the second communications apparatus may determine a first channel learning model and/or a second channel learning model corresponding to the indoor scenario, and further determine one or more configuration parameters used to update the first channel learning model and/or one or more configuration parameters used to update the second channel learning model.

The type of the terminal device may be a quantity of antenna ports, a processing capability, or the like of the terminal device.

The geographical location in which the terminal device is located may be three-dimensional coordinates, two-dimensional coordinates, positioning data, or the like. As shown in FIG. 11, if the geographical location in which the terminal device is located is an area 1, the second communications apparatus may determine a first channel learning model and/or a second channel learning model corresponding to the area 1, and determine one or more configuration parameters used to update the first channel learning model and/or one or more configuration parameters used to update the second channel learning model; or if the geographical location in which the terminal device is located is an area 2, the second communications apparatus may determine a first channel learning model and/or a second channel learning model corresponding to the area 2, and determine one or more configuration parameters used to update the first channel learning model and/or one or more configuration parameters used to update the second channel learning model.

Optionally, when the second communications apparatus is a network device, the one or more configuration parameters that are used to update the first channel learning model and that are sent by the second communications apparatus to the first communications apparatus may be at a terminal level, a cell level, or a terminal group level. The terminal level is used as an example. In this case, the second communications apparatus sends the one or more configuration parameters used to update the first channel learning model and/or the one or more configuration parameters used to update the second channel learning model to each first communications apparatus in a unicast manner. The cell level is used as an example. In this case, the second communications apparatus sends the one or more configuration parameters used to update the second channel learning model and/or the one or more configuration parameters used to update the first channel learning model to a plurality of first communications apparatuses in a cell in a broadcast manner. The terminal group level is used as an example. In this case, the second communications apparatus sends the one or more configuration parameters used to update the second channel learning model and/or the one or more configuration parameters used to update the first channel learning model to a plurality of first communications apparatuses in a terminal group in a broadcast or multicast manner.

Specifically, the second communications apparatus may determine the first channel learning model and/or the second channel learning model based on the first parameter from a configuration parameter set stored in a database #2.

The database #2 may be a database that carries information or data related to the channel learning model. For example, the database #2 may store the configuration parameter of the channel learning model.

The database #2 may be a local database in the second communications apparatus, or may be a database stored at a higher layer.

For example, the database #2 is a database stored at the higher layer. The database stored at the higher layer may be a database stored in a mobility management unit, a core network, a cloud, a central manager, an operator system, a second communications apparatus group management system, or a data center. In this case, the second communications apparatus may perform communication interaction with the higher layer, and determine the configuration parameter of the channel learning model from the database at the higher layer. For example, the second communications apparatus may download the channel learning model from the database at the higher layer based on the first parameter, and/or read, based on the first parameter, the channel learning model stored in the database, and further determine the new first channel learning model and the new second channel learning model. For another example, the second communications apparatus may receive the configuration parameter that is of the channel learning model and that is sent by a higher layer network element, and further determine the new first channel learning model and the new second channel learning model.

For example, the database #2 is a local database stored in the second communications apparatus. The second communications apparatus may download the channel learning model from the local database, and/or read the channel learning model in the database, and further determine the new first channel learning model and the new second channel learning model.

The configuration parameter of the channel learning model stored in the local database in the second communications apparatus may be preconfigured, or may be determined by a side of the second communications apparatus through training and learning and stored in the local database. Before applying the channel learning model, the second communications apparatus may determine the channel learning model from the local database based on the first parameter.

In this application, the second communications apparatus may determine the first channel learning model and/or the second channel learning model based on the first parameter, in other words, may determine a new channel learning model without performing channel learning model training, thereby reducing processing complexity of the second communications apparatus.

In another example, the second communications apparatus may train the first channel learning model and the second channel learning model, to obtain the first channel learning model and the second channel learning model, and further determine the one or more configuration parameters used to update the first channel learning model and/or the one or more configuration parameters used to update the second channel learning model.

A manner in which the second communications apparatus trains the first channel learning model and the second channel learning model may be:

(1) determining the second channel information based on the first channel information and the second channel learning model;

(2) calculating the error between the second channel information and the target channel information;

(3) calculating a loss function based on the obtained error, calculating gradient information by using the loss function, and back-propagating the gradient information; and (4) updating the first channel learning model and the second channel learning model by using a gradient descent method.

After the first channel learning model and the second channel learning model are updated, if a value of the loss function is less than a preset threshold, the gradient information is used as the one or more configuration parameters used to update the first channel learning model, and is sent to the first communications apparatus.

If the value of the loss function is greater than or equal to the preset threshold, the second communications apparatus continues to train the first channel learning model and the second channel learning model based on the foregoing method, until the value of the loss function is less than the preset threshold. Further, a plurality of pieces of gradient information obtained in a plurality of training processes are accumulated, are used as the one or more configuration parameters used to update the first channel learning model, and are sent to the second communications apparatus.

The first channel information may be sent by the first communications apparatus to the second communications apparatus. The target channel information may be sent by the first communications apparatus to the second communications apparatus, or may be obtained by the second communications apparatus based on reciprocity between uplink and downlink channels.

Specifically, a training parameter used by the first communications apparatus to train the channel learning model may be preconfigured, or may be indicated by the first communications apparatus.

Optionally, when there are a plurality of configuration parameters used to update the channel learning model, the second communications apparatus may determine all of the plurality of configuration parameters by using a same method, or may determine all of the plurality of configuration parameters by using different methods.

Optionally, the second communications apparatus may determine, in a one-level manner or a multi-level manner, the configuration parameter used to update the channel learning model. The one-level manner is used as an example. In this case, the second communications apparatus may determine, by using one or more of the foregoing methods, the configuration parameter used to update the channel learning model. The multi-level manner is used as an example. In this case, the second communications apparatus may first determine, by using one or more of the foregoing methods, some configuration parameters used to update the channel learning model, and then determine, by using one or more of the foregoing methods, the other configuration parameters used to update the channel learning model. For example, the second communications apparatus determines a structure of the channel learning model from the database at the higher layer based on the first parameter, then determines a quantity of dimensions, an operation, and/or a function of the channel learning model from the local database based on a second parameter, and finally determines a variable of the channel learning model based on information that is related to the configuration parameter and that is from the first communications apparatus.

Optionally, if the second communications apparatus receives first messages sent by a plurality of first communications apparatuses, the second communications apparatus may determine, based on a false alarm probability, whether the first channel learning model is applicable.

For example, in a current cell, J first communications apparatuses perform channel learning model training, the second communications apparatus receives first messages sent by $J_1$ first communications apparatuses, $J_2$ first communications apparatuses feed back that the first channel learning model is applicable (or $J_2$ first messages indicate that the first channel learning model is applicable), and $J_3$ first communications apparatuses feed back that the first channel learning model is not applicable (or $J_3$ first messages indicate that the first channel learning model is not applicable).

In this case, the false alarm probability may be a proportion (namely, $J_2/J$) of a quantity of first communications apparatuses that feed back that the first channel learning model is applicable (or a quantity of first messages that indicate that the first channel learning model is applicable) to a quantity of first communications apparatuses that perform channel learning model training; may be a proportion (namely, $J_2/J_1$) of a quantity of first communications apparatuses that feed back that the first channel learning model is applicable (or a quantity of first messages that indicate that the first channel learning model is applicable) to a total quantity of received first messages; may be a proportion (namely, $J_3/J$) of a quantity of first communications apparatuses that feed back that the first channel learning model is not applicable (or a quantity of first messages that indicate that the first channel learning model is not applicable) to a quantity of first communications apparatuses that perform channel learning model training; may be a proportion (namely, $J_3/J_1$) of a quantity of first communications apparatuses that feed back that the first channel learning model is not applicable (or a quantity of first messages that indicate that the first channel learning model is not applicable) to a total quantity of received first messages; or may be proportion (namely, $J_2/J_3$) of a quantity of first communications apparatuses that feed back that the first channel learning model is applicable (or a quantity of first messages that indicate that the first channel learning model is applicable) to a quantity of first communications apparatuses that feed back that the first channel learning model is not applicable (or a quantity of first messages that indicate that the first channel learning model is not applicable).

Specifically, if the false alarm probability is greater than or equal to (or greater than) a preset threshold #11, the second communications apparatus determines that the first channel learning model is applicable; or if the false alarm probability is less than (or less than or equal to) a preset threshold #11, the second communications apparatus determines that the first channel learning model is not applicable. Alternatively, if the false alarm probability is greater than or equal to (or greater than) a preset threshold #12, the second communications apparatus determines that the first channel learning model is not applicable; or if the false alarm probability is less than (or less than or equal to) a preset threshold #12, the second communications apparatus determines that the first channel learning model is applicable.

For example, the preset threshold #11 is 70%, and if the proportion of the quantity of first messages that indicate that the first channel learning model is applicable to the total quantity of first messages received by the second communications apparatus is greater than 70%, the second communications apparatus determines that the first channel learning model is applicable.

For another example, the preset threshold #12 is 50%, and if the proportion of the quantity of first messages that indicate that the first channel learning model is not applicable to the total quantity of first messages received by the second communications apparatus is greater than 50%, the second communications apparatus determines that the first channel learning model is not applicable.

When the second communications apparatus determines, in the foregoing manner, whether the channel learning model is applicable, statuses of channel learning models of a plurality of first communications apparatuses may be comprehensively considered, to avoid a case in which an incorrect decision is made due to feedback of individual first communications apparatuses. The statuses of the channel learning models of the plurality of first communications apparatuses may be considered, and therefore accuracy of determining whether the channel learning model is applicable is improved, to improve communication performance.

Further, after determining that the first channel learning model is not applicable, the second communications apparatus may determine a new first channel learning model and a new second channel learning model, in other words, determine the one or more configuration parameters used to update the first channel learning model and the one or more configuration parameters used to update the second channel learning model, and send the configuration parameter used to update the first channel learning model to the first communications apparatus.

Optionally, before S210, the method 200 may further include: The first communications apparatus determines the first channel learning model based on the first parameter.

Specifically, for a manner in which the first communications apparatus determines the first channel learning model, refer to the description of determining the channel learning model in the foregoing embodiment. For brevity, details are not described in this embodiment of this application.

In the following description, an embodiment of this application provides a communication method that can be performed by a first communications apparatus. In other words, the following method is described from a perspective of the first communications apparatus. The method may include at least one of S210' to S230'.

S210' (namely, S210). The first communications apparatus determines whether a first channel learning model is applicable. For detailed description of this step, refer to the description in S210. For brevity, details are not described herein.

S220' (namely, S220). The first communications apparatus sends a first message, where the first message is used to indicate whether the first channel learning model is applicable. For detailed description of this step, refer to the description in S220. For brevity, details are not described herein.

S230a'. The first communications apparatus sends one or more configuration parameters used to update a second channel learning model. For detailed description of this step, refer to the description in S220. For brevity, details are not described herein. Optionally, this step may be replaced with S230*b'*.

S230*b'*. The first communications apparatus receives one or more configuration parameters used to update the first channel learning model. For detailed description of this step, refer to the description in the method 200. For brevity, details are not described herein.

In the following description, an embodiment of this application provides a communication method that can be performed by a second communications apparatus. In other words, the following method is described from a perspective of the second communications apparatus. The method may include at least one of S210" to S230".

S210" (namely, S220). The second communications apparatus receives a first message, where the first message is used to indicate whether a first channel learning model is applicable. For detailed description of this step, refer to the description in S210. For brevity, details are not described herein.

S220" (namely, S220). The second communications apparatus determines, based on the first message, whether the first channel learning model is applicable. For detailed description of this step, refer to the description in S220. For brevity, details are not described herein.

S230*a*". The second communications apparatus receives one or more configuration parameters used to update a second channel learning model. For detailed description of this step, refer to the description in S220. For brevity, details are not described herein. Optionally, this step may be replaced with S230*b*".

S230*b*". The second communications apparatus sends one or more configuration parameters used to update the first channel learning model. For detailed description of this step, refer to the description in the method 200. For brevity, details are not described herein.

An embodiment of this application provides a communication method in which a first communications apparatus determines that a channel learning model is not applicable and notifies a second communications apparatus. In this method, when the channel learning model is not applicable, reporting and notification to the second communications apparatus can be implemented in a timely manner, to update the channel learning model. Therefore, accuracy of the channel learning model and communication performance can be improved.

Figure 12:
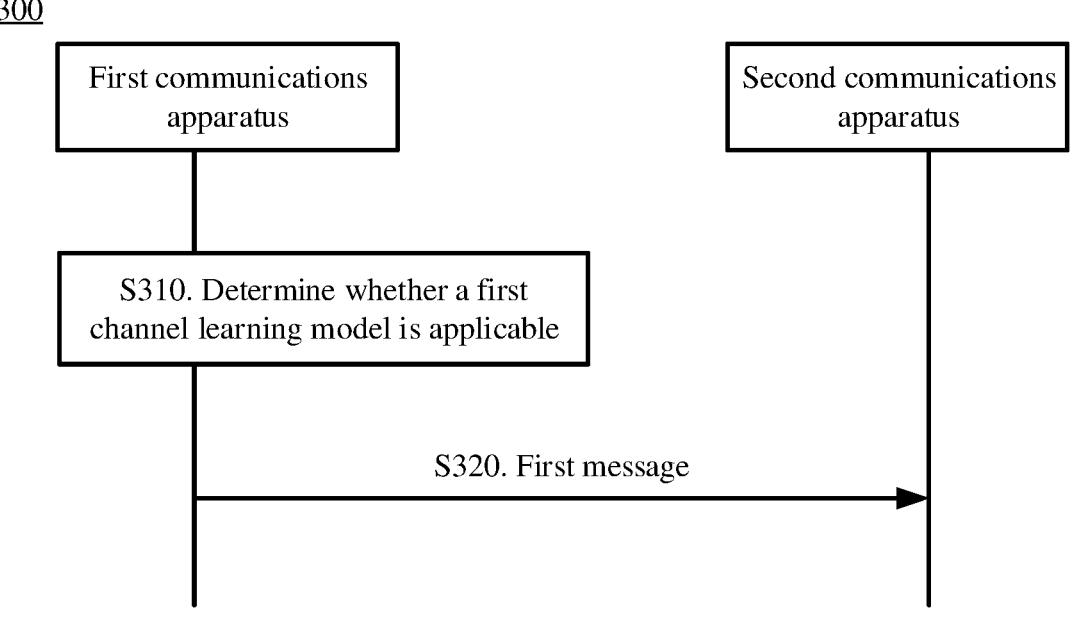
FIG. 12 to FIG. 17 are schematic flowcharts of a communication method according to an embodiment of this application.

FIG. 12 shows a communication method according to another embodiment of this application. This embodiment of this application may be used as an independent embodiment, or may be combined with another embodiment of this application. Specifically, this is not limited in this application. The method 300 shown in FIG. 12 may include S310 and S320. The steps in the method 300 are described below in detail.

S310. A first communications apparatus determines whether a first channel learning model is applicable.

The first channel learning model is used to determine first channel information based on target channel information, and a data amount of the first channel information is less than a data amount of the target channel information. Therefore, it may alternatively be understood as that the first channel learning model is used to compress the target channel information to obtain the first channel information.

Optionally, the data amount of the channel information may refer to a dimension of the channel information.

For example, if a quantity of antenna ports of a transmit end (for example, the first communications apparatus or a second communications apparatus) is $A_2$, and a quantity of antenna ports of a receive end (for example, the first communications apparatus or the second communications apparatus) is $A_3$, the target channel information between the transmit end and the receive end may be an $A_2 * A_3$-dimensional matrix, and the data amount of the target channel information may be expressed by using $A_2 * A_3$. If an element in the matrix of the target channel information is a complex number, and a real part and an imaginary part of each element are separately expressed, the data amount of the target channel information may alternatively be expressed as $A_2 * A_3 * 2$.

For example, if a dimension of a matrix of the first channel information obtained by processing the matrix of the target channel information by using the first channel learning model is $B_2$, the data amount of the first channel information may be expressed by using $B_2$.

Optionally, the data amount of the channel information may alternatively refer to an information amount included in the channel information, or the like.

Optionally, the target channel information may be considered as an input to the first channel learning model, and the first channel information may be considered as an output of the first channel learning model. The data amount of the target channel information may be an information dimension of the input, and the data amount of the first channel information may be an information dimension of the output. The first channel information is used to obtain second channel information by using a second channel learning model, and a data amount of the second channel information is the same as or similar to the data amount of the target channel information. Optionally, the second channel information may be used to perform data transmission. For example, the second communications apparatus may determine scheduling information for data transmission or determine precoding for data transmission based on the second channel information.

It should be understood that the first channel learning model corresponds to the second channel learning model. Therefore, that a first communications apparatus determines whether a first channel learning model is applicable may be understood as that the first communications apparatus determines whether the first channel learning model and the second channel learning model are applicable. That is, when determining that the first channel learning model is not applicable, the first communications apparatus may determine that the second channel learning model is also not applicable; or when determining that the first channel learning model is applicable, the first communications apparatus may determine that the second channel learning model is also applicable.

The target channel information is not limited in this embodiment of this application. For example, when the first communications apparatus is a terminal device, the target channel information may be downlink channel information. For another example, when the first communications apparatus is a network device, the target channel information may be uplink channel information. For another example, when the first communications apparatus is a terminal device, the target channel information may be uplink channel information, or the target channel information may be uplink channel information and downlink channel information, and the first communications apparatus may determine, based on partial reciprocity between uplink and downlink channels, the uplink channel information, and the downlink channel information, whether the first channel learning model and/or the second channel learning model are/is applicable, or determine a new first channel learning model and/or a new second channel learning model. For another example, when the first communications apparatus is a network device, the target channel information may be downlink channel information, or the target channel information may be uplink channel information and downlink channel information, and whether the first channel learning model and/or the second channel learning model are/is applicable is determined based on partial reciprocity between uplink and downlink channels, the uplink channel information, and the downlink channel information, or a new first channel learning model and/or a new second channel learning model are/is determined.

The first communications apparatus may periodically determine whether the first channel learning model is applicable. For example, the first communications apparatus starts a timer after determining, for an $i^{th}$ time, whether the first channel learning model is applicable, and when the timer expires, the first communications apparatus determines, for an $(i+1)^{th}$ time, whether the first channel learning model is applicable.

In this manner, overheads of signaling exchange between the first communications apparatus and the second communications apparatus may be reduced, and degradation of communication performance caused when the first channel learning model is not applicable may be avoided because the first communications apparatus periodically determines whether the first channel learning model is applicable.

A method for determining, by the first communications apparatus, whether the first channel learning model is applicable is not limited in this embodiment of this application. The first communications apparatus may determine, by using one or more of the following implementations, whether the first channel learning model is applicable. When the first communications apparatus determines that the first channel learning model is not applicable, the first communications apparatus and/or the second communications apparatus may adjust the first channel learning model in a timely manner, to improve accuracy and applicability of the channel learning model, so as to improve communication performance.

A manner in which the first communications apparatus determines whether the first channel learning model and/or the second channel learning model are/is applicable is provided below. The method for determining, by the first communications apparatus, whether the channel learning model is applicable may be used as an independent embodiment, or may be combined with another embodiment. Specifically, this is not limited in this embodiment of this application. The following one or more manners of determining whether the channel learning model is applicable may be used independently or jointly. Specifically, this is not limited in this embodiment of this application.

It should be noted that in this embodiment of this application, whether the channel learning model is applicable may alternatively mean whether the channel learning model matches, whether the channel learning model is accurate, whether the channel learning model is outdated, whether there is an error in the channel learning model, or the like.

In an implementation, the first communications apparatus may determine, based on a long-term statistical characteristic of a target channel, whether the channel learning model is applicable. For example, the first communications apparatus may determine, based on whether a variation of the long-term statistical characteristic of the target channel is greater than or equal to a first preset threshold, whether the first channel learning model is applicable. For details, refer to the description in S210. For brevity, details are not described herein.

In another implementation, the first communications apparatus may determine, based on received first scheduling information, whether the first channel learning model is applicable. The first scheduling information is sent by the second communications apparatus based on the second channel information. For details, refer to the description in S210. For brevity, details are not described herein.

In still another implementation, the first communications apparatus may determine, based on data transmission performance, whether the first channel learning model is applicable. For details, refer to the description in S210. For brevity, details are not described herein.

In still another implementation, the first communications apparatus may determine, based on whether a scenario changes, whether the first channel learning model is applicable. For details, refer to the description in S210. For brevity, details are not described herein.

In still another implementation, the first communications apparatus may determine, based on whether a performance indicator of the first channel learning model is less than a second preset threshold, whether the first channel learning model is applicable. For details, refer to the description in S210. For brevity, details are not described herein.

In still another implementation, the first communications apparatus may determine, based on an error between the target channel information and the second channel information, whether the first channel learning model is applicable. For details, refer to the description in S210. For brevity, details are not described herein.

In still another implementation, the first communications apparatus may determine, based on whether first indication information is received, whether the first channel learning model is applicable.

The first indication information is used to indicate the first communications apparatus to perform channel learning model training.

When receiving the first indication information, the first communications apparatus may determine that the first channel learning model is not applicable.

The first indication information is sent by the second communications apparatus, and the second communications apparatus may send the first indication information when determining that the second channel learning model is not applicable.

In this implementation, the first communications apparatus may determine, based on whether the first indication information is received, whether the first channel learning model is applicable, in other words, determine, without performing channel learning model training, whether the first channel learning model is applicable, thereby reducing processing complexity of the first terminal device. In addition, based on whether the first indication information is received, whether the first channel learning model is applicable may be determined when the two communications apparatuses reach an agreement on understanding. Therefore, this manner is simple and convenient.

Optionally, in this embodiment of this application, the first channel learning model corresponds to the second channel learning model. Therefore, when the first communications apparatus or the second communications apparatus determines that the first channel learning model is not applicable, it may be inferred that the first communications apparatus or the second communications apparatus determines that the second channel learning model is not applicable.

Optionally, in this embodiment of this application, the first channel learning model corresponds to the second channel learning model. Therefore, when the first communications apparatus or the second communications apparatus determines that the second channel learning model is not applicable, it may be inferred that the first communications apparatus or the second communications apparatus determines that the first channel learning model is not applicable.

Optionally, in this embodiment of this application, the first channel learning model corresponds to the second channel learning model. Therefore, when the first communications apparatus or the second communications apparatus determines that the first channel learning model or the second channel learning model is not applicable, it may be inferred that the first communications apparatus or the second communications apparatus determines that the first channel learning model and the second channel learning model are not applicable.

A method for determining, by the second communications apparatus, whether the second channel learning model is applicable is not limited in this embodiment of this application. The second communications apparatus may determine, by using one or more of the following implementations, whether the second channel learning model is applicable. When the second communications apparatus determines that the second channel learning model is not applicable, the first communications apparatus and/or the second communications apparatus may adjust the second channel learning model in a timely manner, to improve accuracy and applicability of the channel learning model, so as to improve communication performance.

A manner in which the second communications apparatus determines whether the first channel learning model and/or the second channel learning model are/is applicable is provided below. The method for determining, by the second communications apparatus, whether the channel learning model is applicable may be used as an independent embodiment, or may be combined with another embodiment. Specifically, this is not limited in this embodiment of this application. The following one or more manners of determining whether the channel learning model is applicable may be used independently or jointly. Specifically, this is not limited in this embodiment of this application.

It should be noted that in this embodiment of this application, whether the channel learning model is applicable may alternatively mean whether the channel learning model matches, whether the channel learning model is accurate, whether the channel learning model is outdated, whether there is an error in the channel learning model, or the like.

In an implementation, the second communications apparatus may determine, based on a long-term statistical characteristic of a target channel, whether the channel learning model is applicable. For example, when the second communications apparatus determines that the long-term statistical characteristic of the target channel changes relatively greatly, it indicates that a channel feature or a channel environment between the first communications apparatus and the second communications apparatus changes relatively greatly. Therefore, the second communications apparatus may determine that the channel learning model is not applicable.

For example, the second communications apparatus may determine, based on whether a variation of the long-term statistical characteristic of the target channel is greater than or equal to a third preset threshold, whether the first channel learning model is applicable. The third preset threshold may be predefined in a protocol, or may be preconfigured. This is not limited in this embodiment of this application.

The long-term statistical characteristic of the target channel may include at least one of the following: a rank value, a large-scale characteristic, a channel covariance matrix, a channel correlation matrix, a coherent time, a coherent bandwidth, and the like.

The large-scale characteristic of the channel may be one or more of the following: a delay spread, a Doppler spread, a Doppler shift, an average gain, an average delay, an angle of arrival, an angle of arrival spread, an angle of departure, an angle of departure spread, a spatial RX parameter, and a spatial correlation.

In an example, the second communications apparatus may determine the long-term statistical characteristic of the target channel based on a signal from the first communications apparatus, and further determine, based on the long-term statistical characteristic of the target channel, whether the second channel learning model is applicable. The signal from the second communications apparatus may be a reference signal or a data signal. The reference signal may be a DMRS, a CSI-RS, a PTRS, a TRS, an SBB, an SRS, or the like. The data signal may be a signal transmitted on a PDSCH, a PDCCH, a PUSCH, or a PUCCH.

For example, if the first communications apparatus is a terminal device, and the second communications apparatus is a network device, the network device may determine the long-term statistical characteristic of the target channel based on the reference signal and/or the data signal sent by the terminal device. The reference signal may be at least one of an SRS, a DMRS, and a PTRS, and the data signal may be at least one of a signal transmitted on the PUSCH and a signal transmitted on the PUCCH. The target channel may be a downlink channel, and the network device may infer the long-term statistical characteristic of the downlink channel based on a long-term statistical characteristic of an uplink channel.

In another example, the second communications apparatus may determine the variation of the long-term statistical characteristic of the target channel based on channel state information fed back by the first communications apparatus.

For example, the channel state information (CSI) reported by the first communications apparatus may include at least one of the following: a rank value, a channel covariance matrix, and a correlation matrix. The second communications apparatus may determine the long-term statistical characteristic of the target channel based on the information reported by the first communications apparatus.

When the variation of the long-term statistical characteristic of the target channel is greater than or equal to the third preset threshold, it indicates that the channel feature or the channel environment between the first communications apparatus and the second communications apparatus changes relatively greatly, and therefore the second communications apparatus may determine that the second channel learning model is not applicable. When the long-term statistical characteristic of the target channel is less than the third preset threshold, it indicates that there is a relatively stable channel feature or channel environment between the first communications apparatus and the second communications apparatus, and therefore the second communications apparatus may determine that the second channel learning model is applicable.

For example, the long-term statistical characteristic of the target channel is the rank value. When determining that the rank value changes relatively greatly, the second communications apparatus may determine that the second channel learning model is not applicable. For example, when determining that a variation of the rank value is greater than or equal to a preset threshold #12 (an example of the third preset threshold), the second communications apparatus may determine that the second channel learning model is not applicable. The preset threshold #12 may be $R_1$, and $R_1$ is a positive integer. For example, $R_1$ is 2. That is, when the variation of the rank value is greater than or equal to 2, the second communications apparatus may determine that the second channel learning model is not applicable. For example, when the first communications apparatus moves from an environment in which there are sparse reflectors to an environment in which there are abundant reflectors, a quantity of paths on the target channel is increased, and therefore the rank value changes. In this case, the second channel learning model may no longer be applicable. A larger rank value indicates that a used channel learning model may be more complex, for example, the channel learning model may include a larger quantity of layers. For example, when the first communications apparatus moves from an indoor scenario to an outdoor scenario, the long-term statistical characteristic (rank value) of the target channel also changes, and the second communications apparatus may determine that the second channel learning model may not be applicable.

For example, the long-term statistical characteristic of the target channel is the Doppler shift. When determining that the Doppler shift changes relatively greatly, the second communications apparatus may determine that the second channel learning model is not applicable. For example, when a variation of the Doppler shift is greater than a preset threshold #13 (an example of the third preset threshold), the second communications apparatus may determine that the second channel learning model is not applicable. The preset threshold #13 may be $F_2$, and $F_2$ is a real number. For example, $F_2$ is 2. That is, when the variation of the Doppler shift is greater than or equal to 2, the second communications apparatus may determine that the second channel learning model is not applicable. For example, the Doppler shift may reflect a moving speed of the first communications apparatus. When the first communications apparatus moves from a walking scenario to a vehicle-mounted scenario, the moving speed of the first communications apparatus is increased, and the second channel learning model may no longer be applicable. For example, if a variation of the moving speed of the first communications apparatus is greater than a preset threshold #14, the second communications apparatus determines that the second channel learning model is not applicable.

In this implementation, the second communications apparatus may determine, based on the long-term statistical characteristic of the target channel, whether the channel learning model is applicable, in other words, determine, without performing channel learning model training, whether the second channel learning model is applicable, thereby reducing processing complexity of the second communications apparatus. In addition, whether the channel learning model is applicable may be determined without assistance of the first communications apparatus, and therefore signaling exchange is reduced. Therefore, this manner is simple and convenient.

In another implementation, the second communications apparatus may determine, based on first scheduling information, whether the second channel learning model is applicable. The first scheduling information may be determined by the second communications apparatus based on the second channel information.

The first scheduling information may include at least one of the following: an MCS indication, a TBS indication, a rank indication, an antenna port indication, and the like. The first scheduling information may be downlink control information (DCI) at a physical layer, or may be scheduling information in higher layer signaling. Specifically, for content and an indication manner included in the first scheduling information, refer to the conventional technology. For brevity, details are not described in this embodiment of this application.

The second communications apparatus may determine, based on a variation of first scheduling information determined for a plurality of times, whether the second channel learning model is applicable. For example, the second communications apparatus may determine, based on a difference between first scheduling information determined for last B' times and the currently determined first scheduling information, whether the second channel learning model is applicable. When the variation of the first scheduling information determined for the plurality of times is greater than or equal to a preset difference threshold, the second communications apparatus may determine that the second channel learning model is not applicable. Herein, B' is an integer.

Scheduling information of data may reflect a quality status of a channel. Therefore, the second communications apparatus may determine, based on a difference between scheduling information determined for a plurality of times, whether the second channel learning model is applicable. For example, when there is a relatively large difference between the first scheduling information indicated by the second communications apparatus to the first communications apparatus for the last B' times and the currently indicated first scheduling information, it indicates that a channel of the first communications apparatus changes relatively greatly, in other words, the second channel learning model is not applicable. Therefore, the second communications apparatus may determine, in at least one of the following manners, whether the second channel learning model is applicable.

In an example, the second communications apparatus may determine, based on whether the difference between the first scheduling information determined for the last B' times and the currently determined first scheduling information is greater than or equal to the preset difference threshold, whether the second channel learning model is applicable. The preset difference threshold may be predefined in a protocol, may be indicated by the first communications apparatus to the second communications apparatus, or may be preconfigured. This is not limited in this embodiment of this application.

For example, when the difference between the first scheduling information determined for the last B' times and the currently determined first scheduling information is greater than or equal to the preset difference threshold, the second communications apparatus determines that the second channel learning model is not applicable; or when the difference between the first scheduling information determined for the last B' times and the currently determined first scheduling information is less than the preset difference threshold, the second communications apparatus determines that the second channel learning model is applicable.

The preset difference threshold may be at least one of a difference threshold of a modulation order, a difference threshold of a code rate, a difference threshold of an MCS index, a difference threshold of a rank value, a difference threshold of a TBS, and a difference threshold of an antenna port.

For example, the preset difference threshold is the difference threshold of the modulation order. The difference threshold of the modulation order may b $N_3$, and $N_3$ is a real number. For example, $N_3$ is 1, 2, 3, 4, 1/2, 3/2, or 5/2. When a difference between an order of a modulation scheme determined for the last B' times and an order of a currently determined modulation scheme is greater than or equal to the difference threshold of the modulation order, the second communications apparatus determines that the second channel learning model is not applicable.

For example, if the difference threshold of the modulation order is 2, the modulation scheme determined by the second communications apparatus for the last B' times is QPSK (the order is 2), and the currently determined modulation scheme is 64QAM (the order is 4), the first communications apparatus determines that the first channel learning model is not applicable.

For example, the preset difference threshold is the difference threshold of the code rate. The difference threshold of the code rate may be $M_1$, and $M_1$ is a real number. For example, $M_1$ is 200/1024, 250/1024, 300/1024, or 500/1024. When a difference between a code rate determined for the last B' times and a currently determined code rate is greater than or equal to the difference threshold of the code rate, the second communications apparatus determines that the second channel learning model is not applicable.

For example, if the difference threshold of the code rate is 200/1024, the code rate determined by the second communications apparatus for the last B' times is 400/1024, and the code rate indicated in the first scheduling information is 658/1024, the second communications apparatus may determine that the second channel learning model is not applicable.

For example, the preset difference threshold is the difference threshold of the MCS index. The difference threshold of the MCS index may be $P_1$, and $P_1$ is an integer. For example, $P_1$ is 1, 2, 3, 4, 5, 6, 8, or 10. When a difference between an MCS index determined for the last B' times and a currently determined MCS index is greater than or equal to the difference threshold of the MCS index, the second communications apparatus determines that the second channel learning model is not applicable.

For example, if the difference threshold of the MCS index is 4, the MCS index determined by the second communications apparatus for the last B' times is 4, and the currently determined MCS index is 10, the second communications apparatus may determine that the second channel learning model is not applicable.

For example, the preset difference threshold is the difference threshold of the TBS. The difference threshold of the TBS may be Q, and Q is an integer. For example, Q is 32, 64, 128, 256, 612, or 1024. When a difference between a TBS determined for the last B' times and a currently determined TBS is greater than or equal to the difference threshold of the TBS, the second communications apparatus determines that the second channel learning model is not applicable.

For example, if the difference threshold of the TBS is 64, the TBS determined by the second communications apparatus for the last B' times is 288, and the currently determined TBS is 522, the second communications apparatus may determine that the second channel learning model is not applicable.

It should be understood that description is provided above only by using an example in which the second communications apparatus determines, based on a difference between one piece of information in the first scheduling information determined for the last B' times and one piece of information in the currently determined first scheduling information, whether the second channel learning model is applicable. Optionally, the second communications apparatus may alternatively determine, based on differences between a plurality of pieces of information in the first scheduling information determined for the last B' times and a plurality of pieces of information in the currently determined first scheduling information, whether the second channel learning model is applicable. For example, when the difference between the code rate determined for the last B' times and the currently determined code rate is greater than or equal to the difference threshold of the code rate, and the difference between the TBS determined for the last B' times and the currently determined TBS is greater than or equal to the difference threshold of the TBS, the second communications apparatus may determine that the second channel learning model is not applicable.

It should be further understood that description is provided above only by using an example in which the second communications apparatus determines, based on whether the difference between the first scheduling information is greater than or equal to the preset difference threshold, whether the second channel learning model is applicable. Optionally, the second communications apparatus may determine, based on whether a similarity between the first scheduling information is less than a preset similarity threshold, whether the second channel learning model is applicable. The preset similarity threshold may be predefined in a protocol, may be indicated by the first communications apparatus to the second communications apparatus, or may be preconfigured. This is not limited in this embodiment of this application.

The second communications apparatus may alternatively determine, based on a difference between CQI information fed back by the first communications apparatus and the first scheduling information, whether the second channel learning model is applicable. Specifically, when the difference between the CQI information fed back by the first communications apparatus and the first scheduling information is greater than or equal to a preset difference threshold, the second communications apparatus may determine that the second channel learning model is not applicable.

For example, the second communications apparatus may determine, based on the first scheduling information, the CQI information fed back by the second communications apparatus, and a second mapping relationship, whether the second channel learning model is applicable. The second mapping relationship is used to indicate a correspondence between the scheduling information and whether the channel learning model is applicable.

Table 12 shows an example of the second mapping relationship. For example, the second mapping relationship may be one or more rows in the following table. The second mapping relationship may be predefined in a protocol, or may be notified by the second communications apparatus to the first communications apparatus by using signaling. Specifically, this is not limited in this embodiment of this application.

TABLE 12

| CQI information | First scheduling information | Whether the second channel learning model is applicable |
|---|---|---|
| Modulation scheme: QPSK | Modulation scheme: QPSK | Applicable |
| Modulation scheme: QPSK | Modulation scheme: ≥16QAM and 64QAM | Not applicable |
| Modulation scheme: 16QAM | Modulation scheme: QPSK and 16QAM | Applicable |
| Modulation scheme: 16QAM | Modulation scheme: 64QAM and 256QAM | Not applicable |
| Code rate: 1/2 | Code rate: ≥2/3 | Not applicable |
| Code rate: 2/3 | Code rate: 3/4 and 5/6 | Not applicable |
| . . . | . . . | . . . |
| MCS index: 0-10 | MCS index: ≥12 | Not applicable |
| MCS index: m | MCS index: ≥m + p, where p is an integer | Not applicable |
| Quantity of DMRS ports: 2 | Quantity of DMRS ports: ≥4 | Not applicable |
| Quantity of DMRS ports: r | Quantity of DMRS ports: ≥r + $r_1$, where $r_1$ is an integer | Not applicable |

For example, if the modulation scheme indicated in the CQI information fed back by the first communications apparatus is QPSK, and the scheduling scheme indicated in the first scheduling information is QPSK, the second communications apparatus determines, based on Table 12, that the second channel learning model is applicable. For another example, if the code rate indicated in the CQI information fed back by the first communications apparatus is 2/3, and the code rate indicated in the first scheduling information is 3/4, the first communications apparatus may determine, based on Table 12, that the second channel learning model is not applicable.

In this implementation, the second communications apparatus may determine, based on the first scheduling information, whether the channel learning model is applicable, in other words, determine, without performing channel learning model training, whether the second channel learning model is applicable, thereby reducing processing complexity of the second communications apparatus. In addition, whether the first channel learning model is applicable is determined based on the first scheduling information, and therefore communication performance based on the first channel learning model can be ensured. Furthermore, in this implementation, no assistance of the first communications apparatus is required, and therefore signaling exchange can be reduced.

In still another implementation, the second communications apparatus may determine, based on data transmission performance, whether the second channel learning model is applicable. For details, refer to the description of determining, by the first communications apparatus based on the data transmission performance, whether the first channel learning model is applicable in S210. For brevity, details are not described herein.

The data transmission performance may be data transmission performance of a specific first communications apparatus that communicates with the second communications apparatus, and whether a second channel learning model corresponding to the first communications apparatus is applicable may be determined based on the data transmission performance. The second channel learning model corresponding to the first communications apparatus is the second channel learning model corresponding to the first channel learning model deployed on a side of the first communications apparatus.

The data transmission performance may alternatively refer to data transmission performance of a cell of the second communications apparatus, for example, a cell edge throughput, a cell center throughput, or a total cell throughput. Based on the data transmission performance of the cell, the second communications apparatus may determine whether a second channel learning model corresponding to the cell is applicable. The second channel learning model corresponding to the cell is the second channel learning model corresponding to the first communications apparatus in the cell.

In this implementation, the second communications apparatus may determine, based on the data transmission performance, whether the second channel learning model is applicable, in other words, determine, without performing channel learning model training, whether the second channel learning model is applicable, thereby reducing processing complexity of the second communications apparatus. In addition, in this manner of determining, based on the data transmission performance, whether the second channel learning model is applicable, accuracy of the second channel learning model is measured by using final communication performance, and therefore communication performance based on the second channel learning model can be ensured, in other words, this manner helps improve communication performance.

In still another implementation, the second communications apparatus may determine, based on whether a scenario in which the first communications apparatus is located changes, whether the first channel learning model is applicable.

The scenario may be at least one of the following: an indoor still scenario, an outdoor still scenario, a low-speed moving scenario, a high-speed moving scenario, a suburban scenario, an urban scenario, a macro base station, a micro base station, a vehicle-mounted scenario, a V2X scenario, a scenario defined in a 3GPP protocol, and the like.

Different scenarios may correspond to different channel environments, and consequently the second channel learning model is not applicable. For example, in some scenarios, a channel between the first communications apparatus and the second communications apparatus is a direct path; while in some scenarios, a channel between the first communications apparatus and the second communications apparatus is a non-direct path. For another example, in some scenarios, there are a relatively small quantity of reflectors between the first communications apparatus and the second communications apparatus, and correspondingly, there is a simple channel between the first communications apparatus and the second communications apparatus; while in some scenarios, there are a relatively large quantity of reflectors between the first communications apparatus and the second communications apparatus, and correspondingly, there is a complex channel between the first communications apparatus and the second communications apparatus.

Therefore, when the scenario in which the first communications apparatus is located changes, the second channel learning model may not be applicable. For example, if the first communications apparatus moves from an indoor scenario to an outdoor scenario, the second communications apparatus may determine that the second channel learning model is not applicable. For another example, if the first communications apparatus moves from a macro base station to a micro base station, the second communications apparatus may determine that the second channel learning model is not applicable.

Optionally, the first communications apparatus may send location information to the second communications apparatus, and the second communications apparatus determines, based on the received location information, the scenario in which the first communications apparatus is located, and further determines, based on the scenario in which the first communications apparatus is located, whether the second channel learning model is applicable.

Optionally, the first communications apparatus may send scenario information to the second communications apparatus, and the second communications apparatus determines, based on the received scenario in which the first communications apparatus is located, whether the second channel learning model is applicable.

In this implementation, the second communications apparatus may determine, based on the scenario in which the first communications apparatus is located, whether the second channel learning model is applicable, in other words, determine, without performing channel learning model training, whether the second channel learning model is applicable, thereby reducing processing complexity of the second communications apparatus. In addition, this manner is simple and convenient.

Optionally, when the second communications apparatus is a terminal device, the second communications apparatus may determine, based on a scenario in which the second communications apparatus is located, whether the second channel learning model is applicable.

In still another implementation, the second communications apparatus may determine, based on a performance indicator of the second channel learning model, whether the second channel learning model is applicable.

In an example, the second communications apparatus may determine, based on a difference or a similarity between the target channel information (or the first channel information) and the second channel information, whether the channel learning model is applicable. For example, the second communications apparatus may compress and decompress the target channel information based on the second channel learning model, to obtain the second channel information. For example, the second communications apparatus may decompress the first channel information based on the second channel learning model, to obtain the second channel information, and compare features of the target channel information and the second channel information or compare features of the first channel information and the second channel information, to determine an error of the second channel learning model, so as to determine whether the second channel learning model is applicable. For details, refer to the description of determining, by the first communications apparatus based on the performance indicator of the first channel learning model, whether the first channel learning model is applicable in S210. For brevity, details are not described herein.

The target channel information may be sent by the first communications apparatus to the second communications apparatus, or may be obtained by the second communications apparatus based on reciprocity between uplink and downlink channels.

The first channel information may be sent by the first communications apparatus to the second communications apparatus.

In this implementation, the second communications apparatus may determine, based on the performance indicator of the channel learning model, whether the second channel learning model is applicable, in other words, determine, by performing channel learning model training, whether the second channel learning model is applicable. In this manner, the second communications apparatus may determine, without depending on assistance of the first communications apparatus, whether the second channel learning model is applicable. Therefore, this manner is simple and convenient.

In another example, the second communications apparatus may determine, based on an error between the target channel information and the second channel information, whether the second channel learning model is applicable. For details, refer to the description of determining, by the first communications apparatus based on the error between the target channel information and the second channel information, whether the first channel learning model is applicable in S210. For brevity, details are not described herein.

The target channel information may be sent by the first communications apparatus to the second communications apparatus, or may be obtained by the second communications apparatus based on reciprocity between uplink and downlink channels.

In this implementation, the second communications apparatus may determine, based on the error between the target channel information and the second channel information, whether the second channel learning model is applicable, in other words, determine, by performing channel learning model training, whether the second channel learning model is applicable. In this manner, the second communications apparatus may determine, without depending on assistance of the first communications apparatus, whether the channel learning model is applicable. Therefore, this manner is simple and convenient. In addition, whether the second channel learning model is applicable is determined in consideration of features of both the target channel information and the second channel information. Therefore, it can be ensured that the first communications apparatus and the second communications apparatus obtain same or similar features of channel information, to help improve data transmission performance when data transmission is subsequently performed by using the channel information.

In still another implementation, the second communications apparatus may determine, based on a performance indicator that is of the channel learning model and that is sent by the first communications apparatus, whether the second channel learning model is applicable. For a manner in which the first communications apparatus determines the performance indicator of the channel learning model, refer to the description in S210. For brevity, details are not described herein.

In this implementation, the second communications apparatus may determine, based on the performance indicator that is of the channel learning model and that is sent by the first communications apparatus, whether the second channel learning model is applicable, in other words, the second communications apparatus may determine, without performing channel learning model training, whether the second channel learning model is applicable, thereby reducing processing complexity of the second communications apparatus. Therefore, this manner is simple and convenient.

S320. The first communications apparatus sends a first message, where the first message is used to indicate one or more configuration parameters used to update the second channel learning model. Correspondingly, in S320, the second communications apparatus receives the first message, determines, based on the first message, that the second channel learning model is not applicable, and updates the second channel learning model.

Optionally, the first message may further include one or more configuration parameters used to update the first channel learning model.

Optionally, the one or more configuration parameters used to update the first channel learning model may alternatively be sent by using another message. The another message is different from the first message. Specifically, this is not limited in this embodiment of this application.

When determining that the first channel learning model is not applicable, the first communications apparatus may determine a new first channel learning model and a new second channel learning model, and send one or more configuration parameters of the new second channel learning model to the second communications apparatus, to update the second channel learning model. Optionally, the first communications apparatus may send one or more configuration parameters that are in configuration parameters of the new second channel learning model and that are different from those of the previous second channel learning model to the second communications apparatus, to update the previous second channel learning model.

Optionally, when determining that the first channel learning model is not applicable, the first communications apparatus may determine a new second channel learning model, send one or more configuration parameters of the new second channel learning model to the second communications apparatus, to update the second channel learning model, and send the one or more configuration parameters used to update the second channel learning model to the second communications apparatus.

In this manner, the first message includes the one or more configuration parameters used to update the second channel learning model. Correspondingly, the second communications apparatus may update the second channel learning model based on the first message. The one or more configuration parameters may include at least one of the following: a type of the model, a structure of the model, an algorithm of the model, a weight vector of the model, a weight matrix of the model, a bias vector of the model, a bias matrix of the model, and an activation function of the model.

The type of the model includes a machine learning algorithm, a neural network model, or an auto-encoder model.

For example, when the channel learning model is a machine learning algorithm, the configuration parameter may include the algorithm of the model that is used to indicate a specific machine learning algorithm that is the channel learning model.

For another example, when the channel learning model is a neural network model, the configuration parameter may include the structure of the model that is used to indicate a specific neural network that is the channel learning model. The structure of the model may further include one or more of a quantity of dimensions of an input layer, a quantity of dimensions of an output layer, a quantity of hidden layers, a quantity of neurons at the hidden layer, a training algorithm, and a loss function. The configuration parameter may include one or more of a transformation algorithm, a weight matrix, a weight vector, a bias vector, a bias matrix, and an activation function.

For still another example, when the channel learning model is a convolutional neural network model, the configuration parameter may include the structure of the model that is used to indicate quantities of layers and/or a sequence of the layers. The configuration parameter may further include one or more of the following: a parameter (a preprocessing operation algorithm, a quantity of dimensions of input data, or a value range of input data) for an input layer, a parameter (a size of an input unit, a receptive field, a stride, a quantity of zeros added, a depth, a depth of an output unit, or a weight matrix) for a convolutional layer, a parameter (an activation function) for a rectified linear unit layer, a parameter (a pooling algorithm, a spatial extent, a stride, a size of an input unit, or a size of an output unit) for a pooling layer, and a parameter (a weight matrix, a weight vector, a bias matrix, or a bias vector) for a fully connected layer.

A manner in which the first communications apparatus determines the one or more configuration parameters used to update the first channel learning model and the one or more configuration parameters used to update the second channel learning model is not limited in this embodiment of this application. In other words, a manner in which the first communications apparatus determines the first channel learning model and/or the second channel learning model is not limited in this embodiment of this application. A manner in which the first communications apparatus determines the first channel learning model and/or the second channel learning model is provided in the following embodiments. The manner in which the first communications apparatus determines the channel learning model may be used as an independent embodiment, or may be combined with another embodiment. Specifically, this is not limited in this application. The following one or more manners of determining the channel learning model may be used independently or jointly. Specifically, this is not limited in this application.

In an example, the first communications apparatus may determine the first channel learning model and the second channel learning model based on a first parameter.

The first parameter includes at least one of the following: a cell identifier of a cell in which a terminal device is located, a scenario in which the terminal device is located, a type of the terminal device, and a geographical location in which the terminal device is located.

Optionally, when the first communications apparatus is a terminal device, the first communications apparatus may determine the first parameter based on a cell, a scenario, or a geographical location in which the first communications apparatus is located, or a type of the first communications apparatus.

Optionally, when the first communications apparatus is a network device, and the second communications apparatus is a terminal device, the first communications apparatus may receive information that is related to the first parameter and that is sent by the second communications apparatus, and determine the first parameter.

The scenario in which the terminal device is located may be an indoor scenario, an outdoor scenario, a suburban scenario, an urban scenario, an external environment (for example, in the daytime, in the evening, a sunny day, a cloudy day, smooth traffic, or traffic congestion), or the like. For example, when the terminal device is located in the indoor scenario, the first communications apparatus may determine a first channel learning model and/or a second channel learning model corresponding to the indoor scenario, and further determine one or more configuration parameters used to update the first channel learning model and/or one or more configuration parameters used to update the second channel learning model.

The type of the terminal device may be a quantity of antenna ports, a processing capability, or the like of the terminal device.

The geographical location in which the terminal device is located may be three-dimensional coordinates, two-dimensional coordinates, positioning data, or the like. As shown in FIG. 11, if the geographical location in which the terminal device is located is an area 1, the first communications apparatus may determine a first channel learning model and/or a second channel learning model corresponding to the area 1, and determine one or more configuration parameters used to update the first channel learning model and/or one or more configuration parameters used to update the second channel learning model; or if the geographical location in which the terminal device is located is an area 2, the first communications apparatus may determine a first channel learning model and/or a second channel learning model corresponding to the area 2, and determine one or more configuration parameters used to update the first channel learning model and/or one or more configuration parameters used to update the second channel learning model.

Optionally, when the first communications apparatus is a network device, the one or more configuration parameters used to update the first channel learning model and/or the one or more configuration parameters used to update the second channel learning model that are sent by the first communications apparatus to the second communications apparatus may be at a terminal level, a cell level, or a terminal group level. The terminal level is used as an example. In this case, the first communications apparatus sends the one or more configuration parameters used to update the first channel learning model and/or the one or more configuration parameters used to update the second channel learning model to each second communications apparatus in a unicast manner. The cell level is used as an example. In this case, the first communications apparatus sends the one or more configuration parameters used to update the first channel learning model and/or the one or more configuration parameters used to update the second channel learning model to a plurality of second communications apparatuses in a cell in a broadcast manner. The terminal group level is used as an example. In this case, the first communications apparatus sends the one or more configuration parameters used to update the first channel learning model and/or the one or more configuration parameters used to update the second channel learning model to a plurality of second communications apparatuses in a terminal group in a broadcast or multicast manner.

Specifically, the first communications apparatus may determine the first channel learning model and the second channel learning model based on the first parameter from a configuration parameter set stored in a database #1.

The database #1 may be a database that stores information or data related to the channel learning model. For example, the database #1 may store the configuration parameter of the channel learning model.

The database #1 may be a local database in the first communications apparatus, or may be a database stored at a higher layer.

For example, the database #1 is a database stored at the higher layer. The database stored at the higher layer may be a database stored in a mobility management unit, a core network, a cloud, a central manager, an operator system, a first communications apparatus group management system, or a data center. In this case, the first communications apparatus may perform communication interaction with the higher layer, and determine the configuration parameter of the channel learning model from the database at the higher layer. For example, the first communications apparatus may download the configuration parameter of the channel learning model from the database at the higher layer, and/or read the configuration parameter of the channel learning model stored in the database, and further determine the first channel learning model and/or the second channel learning model. Alternatively, the first communications apparatus may receive the configuration parameter that is of the channel learning model and that is sent by a higher layer network element, and further determine the first channel learning model and/or the second channel learning model.

For example, the database #1 is a local database stored in the first communications apparatus. The first communications apparatus may download the configuration parameter of the channel learning model from the local database, and/or read the configuration parameter of the channel learning model stored in the database, and further determine the first channel learning model and/or the second channel learning model.

The configuration parameter of the channel learning model stored in the local database in the first communications apparatus may be preconfigured, or may be determined by the side of the first communications apparatus through training and learning and stored in the local database. Before applying the channel learning model, the first communications apparatus may determine the channel learning model from the local database based on the first parameter.

In this implementation, the first communications apparatus may determine the first channel learning model and/or the second channel learning model based on the first parameter, and further determine the configuration parameter used to update the second channel learning model, in other words, may determine a new channel learning model without performing channel learning model training, thereby reducing processing complexity of the first communications apparatus.

In another example, the first communications apparatus may train the first channel learning model and the second channel learning model, to obtain the first channel learning model and the second channel learning model, and further determine the one or more configuration parameters used to update the first channel learning model and/or the one or more configuration parameters used to update the second channel learning model.

A manner in which the first communications apparatus trains the first channel learning model and the second channel learning model may be:

(1) obtaining the target channel information based on a received reference signal;

(2) determining the first channel information based on the target channel information and the first channel learning model;

(3) determining the second channel information based on the first channel information and the second channel learning model;

(4) calculating the error between the second channel information and the target channel information;

(5) calculating a loss function based on the obtained error, calculating gradient information by using the loss function, and back-propagating the gradient information; and (6) updating the first channel learning model and the second channel learning model by using a gradient descent method.

After the first channel learning model and the second channel learning model are updated, if a value of the loss function is less than a preset threshold, the gradient information is used as the one or more configuration parameters used to update the second channel learning model, and is sent to the second communications apparatus.

If the value of the loss function is greater than or equal to the preset threshold, the first communications apparatus continues to train the first channel learning model and the second channel learning model based on the foregoing method, until the value of the loss function is less than the preset threshold. Further, a plurality of pieces of gradient information obtained in a plurality of training processes are accumulated, are used as the one or more configuration parameters used to update the second channel learning model, and are sent to the second communications apparatus.

Specifically, a training parameter used by the first communications apparatus to train the channel learning model may be preconfigured, or may be determined based on indication information from the second communications apparatus.

Optionally, when there are a plurality of configuration parameters used to update the channel learning model, the first communications apparatus may determine all of the plurality of configuration parameters by using a same method, or may determine all of the plurality of configuration parameters by using different methods.

Optionally, the first communications apparatus may determine, in a one-level manner or a multi-level manner, the configuration parameter used to update the channel learning model. The one-level manner is used as an example. In this case, the first communications apparatus may determine, by using one or more of the foregoing methods, the configuration parameter used to update the channel learning model. The multi-level manner is used as an example. In this case, the first communications apparatus may first determine, by using one or more of the foregoing methods, some configuration parameters used to update the channel learning model, and then determine, by using one or more of the foregoing methods, the other configuration parameters used to update the channel learning model. For example, the first communications apparatus determines a structure of the channel learning model from the database at the higher layer based on the first parameter, then determines a quantity of dimensions, an operation, and/or a function of the channel learning model from the local database based on the first parameter, and finally determines a variable of the channel learning model based on information that is related to the configuration parameter and that is from the second communications apparatus.

In the following description, an embodiment of this application provides a communication method that can be performed by a first communications apparatus. In other words, the following method is described from a perspective of the first communications apparatus. The method may include at least one of S310' and S320'.

S310' (namely, S310). The first communications apparatus determines whether a first channel learning model is applicable. For detailed description of this step, refer to the description in S310. For brevity, details are not described herein.

S320' (namely, S320). The first communications apparatus sends a first message, where the first message is used to indicate one or more configuration parameters used to update a second channel learning model. For detailed description of this step, refer to the description in S320. For brevity, details are not described herein.

In the following description, an embodiment of this application provides a communication method that can be performed by a second communications apparatus. In other words, the following method is described from a perspective of the second communications apparatus. The method may include at least one of S310" and S320".

S310" (namely, S320). The second communications apparatus receives a first message, where the first message is used to indicate one or more configuration parameters used to update a second channel learning model. For detailed description of this step, refer to the description in S320. For brevity, details are not described herein.

S320" (namely, S320). The second communications apparatus determines, based on the first message, that the second channel learning model is not applicable, and updates the second channel learning model. For detailed description of this step, refer to the description in S320. For brevity, details are not described herein.

An embodiment of this application provides a communication method in which a first communications apparatus determines that a channel learning model is not applicable and notifies a second communications apparatus. In this method, when the channel learning model is not applicable, reporting and notification to the second communications apparatus can be implemented in a timely manner, to update the channel learning model. Therefore, accuracy of the channel learning model and communication performance can be improved.

Figure 13:
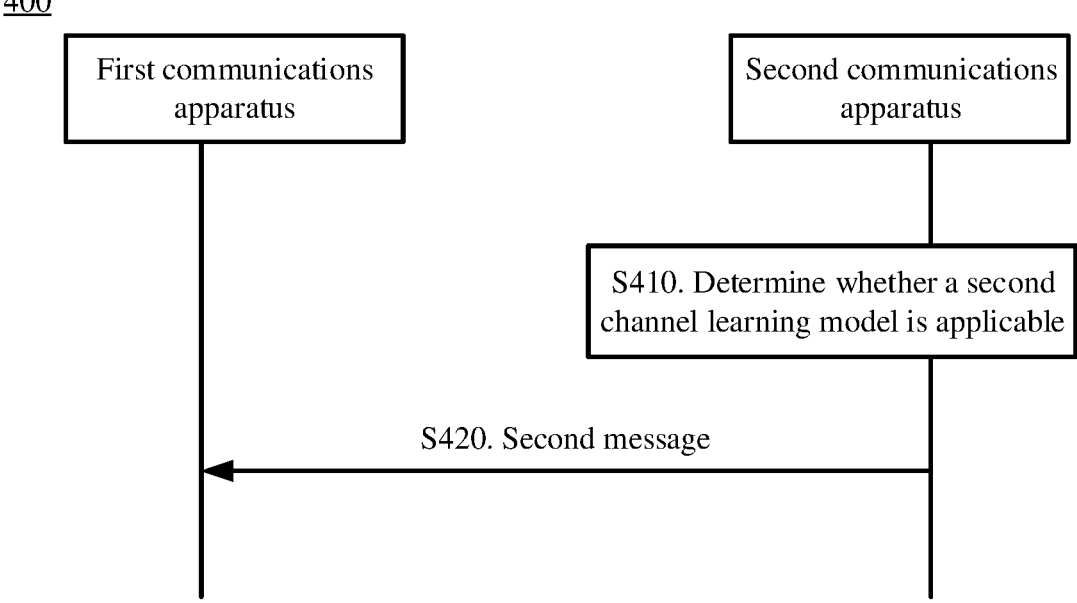

FIG. 13 shows a communication method according to another embodiment of this application. This embodiment of this application may be used as an independent embodiment, or may be combined with another embodiment of this application. Specifically, this is not limited in this application. The method 400 shown in FIG. 13 may include S410 and S420. The steps in the method 400 are described below in detail.

S410. A second communications apparatus determines whether a second channel learning model is applicable.

The second channel learning model is used to determine second channel information based on first channel information, and a data amount of the second channel information is the same as or similar to a data amount of target channel information. Optionally, the second channel information may be used to perform data transmission. For example, the second communications apparatus may determine scheduling information for data transmission or determine precoding for data transmission based on the second channel information.

The first channel information may be determined based on a first channel learning model and the target channel information, and a data amount of the first channel information is less than the data amount of the target channel information. Therefore, it may alternatively be understood as that the first channel learning model is used to compress the target channel information to obtain the first channel information.

Specifically, for description of the data amount of the channel information, refer to the description in S210. For brevity, details are not described herein.

It should be understood that the first channel learning model corresponds to the second channel learning model. Therefore, that a second communications apparatus determines whether a second channel learning model is applicable may be understood as that the second communications apparatus determines whether the second channel learning model and the first channel learning model are applicable. That is, when determining that the second channel learning model is not applicable, the second communications apparatus may determine that the first channel learning model is also not applicable; or when determining that the second channel learning model is applicable, the second communications apparatus may determine that the first channel learning model is also applicable.

The second communications apparatus may periodically determine whether the second channel learning model is applicable. For example, the second communications apparatus starts a timer after determining, for an $i^{th}$ time, whether the second channel learning model is applicable, and when the timer expires, the second communications apparatus determines, for an $(i+1)^{th}$ time, whether the second channel learning model is applicable.

In this manner, overheads of signaling exchange between a first communications apparatus and the second communications apparatus may be reduced, and degradation of communication performance caused when the second channel learning model is not applicable may be avoided because the second communications apparatus periodically determines whether the second channel learning model is applicable.

A method for determining, by the second communications apparatus, whether the second channel learning model is applicable is not limited in this embodiment of this application. Specifically, for the method for determining, by the second communications apparatus, whether the second channel learning model is applicable, refer to the description in S310. For brevity, details are not described herein.

S420. The second communications apparatus sends a second message, where the second message is used to indicate one or more configuration parameters used to update the first channel learning model. Correspondingly, in S420, the first communications apparatus receives the second message, determines, based on the second message, that the first channel learning model is not applicable, and updates the first channel learning model.

Optionally, the second message may further include one or more configuration parameters used to update the second channel learning model.

Optionally, the one or more configuration parameters used to update the second channel learning model may alternatively be sent by using another message. The another message is different from the second message. Specifically, this is not limited in this embodiment of this application.

When determining that the second channel learning model is not applicable, the second communications apparatus may determine a new first channel learning model and a new second channel learning model, and send one or more configuration parameters of the new first channel learning model to the first communications apparatus, to update the first channel learning model. Optionally, the second communications apparatus may send one or more configuration parameters that are in configuration parameters of the new first channel learning model and that are different from those of the previous first channel learning model to the first communications apparatus, to update the previous first channel learning model.

Optionally, when determining that the second channel learning model is not applicable, the second communications apparatus may determine a new first channel learning model, and send one or more configuration parameters of the new first channel learning model to the second communications apparatus, to update the first channel learning model.

In this manner, the second message includes the one or more configuration parameters used to update the first channel learning model. Correspondingly, the first communications apparatus may update the first channel learning model based on the second message. The one or more configuration parameters may include at least one of the following: a type of the model, a structure of the model, an algorithm of the model, a weight vector of the model, a weight matrix of the model, a bias vector of the model, a bias matrix of the model, and an activation function of the model.

The type of the model includes a machine learning algorithm, a neural network model, or an auto-encoder model.

For example, when the channel learning model is a machine learning algorithm, the configuration parameter may include the algorithm of the model that is used to indicate a specific machine learning algorithm that is the channel learning model.

For another example, when the channel learning model is a neural network model, the configuration parameter may include the structure of the model that is used to indicate a specific neural network that is the channel learning model. The structure of the model may further include one or more of a quantity of dimensions of an input layer, a quantity of dimensions of an output layer, a quantity of hidden layers, a quantity of neurons at the hidden layer, a training algorithm, and a loss function. The configuration parameter may include one or more of a transformation algorithm, a weight matrix, a weight vector, a bias vector, a bias matrix, and an activation function.

For still another example, when the channel learning model is a convolutional neural network model, the configuration parameter may include the structure of the model that is used to indicate quantities of layers and/or a sequence of the layers. The configuration parameter may further include one or more of the following: a parameter (a preprocessing operation algorithm, a quantity of dimensions of input data, or a value range of input data) for an input layer, a parameter (a size of an input unit, a receptive field, a stride, a quantity of zeros added, a depth, a depth of an output unit, or a weight matrix) for a convolutional layer, a parameter (an activation function) for a rectified linear unit layer, a parameter (a pooling algorithm, a spatial extent, a stride, a size of an input unit, or a size of an output unit) for a pooling layer, and a parameter (a weight matrix, a weight vector, a bias matrix, or a bias vector) for a fully connected layer.

A manner in which the second communications apparatus determines the first channel learning model and the second channel learning model is not limited in this embodiment of this application.

A manner in which the second communications apparatus determines the first channel learning model and/or the second channel learning model is provided in the following embodiments. The manner in which the second communications apparatus determines the channel learning model may be used as an independent embodiment, or may be combined with another embodiment. Specifically, this is not limited in this embodiment of this application. The following one or more manners of determining the channel learning model may be used independently or jointly. Specifically, this is not limited in this embodiment of this application.

In an example, the second communications apparatus may determine the new first channel learning model and the new second channel learning model based on a first parameter.

Specifically, the second communications apparatus may determine the first channel learning model and the second channel learning model based on the first parameter from a configuration parameter set stored in a database #2.

The first parameter includes at least one of the following: a cell identifier of a cell in which a terminal device is located, a scenario in which the terminal device is located, a type of the terminal device, and a geographical location in which the terminal device is located.

Optionally, when the second communications apparatus is a terminal device, the second communications apparatus may determine the first parameter based on a cell, a scenario, or a geographical location in which the second communications apparatus is located, or a type of the second communications apparatus.

Optionally, when the second communications apparatus is a network device, and the first communications apparatus is a terminal device, the second communications apparatus may receive information that is related to the first parameter and that is sent by the first communications apparatus, and determine the first parameter.

The scenario in which the terminal device is located may be an indoor scenario, an outdoor scenario, a suburban scenario, an urban scenario, an external environment (for example, in the daytime, in the evening, a sunny day, a cloudy day, smooth traffic, or traffic congestion), or the like. For example, when the terminal device is located in the indoor scenario, the second communications apparatus may determine a first channel learning model and/or a second channel learning model corresponding to the indoor scenario, and further determine one or more configuration parameters used to update the first channel learning model and/or one or more configuration parameters used to update the second channel learning model.

The type of the terminal device may be a quantity of antenna ports, a processing capability, or the like of the terminal device.

The geographical location in which the terminal device is located may be three-dimensional coordinates, two-dimensional coordinates, positioning data, or the like. As shown in FIG. 11, if the geographical location in which the terminal device is located is an area 1, the second communications apparatus may determine a first channel learning model and a second channel learning model corresponding to the area 1, and determine one or more configuration parameters used to update the first channel learning model and/or one or more configuration parameters used to update the second channel learning model; or if the geographical location in which the terminal device is located is an area 2, the second communications apparatus may determine a first channel learning model and/or a second channel learning model corresponding to the area 2, and determine one or more configuration parameters used to update the first channel learning model and/or one or more configuration parameters used to update the second channel learning model.

Optionally, when the second communications apparatus is a network device, the one or more configuration parameters used to update the first channel learning model and/or the one or more configuration parameters used to update the second channel learning model that are sent by the second communications apparatus to the first communications apparatus may be at a terminal level, a cell level, or a terminal group level. The terminal level is used as an example. In this case, the second communications apparatus sends the one or more configuration parameters used to update the first channel learning model and/or the one or more configuration parameters used to update the second channel learning model to each first communications apparatus in a unicast manner. The cell level is used as an example. In this case, the second communications apparatus sends the one or more configuration parameters used to update the first channel learning model and/or the one or more configuration parameters used to update the second channel learning model to a plurality of first communications apparatuses in a cell in a broadcast manner. The terminal group level is used as an example. In this case, the second communications apparatus sends the one or more configuration parameters used to update the first channel learning model and/or the one or more configuration parameters used to update the second channel learning model to a plurality of first communications apparatuses in a terminal group in a broadcast or multicast manner.

The database #2 may be a database that carries information or data related to the channel learning model. For example, the database #2 may store the configuration parameter of the channel learning model.

The database #2 may be a local database in the second communications apparatus, or may be a database stored at a higher layer.

For example, the database #2 is a database stored at the higher layer. The database stored at the higher layer may be a database stored in a mobility management unit, a core network, a cloud, a central manager, an operator system, a second communications apparatus group management system, or a data center. In this case, the second communications apparatus may perform communication interaction with the higher layer, and determine the configuration parameter of the channel learning model from the database at the higher layer. For example, the second communications apparatus may download the channel learning model from the database at the higher layer based on the first parameter, and/or read, based on the first parameter, the channel learning model stored in the database, and further determine the new first channel learning model and the new second channel learning model. For another example, the second communications apparatus may receive the configuration parameter that is of the channel learning model and that is sent by a higher layer network element, and further determine the new first channel learning model and the new second channel learning model.

For example, the database #2 is a local database stored in the second communications apparatus. The second communications apparatus may download the channel learning model from the local database, and/or read the channel learning model in the database, and further determine the first channel learning model and the second channel learning model.

The configuration parameter of the channel learning model stored in the local database in the second communications apparatus may be preconfigured, or may be determined by a side of the second communications apparatus through training and learning and stored in the local database. Before applying the channel learning model, the second communications apparatus may determine the channel learning model from the local database based on the first parameter.

In this application, the second communications apparatus may determine the first channel learning model and/or the second channel learning model based on the first parameter, and further determine the configuration parameter used to update the first channel learning model, in other words, may determine a new channel learning model without performing channel learning model training, thereby reducing processing complexity of the second communications apparatus.

In another example, the second communications apparatus may train the first channel learning model and the second channel learning model, to obtain the first channel learning model and the second channel learning model, and further determine the one or more configuration parameters used to update the first channel learning model.

A manner in which the second communications apparatus trains the first channel learning model and the second channel learning model may be:

(1) determining the second channel information based on the first channel information and the second channel learning model;

(2) calculating an error between the second channel information and the target channel information;

(3) calculating a loss function based on the obtained error, calculating gradient information by using the loss function, and back-propagating the gradient information; and (4) updating the first channel learning model and the second channel learning model by using a gradient descent method.

After the first channel learning model and the second channel learning model are updated, if a value of the loss function is less than a preset threshold, the gradient information is used as the one or more configuration parameters used to update the first channel learning model, and is sent to the first communications apparatus.

If the value of the loss function is greater than or equal to the preset threshold, the second communications apparatus continues to train the first channel learning model and the second channel learning model based on the foregoing method, until the value of the loss function is less than the preset threshold. Further, a plurality of pieces of gradient information obtained in a plurality of training processes are accumulated, are used as the one or more configuration parameters used to update the first channel learning model, and are sent to the second communications apparatus.

The first channel information may be sent by the first communications apparatus to the second communications apparatus. The target channel information may be sent by the first communications apparatus to the second communications apparatus, or may be obtained by the second communications apparatus based on reciprocity between uplink and downlink channels.

Specifically, a training parameter used by the first communications apparatus to train the channel learning model may be preconfigured, or may be indicated by the first communications apparatus.

Optionally, when there are a plurality of configuration parameters used to update the channel learning model, the second communications apparatus may determine all of the plurality of configuration parameters by using a same method, or may determine all of the plurality of configuration parameters by using different methods.

Optionally, the second communications apparatus may determine, in a one-level manner or a multi-level manner, the configuration parameter used to update the channel learning model. The one-level manner is used as an example. In this case, the second communications apparatus may determine, by using one or more of the foregoing methods, the configuration parameter used to update the channel learning model. The multi-level manner is used as an example. In this case, the second communications apparatus may first determine, by using one or more of the foregoing methods, some configuration parameters used to update the channel learning model, and then determine, by using one or more of the foregoing methods, the other configuration parameters used to update the channel learning model. For example, the second communications apparatus determines a structure of the channel learning model from the database at the higher layer based on the first parameter, then determines a quantity of dimensions, an operation, and/or a function of the channel learning model from the local database based on a second parameter, and finally determines a variable of the channel learning model based on information that is related to the configuration parameter and that is from the first communications apparatus.

In the following description, an embodiment of this application provides a communication method that can be performed by a first communications apparatus. In other words, the following method is described from a perspective of the first communications apparatus. The method may include at least one of S410' and S420'.

S410' (namely, S420). The first communications apparatus receives a second message, where the second message is used to indicate one or more configuration parameters used to update a first channel learning model. For detailed description of this step, refer to the description in S420. For brevity, details are not described herein.

S420' (namely, S420). The first communications apparatus determines, based on the second message, that the first channel learning model is not applicable, and updates the first channel learning model. For detailed description of this step, refer to the description in S420. For brevity, details are not described herein.

In the following description, an embodiment of this application provides a communication method that can be performed by a second communications apparatus. In other words, the following method is described from a perspective of the second communications apparatus. The method may include at least one of S410" and S420".

S410" (namely, S410). The second communications apparatus determines whether a second channel learning model is applicable. For detailed description of this step, refer to the description in S410. For brevity, details are not described herein.

S420" (namely, S420). The second communications apparatus sends a second message, where the second information is used to indicate one or more configuration parameters used to update a first channel learning model. For detailed description of this step, refer to the description in S420. For brevity, details are not described herein.

In the following description, an embodiment of this application provides a communication method. The following embodiment may be used as an independent embodiment, or may be combined with another embodiment of this application. Specifically, this is not limited in this application.

In the following description, an embodiment of this application provides a communication method performed by a first communications apparatus. In other words, the following method is described from a perspective of the first communications apparatus. The method may include at least one of S410* and S420*.

S410*. The first communications apparatus receives first indication information, where the first indication information is used to indicate to perform channel learning model training. For detailed description of this step, refer to the description in S230. For brevity, details are not described herein.

S420*. The first communications apparatus sends a first message, where the first message is used to indicate one or more configuration parameters used to update a channel learning model. For detailed description of this step, refer to the description in another embodiment of this application. For brevity, details are not described herein.

In the following description, an embodiment of this application provides a communication method that can be performed by a second communications apparatus. In other words, the following method is described from a perspective of the second communications apparatus. The method may include at least one of S410 to S430.

S410** (namely, S410). The second communications apparatus determines whether a second channel learning model is applicable. For detailed description of this step, refer to the description in S410. For brevity, details are not described herein.

S420**. The second communications apparatus sends first indication information, where the first indication information is used to indicate to perform channel learning model training. For detailed description of this step, refer to the description in S230. For brevity, details are not described herein.

S430**. The second communications apparatus receives a first message, where the first message is used to indicate one or more configuration parameters used to update the second channel learning model. For detailed description of this step, refer to the description in S320. For brevity, details are not described herein.

An embodiment of this application provides a communication method in which a second communications apparatus determines that a channel learning model is not applicable and notifies a first communications apparatus. In this method, when the channel learning model is not applicable, reporting and notification to the first communications apparatus can be implemented in a timely manner, to update the channel learning model. Therefore, accuracy of the channel learning model and communication performance can be improved.

Figure 14:
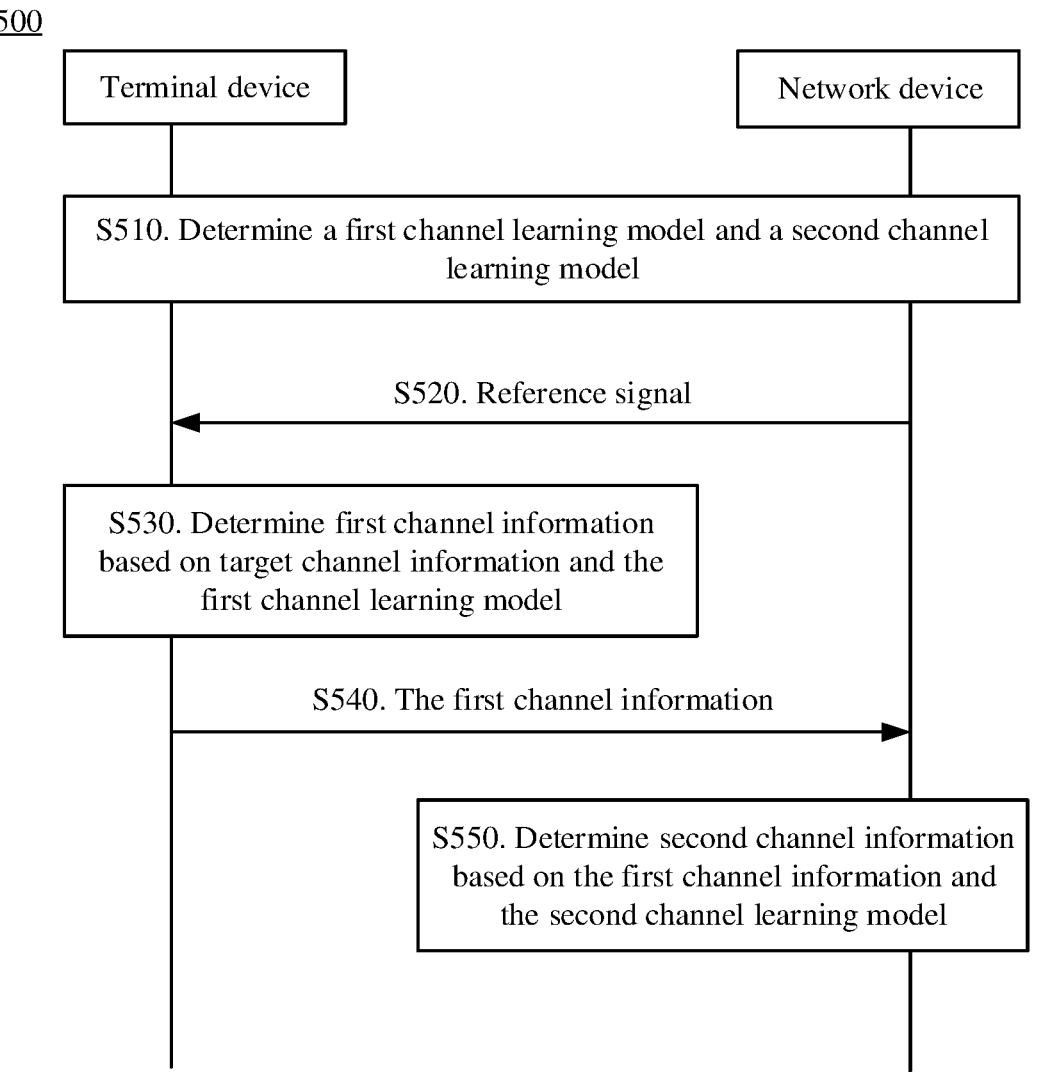

FIG. 14 is a schematic flowchart of a communication method according to an embodiment of this application. Specifically, this embodiment of this application provides a schematic flowchart of a method for determining channel information in communication. This embodiment of this application may be used as an independent embodiment, or may be combined with another embodiment of this application. Specifically, this is not limited in this application. In the method shown in FIG. 14, description is provided by using an example in which a first communications apparatus is a terminal device and a second communications apparatus is a network device. As shown in FIG. 14, the method 500 may include S510 to S550. The steps are described below in detail.

S510. The terminal device and the network device determine a first channel learning model and a second channel learning model.

Specifically, this step includes: The terminal device determines the first channel learning model, or the terminal device determines the first channel learning model and the second channel learning model. Correspondingly, this step includes: The network device determines the second channel learning model, or the network device determines the first channel learning model and the second channel learning model.

The first channel learning model may be deployed on a side of the terminal device, and is used to determine first channel information based on measured downlink channel information. A data amount of the first channel information is less than a data amount of the measured downlink channel information. Deployment may alternatively mean that in actual application, the first channel learning model may be stored on a side of the terminal device, and the side of the terminal device may perform information processing or calculation based on the first channel learning model.

The second channel learning model may be deployed on a side of the network device, and is used to determine second channel information based on the first channel information.

A data amount of the second channel information is the same as or similar to the data amount of the measured downlink channel information. Optionally, the second channel information may be used for downlink transmission. Deployment may alternatively mean that in actual application, the second channel learning model may be stored on a side of the network device, and the side of the network device may perform information processing or calculation based on the second channel learning model.

Determining a channel learning model may include determining a configuration parameter of the channel learning model.

The configuration parameter of the channel learning model includes one or more of a structure of the model, a quantity of dimensions of the model, an operation in the model, a function of the model, a variable of the model, a parameter of the model, and the like.

The structure of the model may include that the model is one or more of structures such as a neural network, a principal component analysis structure, and an auto-encoder. The structure of the model may further include a feature of input information of the model, a feature of output information of the model, and the like.

The feature of the input information of the model may be a feature of input information obtained after an operation is performed on high-dimensional channel information (for example, the measured downlink channel information). The operation performed on the high-dimensional channel information may be one or more of mean subtraction, a normalization operation, discrete Fourier transform, delay-angular domain transform, separation of a real part and an imaginary part, or the like. The input information may be information about a combination of a real part and an imaginary part of the high-dimensional channel information, an independent real part or an independent imaginary part of the high-dimensional channel information, delay-angular domain information, or the like. The operation performed on the high-dimensional channel information may also be referred to as data preprocessing. For example, it is determined that the feature of the input information of the model is normalization, time domain-angular domain transform, and the independent real part and imaginary part.

The feature of the output information of the model may be a feature of information obtained after encoding or dimension reduction is performed. For example, the information obtained after encoding or dimension reduction is performed may be information obtained after the normalization operation is performed, information obtained after the discrete Fourier transform is performed, information obtained after the delay-angular domain transform is performed, information obtained after the real part and the imaginary part are combined, or information obtained after the real part and the imaginary part are separated.

The quantity of dimensions of the model may be one or more of a quantity of layers in the model, a quantity of dimensions of each layer, a quantity of dimensions of an input layer/hidden layer/output layer, and the like. For example, it is determined that the quantity of dimensions of the model is an N-layer convolutional neural network, the quantity of dimensions of the input layer is $N_1$, and the quantity of dimensions of the output layer is $N_2$, where N, $N_1$, and $N_2$ are positive integers.

The operation in the model may be one or more of a linear operation, a nonlinear operation, and the like. For example, it is determined that the operation in the model is a linear operation. This operation may be measured or characterized by using complexity.

The function of the model may be a mathematical operation, a logical operation, or the like, for example, one or more of addition, subtraction, multiplication, and division, weighted summation, weighted summation plus bias, and an activation function. For example, it is determined that the function of the model is weighted summation plus bias and an ReLU activation function. The activation function may be separately determined for each layer in the model, or a same activation function may be used for one or more layers.

The variable of the model may be information about a parameter of the model, for example, may be one or more of a quantity of parameters, a value range of the parameter, a value of the parameter, and a type of the parameter. The parameter may be a constant or a variable. For example, it is determined that a weight matrix of the model is W, and a bias matrix is b, and a value of a variable in the activation function 2 is determined.

The first channel learning model may include one or more models, and correspondingly, the second channel learning model may also include one or more models. For example, there is a channel learning model 1 for a real part of channel information, and there is a channel learning model 2 for an imaginary part of the channel information.

For example, when a structure of the first channel learning model is a convolutional neural network, each of a real part and an imaginary part of high-dimensional channel information may correspond to one convolutional neural network, that is, input information corresponding to a convolutional neural network 1 is the real part of the high-dimensional channel information, encoded output information is a real part of low-dimensional channel information (for example, the first channel information), input information corresponding to a convolutional neural network 2 is the imaginary part of the high-dimensional channel information, and encoded output information is an imaginary part of the low-dimensional channel information. When the real part and the imaginary part of the high-dimensional channel information correspond to two neural networks, configuration parameters of the two neural networks may be the same or different.

For another example, when a structure of the second channel learning model is a convolutional neural network, each of a real part and an imaginary part of low-dimensional channel information may correspond to one convolutional neural network, that is, input information corresponding to a convolutional neural network 3 is the real part of the low-dimensional channel information, decoded output information is a real part of high-dimensional channel information (for example, the second channel information), input information corresponding to a convolutional neural network 4 is the imaginary part of the low-dimensional channel information, and decoded output information is an imaginary part of the high-dimensional channel information. When the real part and the imaginary part of the low-dimensional channel information correspond to two neural networks, configuration parameters of the two neural networks may be the same or different.

Determining a channel learning model may be determining one or more configuration parameters of the channel learning model.

In an example, the network device determines the first channel learning model and the second channel learning model, and sends a configuration parameter of the first channel learning model to the terminal device. Specifically, for a manner in which the network device determines the first channel learning model and the second channel learning model, refer to the description of determining, by the second communications apparatus, the new first channel learning model and the new second channel learning model in S420. For brevity, details are not described herein.

In another example, the terminal device determines the first channel learning model and the second channel learning model, and sends a configuration parameter of the second channel learning model to the network device. Specifically, for a manner in which the terminal device determines the first channel learning model and the second channel learning model, refer to the description of determining, by the first communications apparatus, the new first channel learning model and the new second channel learning model in S320. For brevity, details are not described herein.

Optionally, before S510, the method 500 may further include: The terminal device receives configuration information #1 sent by the network device. The configuration information #1 is used to indicate one or more of a resource, a code rate, a modulation scheme, a bit quantity, a feedback sequence, feedback configuration parameter content, and the like for sending the configuration parameter of the first channel learning model and/or the configuration parameter of the second channel learning model. Correspondingly, the terminal device may determine, based on the configuration information #1, the resource, the code rate, the modulation scheme, the bit quantity, or the feedback sequence for sending the configuration parameter of the first channel learning model and/or the configuration parameter of the second channel learning model. Optionally, the network device may send the configuration information #1 by using higher layer signaling, or may send the configuration information #1 by using physical layer signaling. The higher layer signaling may be RRC signaling or MAC signaling, and the physical layer signaling may be DCI signaling.

Optionally, before S510, the method 500 may further include: The terminal device receives configuration information #2 sent by the network device. The configuration information #2 is used to indicate one or more of a resource, a code rate, a modulation scheme, a bit quantity, a feedback sequence, feedback configuration parameter content, and the like for receiving the configuration parameter of the first channel learning model and/or the configuration parameter of the second channel learning model. Correspondingly, the terminal device may determine, based on the configuration information #2, the resource, the code rate, the modulation scheme, the bit quantity, or the feedback sequence for receiving the configuration parameter of the first channel learning model and/or the configuration parameter of the second channel learning model.

Optionally, the network device may send the configuration information #2 by using higher layer signaling, or may send the configuration information #2 by using physical layer signaling. The higher layer signaling may be RRC signaling or MAC signaling, and the physical layer signaling may be DCI signaling.

In another example, the terminal device determines the first channel learning model, and the network device determines the second channel learning model. It should be understood that when the terminal device and the network device respectively determine the channel learning models based on a same rule, the first channel learning model determined by the terminal device and the second channel learning model determined by the network device correspond to each other. For example, the first channel learning model determined by the terminal device based on a scenario in which the terminal device is located corresponds to the second channel learning model determined by the network device based on the scenario in which the terminal device is located.

For example, the first channel learning model may correspond to an encoding module in an auto-encoder model, and the second channel learning model may correspond to a decoding module in the auto-encoder model. The first channel learning model and the second channel learning model correspond to each other.

S520. The network device sends a reference signal. Correspondingly, in S520, the terminal device receives the reference signal.

For a manner in which the network device sends the reference signal to the terminal device, refer to the conventional technology. For brevity, details are not described in this embodiment of this application.

Optionally, S520 may be performed before S510, or S520 may be performed after S510. This is not limited in this application.

The reference signal may be a DMRS, a CSI-RS, a TRS, an SSB, or the like. This is not limited in this application.

For example, the terminal device may receive CSI-RS configuration information, and may receive the CSI-RS periodically, semi-persistently, or aperiodically based on the configuration information. The CSI-RS configuration information may refer to CSI measurement configuration information. The CSI configuration information may include at least one of CSI resource configuration information (CSI-ResourceConfig) and CSI report configuration information (CSI-ReportConfig).

Optionally, that the terminal device receives CSI-RS configuration information sent by the network device may further include: the terminal device receives the configuration parameter that is of the channel learning model and that is sent by the network device. For example, the configuration parameter of the channel learning model may be included in the CSI-RS configuration information.

Specifically, the configuration parameter of the channel learning model may be included in the CSI report configuration information.

Optionally, the terminal device may determine the channel learning model based on the configuration parameter that is of the channel learning model and that is sent by the network device. The network device may send the configuration parameter of the channel learning model by using higher layer signaling and/or physical layer signaling.

Optionally, a sequence of S520 and S510 is not limited in this application. For example, the channel learning model may be first determined and then the reference signal may be sent, or the reference signal may be first sent and then the channel learning model may be determined. For example, the channel learning model may be first determined and then the reference signal may be received, or the reference signal may be first received and then the channel learning model may be determined.

S530. The terminal device determines the first channel information based on target channel information and the first channel learning model.

The target channel information may be downlink channel information obtained by the terminal device based on the received reference signal. Specifically, for the target channel information, refer to the description in this application. For brevity, details are not described in this embodiment of this application.

For a manner in which the terminal device obtains the downlink channel information, refer to the conventional technology. For brevity, details are not described in this embodiment of this application.

The terminal device uses the measured downlink channel information as input data of the first channel learning model, and encodes or compresses the downlink channel information based on the first channel learning model, to obtain the first channel information.

For example, if the first channel learning model is a neural network model, the terminal device may encode a real part of the downlink channel information, to obtain a real part of low-dimensional channel information, and then encode an imaginary part of the downlink channel information, to obtain an imaginary part of the low-dimensional channel information. In this case, the first channel information may include the real part of the low-dimensional channel information and the imaginary part of the low-dimensional channel information.

For example, the terminal device may encode 64*1-dimensional complex-number downlink channel information based on the first channel learning model, to obtain two-dimensional real part information and two-dimensional imaginary part information, and then the terminal device may quantize the two-dimensional real part information and the two-dimensional imaginary part information, and use the two-dimensional real part information and the two-dimensional imaginary part information as the first channel information.

For another example, if the first channel learning model is a neural network model, the terminal device may jointly encode a real part and an imaginary part of the downlink channel information, to obtain low-dimensional channel information. In this case, the first channel information may include low-dimensional real-number information.

For example, the terminal device may encode 64*1-dimensional complex-number downlink channel information based on the first channel learning model, to obtain four-dimensional real-number information, and then the terminal device may quantize the four-dimensional real-number information, and use the four-dimensional real-number information as the first channel information.

S540. The terminal device sends the first channel information. Correspondingly, in S540, the network device receives the first channel information.

For a manner in which the terminal device sends the first channel information, refer to a manner in which the terminal device feeds back CSI in the conventional technology. For brevity, details are not described in this embodiment of this application.

Optionally, before S540, the method 500 may further include: The terminal device receives configuration information #3 sent by the network device. The configuration information #3 is used to indicate one or more of a resource, a code rate, a modulation scheme, a bit quantity, a feedback sequence, feedback configuration parameter content, content in the first channel information, and the like for sending the first channel information. Correspondingly, the terminal device may determine, based on the configuration information #2, the resource, the code rate, the modulation scheme, the bit quantity, the feedback sequence, the feedback configuration parameter content, or the content in the first channel information for sending the first channel information. In other words, the method 500 includes: The network device sends the configuration information #3, and the terminal device receives the configuration information #3.

Optionally, the network device may send the configuration information #3 by using higher layer signaling, or may send the configuration information #3 by using physical layer signaling. The higher layer signaling may be RRC signaling or MAC signaling, and the physical layer signaling may be DCI signaling.

Optionally, when the terminal device determines the second channel learning model, the terminal device may send the configuration parameter of the second channel learning model and the first channel information together, or may separately send the configuration parameter of the second channel learning model and the first channel information. For example, the terminal device sends the configuration parameter of the second channel learning model on a channel #1, and sends the first channel information on a channel #2; or the terminal device sends the configuration parameter of the second channel learning model and the first channel information on a channel #3. The channel #1 to the channel #3 may be PUCCHs, PUSCHs, physical feedback channels (PFCH), or other uplink channels.

Optionally, when the terminal device determines the first channel learning model and the second channel learning model, the terminal device may send the configuration parameter of the first channel learning model, the configuration parameter of the second channel learning model, and the first channel information together, or may separately send the configuration parameter of the first channel learning model, the configuration parameter of the second channel learning model, and the first channel information. For example, the terminal device sends the configuration parameter of the first channel learning model and the configuration parameter of the second channel learning model on a channel #1, and sends the first channel information on a channel #2; or the terminal device sends the configuration parameter of the first channel learning model, the configuration parameter of the second channel learning model, and the first channel information on a channel #3. The channel #1 to the channel #3 may be PUCCHs, PUSCHs, PFCHs, or other uplink channels.

Optionally, before S540, the method 500 may further include: The terminal device receives configuration information #4 sent by the network device. The configuration information #4 is used to indicate one or more of a resource, a code rate, a modulation scheme, a bit quantity, a feedback sequence, feedback configuration parameter content, content in the first channel information, and the like for sending the first channel information and the configuration parameter of the channel learning model. Correspondingly, the terminal device may determine, based on the configuration information #4, the resource, the code rate, the modulation scheme, the bit quantity, the feedback sequence, or the content in the first channel information for sending the first channel information and the configuration parameter of the channel learning model. In other words, the method 500 includes: The network device sends the configuration information #4, and the terminal device receives the configuration information #4.

Optionally, the network device may send the configuration information #4 by using higher layer signaling, or may send the configuration information #4 by using physical layer signaling. The higher layer signaling may be RRC signaling or MAC signaling, and the physical layer signaling may be DCI signaling.

Optionally, before S540, the method 500 may further include: The terminal device receives configuration information #5 sent by the network device. The configuration information #5 is used to indicate one or more of a resource, a code rate, a modulation scheme, a bit quantity, a feedback sequence, feedback configuration parameter content, and the like for sending the configuration parameter of the channel learning model. Correspondingly, the terminal device may determine, based on the configuration information #5, the resource, the code rate, the modulation scheme, the bit quantity, the feedback sequence, or the feedback configuration parameter content for sending the configuration parameter of the channel learning model. In other words, the method 500 includes: the network device sends the configuration information #5, and the terminal device receives the configuration information #5.

Optionally, the network device may send the configuration information #5 by using higher layer signaling, or may send the configuration information #5 by using physical layer signaling. The higher layer signaling may be RRC signaling or MAC signaling, and the physical layer signaling may be DCI signaling.

S550. The network device determines the second channel information based on the first channel information and the second channel learning model.

As described above, the data amount of the second channel information is the same as or similar to the data amount of the measured downlink channel information. In other words, the network device decodes or decompresses the first channel information based on the second channel learning model, to obtain the second channel information.

For example, if the second channel learning model is a neural network model, the network device may decode or decompress real part information in the low-dimensional channel information in the first channel information, to obtain high-dimensional real part information, and decode or decompress imaginary part information in the low-dimensional channel information in the first channel information, to obtain high-dimensional imaginary part information. The second channel information may include the high-dimensional real part information and the high-dimensional imaginary part information. In other words, the second channel information may be high-dimensional complex-number channel information.

For example, the network device may decode or decompress the two-dimensional real part information, to obtain high-dimensional real part information of 64*1 dimensions, and decode or decompress the two-dimensional imaginary part information, to obtain high-dimensional imaginary part information of 64*1 dimensions, and the network device may use the 64*1-dimensional real part information and the 64*1-dimensional imaginary part information as the second channel information.

For another example, if the second channel learning model is a neural network model, the network device may jointly decode or decompress the real part and the imaginary part of the low-dimensional channel information, to obtain high-dimensional real-number information. In other words, the second channel information may include the high-dimensional real-number information.

For example, the network device may decode or decompress the low-dimensional real-number channel information of four dimensions, to obtain 64*2-dimensional real-number information, and the network device may use the 64*2-dimensional real-number information as the second channel information.

Further, after determining the second channel information, the network device may perform precoding based on the second channel information, and perform data transmission based on determined precoding. In this way, precoding accuracy can be improved, and signal interference between cells and/or a plurality of terminal devices can be reduced, to improve communication performance.

Further, after determining the second channel information, the network device may determine scheduling information of data based on the second channel information, and perform data transmission based on the determined scheduling information. In this way, data transmission accuracy can be improved, to improve communication performance.

In the following description, an embodiment of this application provides a communication method that can be performed by a first communications apparatus. In other words, the following method is described from a perspective of the first communications apparatus. The method may include at least one of S510' to S540'.

S510' (namely, S510). The first communications apparatus determines a channel learning model. For detailed description of this step, refer to the description in S510. For brevity, details are not described herein.

S520' (namely, S520). The first communications apparatus receives a reference signal. For detailed description of this step, refer to the description in S520. For brevity, details are not described herein. A sequence of S510' and S520' may be that S520' is performed before S510'. This is not limited in this application.

S530' (namely, S530). The first communications apparatus determines first channel information based on target channel information and a first channel learning model. For detailed description of this step, refer to the description in S530. For brevity, details are not described herein.

S540' (namely, S540). The first communications apparatus sends the first channel information. For detailed description of this step, refer to the description in S540. For brevity, details are not described herein.

In the following description, an embodiment of this application provides a communication method that can be performed by a second communications apparatus. In other words, the following method is described from a perspective of the second communications apparatus. The method may include at least one of S510" to S540".

S510" (namely, S510). The second communications apparatus determines a channel learning model. For detailed description of this step, refer to the description in S510. For brevity, details are not described herein.

S520" (namely, S520). The second communications apparatus sends a reference signal. For detailed description of this step, refer to the description in S520. For brevity, details are not described herein. A sequence of S510" and S520" may be that S520' is performed before S510'. This is not limited in this application.

S530' (namely, S540). The second communications apparatus receives first channel information. For detailed description of this step, refer to the description in S540. For brevity, details are not described herein.

S540' (namely, S550). The second communications apparatus determines second channel information based on the first channel information and a second channel learning model. For detailed description of this step, refer to the description in S550. For brevity, details are not described herein.

In this method, a terminal device determines the first channel information based on a first channel learning model, and sends the first channel information to the network device. In this way, overheads of feeding back the channel information can be reduced, to improve communication performance. In addition, the network device may determine the second channel information based on the received first channel information and the second channel learning model, and further determine precoding and scheduling information for data transmission based on the second channel information.

tion. In this way, accuracy of channel obtaining can be improved, in other words, precoding accuracy can be improved, to help reduce interference between cells or a plurality of terminals, improve data transmission accuracy, and improve communication performance.

In the following description, an embodiment of this application provides a communication method. This embodiment provides a method for determining training, feedback, and/or update of a channel learning model based on a capability of a terminal device. The following method may be used as an independent embodiment, or may be combined with another embodiment of this application. Specifically, this is not limited in this application.

A radio channel changes with time. Therefore, after a network device and/or the terminal device determine/determines the channel learning model, the channel learning model may not be applicable to a current channel status as time changes. In this case, the network device and/or the terminal device need/needs to train, feed back, update, and/or the like the channel learning model.

For example, the capability of the terminal device may refer to at least one of the following terminal types: an active learning terminal, a network device-indicated terminal, and a passive receiving terminal.

The active learning terminal is a terminal device that can actively perform channel learning model training and send channel learning feedback signaling to the network device. The network device-indicated terminal is a terminal device that can perform channel learning model training based on a channel learning training indication sent by the network device and send channel learning feedback signaling to the network device. The passive receiving terminal is a terminal device that does not have a capability of performing channel learning model training and may determine a channel learning model by receiving signaling that is of a configuration parameter of the channel learning model and that is sent by the network device.

The channel learning feedback signaling may include a channel learning model training result, for example, information indicating whether a first channel learning model is applicable, a configuration parameter used to update the first channel learning model, and/or a configuration parameter used to update a second channel learning model. For details, refer to the description of the first message in S210 in this application. For brevity, details are not described herein.

For example, the capability of the terminal device may refer to at least one of the following types of terminals: the terminal device supports channel learning model training, the terminal device does not support channel learning model training, the terminal device enables channel learning model training, and the terminal device does not enable channel learning model training.

Further, the terminal device may send information about the capability of the terminal device to the network device, in other words, the terminal device may report the capability of the terminal device to the network device. For example, the terminal device may report whether channel learning model training is supported, or report a terminal type.

In the method, the method for determining a channel learning model based on a capability of a terminal device is more applicable to a case in which there are actually a plurality of terminal devices in a communications system, and channel learning models are determined, trained, fed back, and/or updated by using different methods based on different capabilities of the terminal devices. In this way, flexibility of the communications system can be improved, and the terminal devices with different capabilities are considered, thereby improving communication performance.

How each type of terminal device trains, feeds back, and/or updates a channel learning model is described below. For example, the active learning terminal may communicate with the network device by performing at least one step in a method in FIG. 16, the network device-indicated terminal may communicate with the network device by performing at least one step in a method in FIG. 15, and the passive receiving terminal may communicate with the network device by performing at least one step in a method in FIG. 17. For example, the terminal device that does not support (or does not enable) channel learning model training may communicate with the network device by performing at least one step in the method in FIG. 15 or FIG. 16, and the terminal device that supports (or enables) channel learning model training may communicate with the network device by performing at least one step in the method in FIG. 17.

Figure 15:
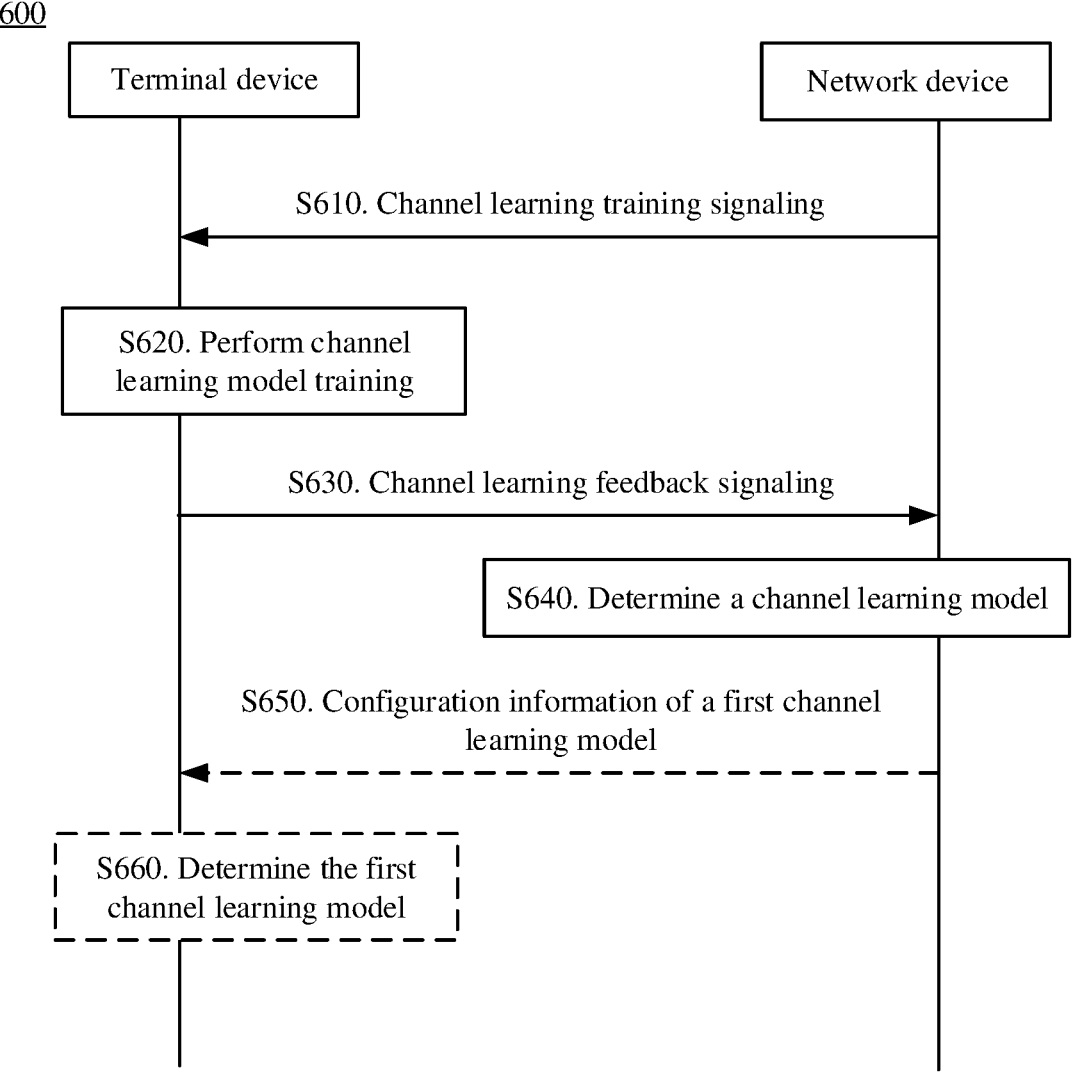
Figure 16:
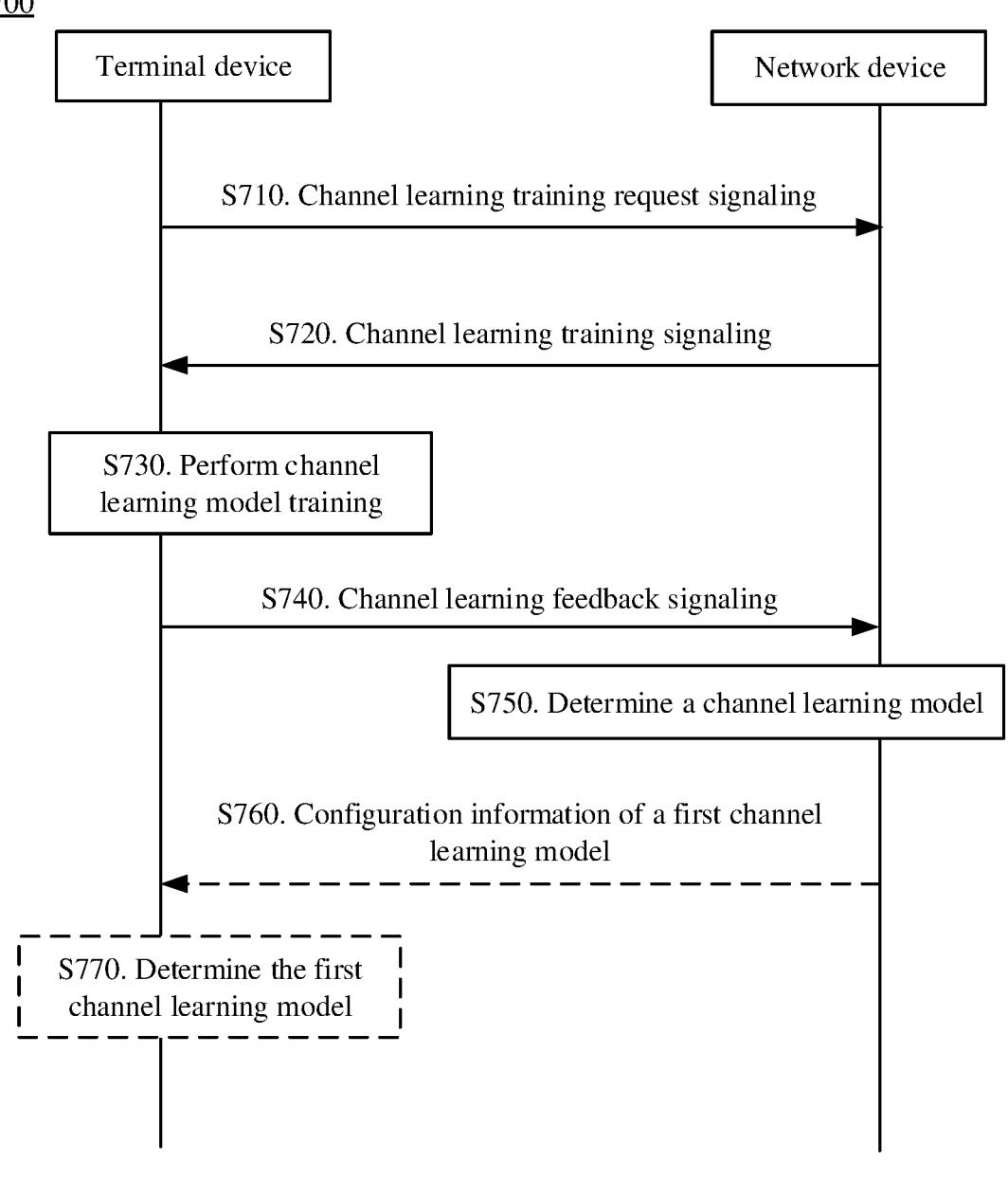
Figure 17:
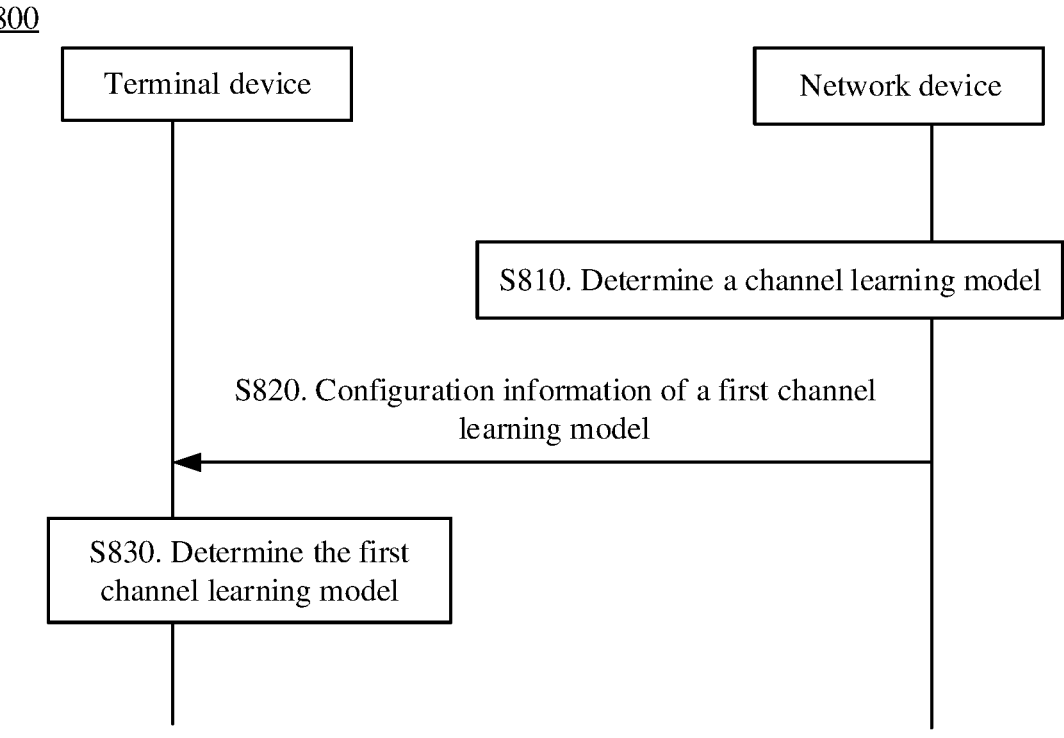

Optionally, in the methods in FIG. 15 to FIG. 17, a first communications apparatus and/or a second communications apparatus may first determine a capability of a terminal device. For a specific determining method, refer to the foregoing description. In other words, a step of sending, by the first communications apparatus, information about the capability of the terminal device and receiving, by the second communications apparatus, the information about the capability of the terminal device may be included.

FIG. 15 is a schematic flowchart of a communication method according to an embodiment of this application. This embodiment of this application may be used as an independent embodiment, or may be combined with another embodiment of this application. Specifically, this is not limited in this application. In the method shown in FIG. 15, description is provided by using an example in which a first communications apparatus is a terminal device and a second communications apparatus is a network device. As shown in FIG. 15, the method 600 may include at least one of S610 to S660. The steps are described below in detail.

S610. The network device sends channel learning training signaling (an example of first indication information). Correspondingly, in S610, the terminal device receives the channel learning training signaling.

The channel learning training signaling is used to indicate the terminal device to perform channel learning model training, that is, used to indicate the terminal device to determine whether a first channel learning model is applicable, and/or indicate the terminal device to determine a channel learning model.

Optionally, when the network device determines the first channel learning model and a second channel learning model, the channel learning training signaling may further include a configuration parameter of the first channel learning model. The first channel learning model is used to determine first channel information based on measured downlink channel information, and a data amount of the first channel information is less than a data amount of the measured downlink channel information.

Optionally, the channel learning training signaling may further include a configuration parameter of the second channel learning model. The second channel learning model is used to determine second channel information based on the first channel information.

Optionally, the channel learning training signaling may further include one or more of a channel learning model training time, configuration information of a reference signal for channel learning model training, and information related to feedback content for channel learning training.

Optionally, one or more of the configuration parameter of the first channel learning model, the configuration parameter of the second channel learning model, the channel learning model training time, the configuration information of the reference signal for channel learning model training, and the information related to the feedback content for channel learning model training may be sent to the terminal device by using different signaling.

Optionally, the channel learning training signaling may be sent by using higher layer signaling, for example, MAC layer signaling or RRC layer signaling, or may be sent by using physical layer signaling, for example, DCI signaling. For more description of the channel learning training signaling, refer to the description of the first indication information in S230. For brevity, details are not described herein.

S620. The terminal device performs channel learning model training based on the channel learning training signaling.

The terminal device may perform channel learning model training based on the received channel learning training signaling, and determine whether the first channel learning model is applicable or whether the first channel learning model needs to be updated. For a method for determining, by the terminal device, whether the first channel learning model is applicable, refer to the description in S210.

Optionally, when the terminal device determines that the first channel learning model is not applicable, the terminal device may further determine a new first channel learning model and a new second channel learning model. For a method for determining, by the terminal device, the first channel learning model and the second channel learning model, refer to the description in S320.

S630. The terminal device sends channel learning feedback signaling (an example of a first message). Correspondingly, in S630, the network device receives the channel learning feedback signaling.

The channel learning feedback signaling may include a channel learning model training result, for example, information indicating whether the first channel learning model is applicable, a configuration parameter used to update the first channel learning model, and/or a configuration parameter used to update the second channel learning model.

Optionally, before the terminal device sends the channel learning feedback signaling to the network device, the terminal device may send a channel learning feedback signaling sending request to the network device. The sending request is used to indicate that the terminal device requests sending of the channel learning feedback signaling from the terminal device. The sending request may be similar to a scheduling request (SR) in the conventional technology. After the network device receives the sending request, the network device may send scheduling information. The scheduling information indicates the terminal device to send the channel learning feedback signaling. The scheduling information may include configuration information related to the channel learning feedback signaling, for example, one or more of a time-frequency resource, feedback content, a feedback code rate, and a feedback bit quantity.

Optionally, if the terminal device and the network device preconfigure several groups of second channel learning models and preconfigure model identifiers corresponding to the second channel learning models, when feeding back the configuration parameter used to update the second channel learning model, the terminal device may feed back an identifier only of the determined second channel learning model. For example, the terminal device and the network device preconfigure four groups of channel learning models, and the four groups of channel learning models respectively correspond to a model identifier 1, a model identifier 2, a model identifier 3, and a model identifier 4. If the second channel learning model determined by the terminal device is a third group of channel learning models, the terminal device adds the model identifier 3 to the channel learning feedback signaling, and sends the channel learning feedback signaling to the network device. Correspondingly, the network device may determine, based on the model identifier 3, the second channel learning model applicable to the terminal device.

Optionally, if the terminal device and the network device preconfigure several groups of first channel learning models and preconfigure model identifiers corresponding to the first channel learning models, when feeding back the configuration parameter used to update the first channel learning model, the terminal device may feed back an identifier only of the determined first channel learning model. For example, the terminal device and the network device preconfigure four groups of channel learning models, and the four groups of channel learning models respectively correspond to a model identifier 1, a model identifier 2, a model identifier 3, and a model identifier 4. If the first channel learning model determined by the terminal device is a third group of channel learning models, the terminal device adds the model identifier 3 to the channel learning feedback signaling, and sends the channel learning feedback signaling to the network device. Correspondingly, the network device may determine, based on the model identifier 3, the first channel learning model applicable to the terminal device.

Optionally, if the terminal device and the network device preconfigure several groups of channel learning models (including the first channel learning model and the second channel learning model) and preconfigure model identifiers corresponding to the channel learning models, when feeding back the configuration parameter used to update the first channel learning model and the configuration parameter used to update the second channel learning model, the terminal device may feed back an identifier only of the determined channel learning model. For example, the terminal device and the network device preconfigure four groups of channel learning models, and the four groups of channel learning models respectively correspond to a model identifier 1, a model identifier 2, a model identifier 3, and a model identifier 4. If the channel learning model determined by the terminal device is a third group of channel learning models, the terminal device adds the model identifier 3 to the channel learning feedback signaling, and sends the channel learning feedback signaling to the network device. Correspondingly, the network device may determine, based on the model identifier 3, the channel learning model applicable to the terminal device.

In this method, in the channel learning feedback signaling, the identifier of the channel learning model is fed back to determine the channel learning model. In this way, a feedback bit quantity can be reduced, and feedback overheads can be reduced, to improve communication performance.

Specifically, for content such as feedback content, a feedback manner, and a feedback resource of the channel learning feedback signaling, refer to the description of the first message in S210. For brevity, details are not described herein.

Optionally, before S630, the method 600 may further include: The terminal device receives configuration information #6 sent by the network device. The configuration information #6 is used to indicate one or more of a resource, a code rate, a modulation scheme, a bit quantity, a feedback sequence, feedback content, and the like for sending the channel learning feedback signaling. Correspondingly, the terminal device may determine, based on the configuration information #3, the resource, the code rate, the modulation scheme, the bit quantity, the feedback sequence, or the feedback content for sending the channel learning feedback signaling.

Optionally, the network device may send the configuration information #6 by using higher layer signaling, or may send the configuration information #6 by using physical layer signaling. The higher layer signaling may be RRC signaling or MAC signaling, and the physical layer signaling may be DCI signaling.

Optionally, the channel learning feedback signaling may be sent together with the first channel information, or may be sent separately from the first channel information. For example, the terminal device may send the channel learning feedback signaling and the first channel information by using one piece of signaling, or the terminal device may send the channel learning feedback signaling and the first channel information by using a plurality of pieces of signaling. A specific sending manner may be predefined, or may be indicated by the network device. Specifically, this is not limited herein.

Optionally, after the terminal device determines that the channel learning model is not applicable, and determines the configuration parameter of the channel learning model, the terminal device may send the configuration parameter of the channel learning model to and/or store the configuration parameter of the channel learning model in a database or another network element. For detailed description of the database, refer to the description in S220. For brevity, details are not described herein.

S640. The network device determines a channel learning model.

The network device may determine, based on the received channel learning feedback signaling, whether the current channel learning model is applicable, and/or determine the configuration parameter of the channel learning model.

Optionally, the network device may determine, with reference to the description of determining, by the second communications apparatus, whether the channel learning model is applicable in S410, whether the channel learning model is applicable. For brevity, details are not described herein.

Optionally, the network device may determine the channel learning model with reference to the description of determining, by the second communications apparatus, the channel learning model in S420. For brevity, details are not described herein.

For example, if the channel learning feedback signaling is used to indicate that the current channel learning model is not applicable, and the channel learning feedback signaling includes the configuration parameter used to update the first channel learning model and/or the configuration parameter used to update the second channel learning model, the network device may determine, based on the channel learning feedback signaling, that the current channel learning model is not applicable, and may update the current first channel learning model and/or the current second channel learning model, to determine a new second channel learning model.

For another example, if the channel learning feedback signaling is used to indicate that the current channel learning model is not applicable, the network device may determine, based on the channel learning feedback signaling, that the current channel learning model is not applicable. Further, the method 600 may further include S650 and S660.

Optionally, S650 and S660 may also be used as independent embodiments, or may be combined with another embodiment. Specifically, this is not limited in this application. This embodiment may provide a method for determining a channel learning model.

S650. The network device sends configuration information of the first channel learning model. Correspondingly, in S650, the terminal device receives the configuration information of the first channel learning model.

After determining that the current channel learning model is not applicable, the network device may determine a new first channel learning model and a new second channel learning model, and send a configuration parameter of the new first channel learning model to the terminal device, to update the current first channel learning model. In other words, the network device may send the configuration parameter used to update the first channel learning model to the terminal device.

Optionally, the network device may send the configuration parameter of the new first channel learning model to and/or store the configuration parameter of the new first channel learning model in a database #2. For description of the database #2, refer to the description in S220.

Optionally, in this embodiment of this application, when the terminal device accesses a cell in which the network device is located, when the terminal device establishes an RRC connection to the network device, or when the terminal device performs cell handover, the network device may send the configuration information of the channel learning model to the terminal device.

S660. The terminal device determines the first channel learning model.

The terminal device updates the current first channel learning model based on the received configuration parameter used to update the first channel learning model, to determine the new first channel learning model.

Optionally, the terminal device may send the configuration parameter of the new first channel learning model to and/or store the configuration parameter of the new first channel learning model in a database #1. For description of the database #1, refer to the description in S220.

Optionally, in this embodiment of this application, when the terminal device accesses the cell in which the network device is located, when the terminal device establishes an RRC connection to the network device, or when the terminal device performs cell handover, the terminal device may receive the configuration information that is of the channel learning model and that is sent by the network device, and the terminal device may determine the channel learning model based on the configuration parameter of the channel learning model.

In the following description, an embodiment of this application provides a communication method that can be performed by a first communications apparatus. In other words, the following method is described from a perspective of the first communications apparatus. The method may include at least one of S610' to S640'.

S610' (namely, S610). The first communications apparatus receives channel learning training signaling. For detailed description of this step, refer to the description in S610. For brevity, details are not described herein.

S620' (namely, S610). The first communications apparatus performs channel learning model training based on the channel learning training signaling. For detailed description of this step, refer to the description in S620. For brevity, details are not described herein.

S630' (namely, S630). The first communications apparatus sends channel learning feedback signaling. For detailed description of this step, refer to the description in S630. For brevity, details are not described herein.

S640' (namely, S650). The first communications apparatus receives configuration information of a channel learning model. For detailed description of this step, refer to the description in S650. For brevity, details are not described herein.

In the following description, an embodiment of this application provides a communication method that can be performed by a second communications apparatus. In other words, the following method is described from a perspective of the second communications apparatus. The method may include at least one of S610" to S640".

S610" (namely, S610). The second communications apparatus sends channel learning training signaling. For detailed description of this step, refer to the description in S610. For brevity, details are not described herein.

S620" (namely, S630). The second communications apparatus receives channel learning feedback signaling. For detailed description of this step, refer to the description in S630. For brevity, details are not described herein.

S630" (namely, S640). The second communications apparatus determines a channel learning model. For detailed description of this step, refer to the description in S640. For brevity, details are not described herein.

S640" (namely, S650). The second communications apparatus sends configuration information of the channel learning model. For detailed description of this step, refer to the description in S650. For brevity, details are not described herein.

In this method, a terminal device performs channel learning model training based on the channel learning training signaling from the network device, which is applicable to a scenario in which the network device determines that the channel learning model is not applicable. When determining that the channel learning model is not applicable, the network device indicates, in a timely manner, the terminal device to perform channel learning model training, and determines an applicable channel learning model. In this way, accuracy of the channel learning model can be improved, and the channel learning model can be updated in a timely manner, thereby improving communication performance.

FIG. 16 is a schematic flowchart of a communication method according to an embodiment of this application. This embodiment of this application may be used as an independent embodiment, or may be combined with another embodiment of this application. Specifically, this is not limited in this application. In the method shown in FIG. 16, description is provided by using an example in which a first communications apparatus is a terminal device and a second communications apparatus is a network device. As shown in FIG. 16, the method 700 may include at least one of S710 to S770. The steps are described below in detail.

S710. The terminal device sends channel learning training request signaling (an example of a first request message) to the network device. Correspondingly, in S710, the network device receives the channel learning training request signaling sent by the terminal device.

The channel learning training request signaling is used to indicate that the terminal device requests to perform channel learning model training, and/or is used to indicate that the terminal device requests feedback of channel learning training signaling.

Optionally, the channel learning training request signaling may be sent on an SR resource.

S720. The network device sends channel learning training signaling (an example of first indication information). Correspondingly, in S720, the terminal device receives the channel learning training signaling.

S730. The terminal device performs channel learning model training based on the channel learning training signaling.

S740. The terminal device sends channel learning feedback signaling (an example of a first message). Correspondingly, in S740, the network device receives the channel learning feedback signaling.

S750. The network device determines a channel learning model.

S760. The network device sends configuration information of a first channel learning model. Correspondingly, in S760, the terminal device receives the configuration information of the first channel learning model.

S770. The terminal device determines the first channel learning model.

It should be understood that in FIG. 16, only an example in which S710 is performed before S730 is used. This should constitute no limitation on this embodiment of this application. Optionally, S710 may be performed between S730 and S740. For example, S710 may be performed after S730. For example, S710 may be performed before S740.

S720 to S770 may be the same as S610 to S660 in the method 600. For brevity, details are not described in this embodiment of this application.

Optionally, when the terminal device and the network device predefine configuration information related to sending of the channel learning feedback signaling, S710 and S720 in the method 700 may not be performed. The configuration information related to sending of the channel learning feedback signaling may include a time-frequency resource occupied by the channel learning feedback information, content in the channel learning feedback signaling, a feedback code rate of the channel learning feedback signaling, and a feedback bit quantity of the channel learning feedback signaling.

In the following description, an embodiment of this application provides a communication method that can be performed by a first communications apparatus. In other words, the following method is described from a perspective of the first communications apparatus. The method may include at least one of S710' to S750'.

S710' (namely, S710). The first communications apparatus sends channel learning training request signaling. For detailed description of this step, refer to the description in S710. For brevity, details are not described herein.

S720' (namely, S720). The first communications apparatus receives channel learning training signaling. For detailed description of this step, refer to the description in S610. For brevity, details are not described herein.

S730' (namely, S730). The first communications apparatus performs channel learning model training based on the channel learning training signaling. For detailed description of this step, refer to the description in S620. For brevity, details are not described herein.

S740' (namely, S740). The first communications apparatus sends channel learning feedback signaling. For detailed description of this step, refer to the description in S630. For brevity, details are not described herein.

S750' (namely, S760). The first communications apparatus receives configuration information of a channel learning model. For detailed description of this step, refer to the description in S650. For brevity, details are not described herein.

In the following description, an embodiment of this application provides a communication method that can be performed by a second communications apparatus. In other words, the following method is described from a perspective of the second communications apparatus. The method may include at least one of S710" to S750".

S710" (namely, S710). The second communications apparatus receives channel learning training request signaling. For detailed description of this step, refer to the description in S710. For brevity, details are not described herein.

S720" (namely, S720). The second communications apparatus sends channel learning training signaling. For detailed description of this step, refer to the description in S610. For brevity, details are not described herein.

S730" (namely, S740). The second communications apparatus receives channel learning feedback signaling. For detailed description of this step, refer to the description in S630. For brevity, details are not described herein.

S740" (namely, S750). The second communications apparatus determines a channel learning model. For detailed description of this step, refer to the description in S640. For brevity, details are not described herein.

S750" (namely, S760). The second communications apparatus sends configuration information of the channel learning model. For detailed description of this step, refer to the description in S650. For brevity, details are not described herein.

In this method, a terminal device may send the channel learning training request signaling to the network device to request to perform channel learning model training, which is applicable to a scenario in which the terminal device determines that the channel learning model is not applicable. When determining that the channel learning model is not applicable, the terminal device may notify the network device in a timely manner, to request an indication for performing channel learning model training, so as to determine an applicable channel learning model. In this way, accuracy of the channel learning model is improved, and the channel learning model is updated in a timely manner, thereby improving communication performance.

FIG. 17 is a schematic flowchart of a communication method according to an embodiment of this application. This embodiment of this application may be used as an independent embodiment, or may be combined with another embodiment of this application. Specifically, this is not limited in this application. In the method shown in FIG. 17, description is provided by using an example in which a first communications apparatus is a terminal device and a second communications apparatus is a network device. As shown in FIG. 17, the method 800 may include at least one of S810 to S830. The steps are described below in detail.

S810. The network device determines a channel learning model.

Optionally, the network device may determine the channel learning model with reference to the description of determining, by the second communications apparatus, the channel learning model in S410. For brevity, details are not described herein.

S820. The network device sends configuration information of the channel learning model. Correspondingly, in S820, the terminal device receives the configuration information of the channel learning model.

In this embodiment of this application, the configuration information of the channel learning model may include information about a configuration parameter of the channel learning model.

Optionally, for sending of the configuration information of the channel learning model by the network device, refer to the description of sending the second message by the second communications apparatus, where the second message is used to indicate the one or more configuration parameters used to update the first channel learning model in S420. For brevity, details are not described herein.

S830. The terminal device determines the channel learning model based on the configuration information of the channel learning model.

In the following description, an embodiment of this application provides a communication method that can be performed by a first communications apparatus. In other words, the following method is described from a perspective of the first communications apparatus. The method may include at least one of S810' and S820'.

S810' (namely, S820). The first communications apparatus receives configuration information of a channel learning model. For detailed description of this step, refer to the description in S650. For brevity, details are not described herein.

S820' (namely, S830). The first communications apparatus determines the channel learning model based on the configuration information of the channel learning model. For detailed description of this step, refer to the description in S660. For brevity, details are not described herein.

In the following description, an embodiment of this application provides a communication method that can be performed by a second communications apparatus. In other words, the following method is described from a perspective of the second communications apparatus. The method may include at least one of S810" and S820".

S810" (namely, S810). The second communications apparatus determines a channel learning model. For detailed description of this step, refer to the description in S410. For brevity, details are not described herein.

S820" (namely, S820). The second communications apparatus sends configuration information of the channel learning model. For detailed description of this step, refer to the description in S420. For brevity, details are not described herein.

Optionally, in this embodiment of this application, when a terminal device accesses a cell in which the network device is located, when a terminal device establishes an RRC connection to the network device, or when a terminal device performs cell handover, the terminal device may receive the configuration information that is of the channel learning model and that is sent by the network device, and the terminal device may determine the channel learning model based on a configuration parameter of the channel learning model.

In this method, the terminal device determines the channel learning model based on the configuration information that is of the channel learning model and that is sent by the network device, which is applicable to a scenario in which the terminal device does not have a capability of performing channel learning model training, or is applicable to a scenario in which processing complexity of the terminal device is to be reduced. In other words, the terminal device may determine an applicable channel learning model without performing channel learning model training. In this way, accuracy of the channel learning model can be improved, and the channel learning model can be updated in a timely manner, thereby improving communication performance.

The following embodiment provides a communication method. This embodiment provides a method for determining channel learning feedback signaling based on presence or absence of channel learning training signaling. This embodiment of this application may be used as an independent embodiment, or may be combined with another embodiment of this application. Specifically, this is not limited in this application. The following one or more methods may be used independently or jointly. Specifically, this is not limited in this application.

A first communications apparatus may determine at least one of the following information based on whether channel learning training signaling is received:

a. whether channel learning feedback signaling includes information indicating whether a channel learning model is applicable;

b. a meaning of a feedback value in the channel learning feedback signaling; and c. at least one of feedback content, a feedback manner, and a feedback resource of the channel learning feedback signaling.

A second communications apparatus may determine at least one of the following information based on whether channel learning training signaling is sent:

a. whether channel learning feedback signaling includes information indicating whether a channel learning model is applicable;

b. a meaning of a feedback value in the channel learning feedback signaling; and c. at least one of feedback content, a feedback manner, and a feedback resource of the channel learning feedback signaling.

Description is provided below by using an example in which the first communications apparatus is a terminal device and the second communications apparatus is a network device.

In a possible implementation, whether the channel learning feedback signaling includes the information indicating whether the channel learning model is applicable may be determined based on whether the network device sends the channel learning training signaling. In other words, the network device determines, based on whether the channel learning training signaling is sent, whether the channel learning feedback signaling includes the information indicating whether the channel learning model is applicable.

In a possible implementation, whether the channel learning feedback signaling includes the information indicating whether the channel learning model is applicable may be determined based on whether the terminal device receives the channel learning training signaling. In other words, the terminal device determines, based on whether the channel learning training signaling is sent, whether the channel learning feedback signaling includes the information indicating whether the channel learning model is applicable.

Scenario 1: The network device sends the channel learning training signaling to the terminal device.

When the terminal device receives the channel learning training signaling sent by the network device, the terminal device may send the channel learning feedback signaling to the network device based on target channel information and the channel learning model.

The channel learning feedback signaling may include the information indicating whether the channel learning model is applicable, or the channel learning feedback signaling does not include the information indicating whether the channel learning model is applicable.

For example, the network device indicates the terminal device to perform channel learning model training, to determine whether the channel learning model is applicable. Therefore, the network device sends the channel learning training signaling. In this scenario, the network device does not determine whether the channel learning model is applicable. Therefore, the channel learning feedback signaling sent by the terminal device may include the information indicating whether the channel learning model is applicable.

For another example, the network device determines that the channel learning model is not applicable. Therefore, the network device sends the channel learning training signaling to determine a more appropriate channel learning model. In this case, the channel learning feedback signaling sent by the terminal device may not include the information indicating whether the channel learning model is applicable.

Optionally, whether the channel learning feedback signaling includes the information indicating whether the channel learning model is applicable may be predefined in a protocol, or may be notified by the network device to the terminal device by using signaling. Specifically, this is not limited in this application.

Scenario 2: The network device does not send the channel learning training signaling to the terminal device.

Optionally, when the network device sends the channel learning training signaling to the terminal device, the network device determines that the channel learning feedback includes the information indicating whether the channel learning model is applicable. When the network device does not send the channel learning training signaling to the terminal device, the network device determines that the channel learning feedback does not include the information indicating whether the channel learning model is applicable.

Optionally, when the terminal device receives the channel learning training signaling, the terminal device determines that the channel learning feedback includes the information indicating whether the channel learning model is applicable. When the terminal device does not receive the channel learning training signaling, the terminal device determines that the channel learning feedback does not include the information indicating whether the channel learning model is applicable.

Optionally, when the channel learning feedback signaling includes the information indicating whether the channel learning model is applicable, the network device may determine, in at least one of the following manners, whether the channel learning model is applicable:

In a possible implementation, the information in the channel learning feedback signaling indicates whether the channel learning model is applicable.

For example, 1-bit information indicates whether the channel learning model is applicable.

Whether the channel learning model is applicable may be determined by feeding back the 1-bit information in the channel learning feedback signaling. The 1-bit information is used to indicate whether the channel learning model is applicable. For example, when the 1-bit information is "0", it indicates that the channel learning model is not applicable, and when the 1-bit information is "1", it indicates that the channel learning model is applicable; or vice versa.

In a possible implementation, the feedback value in the channel learning feedback signaling indicates whether the channel learning model is applicable.

The feedback value in the channel learning feedback signaling may be at least one of the following: a rank value, a CQI value, and a CRI value.

(1) Rank Value

In the conventional technology, the rank value fed back by the terminal device may range from 1 to R, and R is a positive integer. For example, R is 8. A bit quantity of a rank field may be determined based on a maximum quantity of layers supported by the terminal device and a quantity of antenna ports. For example, the bit quantity of the rank field is obtained by rounding up $\log_2(\min(\text{quantity of layers}, \text{quantity of antenna ports}))$, for example, by rounding up $\log_2(R)$. For example, if the terminal device supports a maximum of four layers, the rank value may range from 1 to 4, and the rank value may be indicated by using 2 bits. For example, if the quantity of antenna ports is 8, and the terminal device supports a maximum of four layers, the rank value may range from 1 to 4, and the rank value may be indicated by using 2 bits.

Optionally, when the network device does not send the channel learning training signaling to the terminal device, or when the terminal device does not receive the channel learning feedback signaling, the network device and/or the terminal device may determine that the bit quantity of the rank field is obtained by rounding up $\log_2(\min(\text{quantity of layers}, \text{quantity of antenna ports}))$.

When the network device sends the channel learning training signaling to the terminal device, or when the terminal device receives the channel learning training signaling sent by the network device, the terminal device and the network device may determine that the rank value may range from 0 to R, and R is a positive integer. For example, R is 8. In this case, the bit quantity of the rank field is obtained by rounding up $\log_2(\min(\text{quantity of layers}, \text{quantity of antenna ports})+1)$, for example, by rounding up $\log_2(R+1)$. When the rank value is 0, it indicates that the channel learning model is not applicable.

Optionally, when the network device sends the channel learning training signaling to the terminal device, or when the terminal device receives the channel learning feedback signaling, the network device and/or the terminal device may determine that the bit quantity of the rank field is obtained by rounding up $\log_2(\min(\text{quantity of layers}, \text{quantity of antenna ports})+1)$.

For example, when the network device sends the channel learning training signaling to the terminal device, the network device may determine, based on information indicating that the rank value is 0, that a first channel learning model is not applicable. Alternatively, when the rank value is 0, it indicates that the channel learning model is not applicable.

For example, when the terminal device receives the channel learning training signaling sent by the network device, and the terminal device determines that the first channel learning model is not applicable, the terminal device may send the information indicating that the rank value is 0. When the rank value is 0, it indicates that the channel learning model is not applicable.

(2) CQI Value

Optionally, when the CQI value is 0 (in other words, a CQI index is equal to 0), it may indicate that the channel learning model is not applicable.

For example, when the network device sends the channel learning training signaling to the terminal device, the network device may determine, based on information indicating that the CQI value is 0, that the first channel learning model is not applicable. Alternatively, when the CQI value is 0, it indicates that the channel learning model is not applicable.

For example, when the terminal device receives the channel learning training signaling sent by the network device, and the terminal device determines that the first channel learning model is not applicable, the terminal device may send the information indicating that the CQI value is 0. When the CQI value is 0, it indicates that the channel learning model is not applicable.

(3) CRI Value

In the conventional technology, the CRI value fed back by the terminal device corresponds to a measured CSI-RS resource. For example, if there are C CSI-RS resources, where C is a positive integer, the CRI value may range from 1 to C. A bit quantity of a CRI field may be determined based on a configured quantity of CSI-RS resources. For example, the bit quantity of the CRI field is obtained by rounding up $\log_2(C)$. For example, if the terminal device configures two measured CSI-RS resources, the CRI needs to be indicated by using only 1 bit. For example, a bit 0 represents a first configured CSI-RS resource, and a bit 2 represents a second configured CSI-RS resource.

Optionally, when the network device does not send the channel learning training signaling to the terminal device, or when the terminal device does not receive the channel learning feedback signaling, the network device and/or the terminal device may determine that the bit quantity of the CRI field is obtained by rounding up $\log_2(C)$, where C is a quantity of CSI-RS resources.

When the network indicates the channel learning training signaling to the terminal device, the CRI value may range from 0 to C, where C is a positive integer. For example, C is 2. In this case, the bit quantity of the CRI field is obtained by rounding up $\log_2(C+1)$. When the CRI value is 0, it indicates that the channel learning model is not applicable.

Optionally, when the network device sends the channel learning training signaling to the terminal device, or when the terminal device receives the channel learning feedback signaling, the network device and/or the terminal device may determine that the bit quantity of the CRI field is obtained by rounding up $\log_2(C+1)$, where C is a quantity of CSI-RS resources.

In a possible implementation, content in the channel learning feedback signaling may be determined based on feedback content indicated in the channel learning training signaling sent by the network device. For details, refer to the description in another embodiment of this application. Details are not described herein.

Optionally, the channel learning feedback signaling may include a performance indicator of the current channel learning model, for example, a related performance status used to determine whether the model is applicable. The network device may determine, based on the received channel learning feedback signaling, whether the channel learning model is applicable. For details, refer to the description in another embodiment of this application. Details are not described herein.

Optionally, the feedback manner of the channel learning feedback signaling may be determined based on whether the network device sends the channel learning training signaling. In other words, the network device determines the feedback manner of the channel learning feedback signaling based on whether the channel learning training signaling is sent.

Optionally, the feedback manner of the channel learning feedback signaling may be determined based on whether the terminal device receives the channel learning training signaling. In other words, the terminal device determines the feedback manner of the channel learning feedback signaling based on whether the channel learning training signaling is received.

The feedback manner of the channel learning feedback signaling may include at least one of the following: periodic feedback/aperiodic, feedback/semi-persistent or differential feedback/a manner of feeding back an absolute value/a manner of feeding back a relative value, and the feedback resource. For details, refer to the description in another embodiment of this application. Details are not described herein.

For example, when the network device sends the channel learning training signaling to the terminal device, the network device determines that the channel learning feedback signaling may be aperiodically sent, or when the network device does not send the channel learning training signaling to the terminal device, the network device determines that the channel learning feedback signaling may be periodically sent; or vice versa.

For example, when the terminal device receives the channel learning training signaling, the terminal device may determine that the channel learning feedback signaling is aperiodically sent, or when the terminal device does not receive the channel learning training signaling, the terminal device may determine that the channel learning feedback signaling is periodically sent; or vice versa.

For example, when the terminal receives the channel learning training signaling, the terminal device determines that the channel learning feedback signaling is fed back by feeding back an absolute value, or when the terminal device does not receive the channel learning training signaling, the terminal device determines that the channel learning feedback signaling is fed back through differential feedback or by feeding back a relative value; or vice versa.

For example, when the network device sends the channel learning training signaling to the terminal device, the network device determines that the channel learning feedback signaling is fed back by feeding back an absolute value, or when the network device does not send the channel learning training signaling to the terminal device, the network device determines that the channel learning feedback signaling is fed back through differential feedback or by feeding back a relative value; or vice versa.

For example, when the terminal device receives the channel learning training signaling, the channel learning feedback signaling is transmitted on a PUSCH, or when the terminal device does not receive the channel learning training signaling, the channel learning feedback signaling is transmitted on a PUCCH; or vice versa.

For example, when the network device sends the channel learning training signaling to the terminal device, the channel learning feedback signaling is transmitted on a PUSCH, or when the network device does not send the channel learning training signaling to the terminal device, the channel learning feedback signaling is transmitted on a PUCCH; or vice versa.

In this embodiment, different channel learning feedback signaling is designed for cases indicating whether the channel learning training signaling is sent or received. In this way, there can be different feedback information in different scenarios, and the channel learning feedback signaling can be properly and efficiently sent and/or received, to reduce feedback overheads, so as to improve communication performance.

The following embodiment provides a method for designing channel learning feedback signaling based on whether a channel learning model is applicable. This embodiment of this application may be used as an independent embodiment, or may be combined with another embodiment of this application. Specifically, this is not limited in this application. The following one or more methods may be used independently or jointly. Specifically, this is not limited in this application.

In a possible implementation, a first communications apparatus and/or a second communications apparatus may determine feedback content in channel learning feedback signaling based on whether a channel learning model is applicable.

Description is provided below by using an example in which the first communications apparatus is a terminal device and the second communications apparatus is a network device.

For example, the channel learning feedback signaling may include first channel information.

If the channel learning model is applicable, the terminal device may determine the first channel information based on the channel learning model, and feed back the first channel information. In this manner, the channel learning feedback signaling includes the first channel information.

Alternatively, if the channel learning model is applicable, the terminal device may send information indicating that the channel learning model is applicable and the first channel information. In this manner, the channel learning feedback signaling includes the information indicating that the channel learning model is applicable and the first channel information.

If the channel learning model is not applicable, the terminal device may send, to the network device, information indicating that the current channel learning model is not applicable. Further, after receiving the information, the network device may send a configuration parameter of the channel learning model to the terminal device. Further, the terminal device determines the channel learning model based on the received configuration parameter of the channel learning model, determines the first channel information based on the channel learning model, and feeds back the first channel information. In this manner, the channel learning feedback signaling includes only the information indicating that the channel learning model is not applicable.

Alternatively, if the channel learning model is not applicable, the terminal device may send, to the network device, information indicating that the current channel learning model is not applicable, and send the first channel information obtained based on the current channel learning model. In this manner, the channel learning feedback signaling includes the information indicating that the channel learning model is not applicable and the first channel information determined based on the current channel learning model.

Alternatively, if the channel learning model is not applicable, the terminal device may obtain the first channel information based on an updated channel learning model obtained through training, and send a configuration parameter of the updated channel learning model obtained through training and the first channel information to the network device. In this manner, the channel learning feedback signaling includes the configuration parameter of the updated channel learning model and the first channel information determined based on the updated channel learning model.

Alternatively, if the channel learning model is not applicable, the terminal device may obtain the first channel information based on an updated channel learning model obtained through training, and send a configuration parameter of the updated channel learning model obtained through training and the first channel information to the network device. In this manner, the channel learning feedback signaling includes information indicating that the channel learning model is not applicable, the configuration parameter of the updated channel learning model, and the first channel information determined based on the updated channel learning model.

Optionally, a specific manner used by the terminal device to perform feedback may be predefined in a protocol, or may be notified by the network device to the terminal device by using signaling. Specifically, this is not limited in this application.

In a possible implementation, the first communications apparatus and/or the second communications apparatus may determine a feedback manner of the channel learning feedback signaling based on whether the channel learning model is applicable.

Specifically, when the channel learning model is applicable, the first channel information may be fed back in a differential manner. For example, a value of a feedback amount of the first channel information currently fed back by the terminal device may be fed back by feeding back a difference from a value of a feedback amount of first channel information that is previously fed back. For example, a difference between ranks, a difference between CQIs, or a difference between feedback amounts existing after compression may be fed back. When there is a same channel learning model, a value range of the first channel information may be relatively stable. Therefore, the first channel information may be fed back by feeding back a difference, to reduce feedback overheads.

For example, when the channel learning model is applicable, the channel learning feedback signaling may be fed back on the PUCCH.

For example, when the channel learning model is not applicable, the channel learning feedback signaling may be fed back on the PUSCH.

For example, when the channel learning model is not applicable, the first channel information may not be fed back or reported in the differential manner. The value range of the first channel information may change after the channel learning model changes. Therefore, the manner of feeding back the difference from the first channel information that is previously fed back is not suitable for feedback.

The channel learning feedback signaling may include content in channel state information, for example, a rank value and a CQI.

When the channel learning model is applicable, the terminal may feed back the rank value and/or the CQI, and the first channel information. When the channel learning model is not applicable, the terminal may feed back only the rank value and/or the CQI.

In a possible implementation, the first communications apparatus and/or the second communications apparatus may determine the feedback content in the channel learning feedback signaling based on whether the channel learning model is applicable.

For example, when the channel learning model is applicable, the channel learning feedback signaling includes the rank value, the CQI, and the first channel information. Alternatively, when the channel learning model is applicable, the channel learning feedback signaling includes the rank value and the first channel information. Alternatively, when the channel learning model is applicable, the channel learning feedback signaling includes the CQI value and the first channel information.

For example, when the channel learning model is not applicable, the channel learning feedback signaling includes the rank value and the CQI. Alternatively, when the channel learning model is not applicable, the channel learning feedback signaling includes the rank value or the CQI.

For example, there may be a correspondence between whether the channel learning model is applicable and the content included in the channel learning feedback signaling. For details, refer to the example of the correspondence in Table 11 in this application. For brevity, details are not described herein.

Optionally, the first communications apparatus and/or the second communications apparatus may determine the feedback content in the channel learning feedback signaling based on the correspondence between whether the channel learning model is applicable and the content included in the channel learning feedback signaling.

In a possible implementation, the first communications apparatus and/or the second communications apparatus may determine, based on whether the channel learning model is applicable, a resource occupied by the channel learning feedback signaling.

Whether the channel learning model is applicable may correspond to different feedback content in the channel learning feedback signaling. Therefore, the network device and/or the terminal device may determine, based on whether the channel learning model is applicable, the resource occupied by the channel learning feedback signaling.

Specifically, for example, the network device and/or the terminal device may determine, based on whether the channel learning model is applicable, an identifier of the resource occupied by the channel learning feedback signaling and/or a size of the resource occupied by the channel learning feedback signaling.

For example, when the channel learning model is applicable, if the resource occupied by the channel learning feedback signaling is a resource 1, the terminal device may send the channel learning feedback signaling on the resource 1, and the network device may receive the channel learning feedback signaling on the resource 1.

For example, when the channel learning model is not applicable, if the resource occupied by the channel learning feedback signaling is a resource 2, the terminal device may send the channel learning feedback signaling on the resource 2, and the network device may receive the channel learning feedback signaling on the resource 2.

For example, when the channel learning model is applicable, the size of the resource occupied by the channel learning feedback signaling is X resource units. The resource unit may refer to an RE, a symbol, or an RB. Herein, X is a positive integer, or X may alternatively refer to a specific range. For example, X ranges from $X_1$ to $X_2$, X is greater than $X_1$, or X is less than $X_2$, where $X_1$ and $X_2$ are positive integers.

For example, when the channel learning model is not applicable, the size of the resource occupied by the channel learning feedback signaling is Y resource units. The resource unit may refer to an RE, a symbol, or an RB. Herein, Y is a positive integer, or Y may alternatively refer to a specific range. For example, Y ranges from $Y_1$ to $Y_2$, Y is greater than $Y_1$, or Y is less than $Y_2$, where $Y_1$ and $Y_2$ are positive integers.

Optionally, the network device and/or the terminal device may determine a feedback resource of the channel learning feedback signaling based on the size of the resource occupied by the channel learning feedback signaling. In other words, the terminal device may send the channel learning feedback signaling on the feedback resource, and the network device may receive the channel learning feedback signaling on the corresponding feedback resource.

In addition, there may be a correspondence between whether the channel learning model is applicable and the resource occupied by the channel learning feedback signaling. For details, refer to the example of the correspondence in Table 8 in this application. For brevity, details are not described herein.

Optionally, the first communications apparatus and/or the second communications apparatus may determine, based on the correspondence between whether the channel learning model is applicable and the resource occupied by the channel learning feedback signaling, the resource occupied by the channel learning feedback signaling.

In addition, the network device and/or the terminal device may determine a bit quantity of the channel learning feedback signaling based on whether the channel learning model is applicable. Further, the network device and/or the terminal device may determine, based on the bit quantity of the channel learning feedback signaling, the resource occupied by the channel learning feedback signaling.

For example, when the channel learning model is applicable, the bit quantity of the channel learning feedback signaling is Z. Herein, Z is a positive integer, or Z may alternatively refer to a specific range. For example, Z ranges from $Z_1$ to $Z_2$, Z is greater than $Z_1$, or Z is less than $Z_2$, where $Z_1$ and $Z_2$ are positive integers.

For example, when the channel learning model is not applicable, the bit quantity of the channel learning feedback signaling is $W_3$. Herein, $W_3$ is a positive integer, or $W_3$ may alternatively refer to a specific range. For example, $W_3$ is $W_3$, W is greater than $W_{3,\,1}$, or W is less than $W_{3,\,2}$, where $W_{3,\,1}$ and $W_{3,\,2}$ are positive integers.

For example, when the channel learning model is applicable, the bit quantity of the channel learning feedback signaling is 20 bits; or when the channel learning model is not applicable, the bit quantity of the channel learning feedback signaling is 10 bits.

For example, when the channel learning model is applicable, the bit quantity of the channel learning feedback signaling is greater than 10 bits; or when the channel learning model is not applicable, the bit quantity of the channel learning feedback signaling is less than 10 bits.

For example, the network device and/or the terminal device may determine, based on the bit quantity of the channel learning feedback signaling, the identifier of the resource occupied by the channel learning feedback signaling and the size of the resource occupied by the channel learning feedback signaling.

For example, when the bit quantity of the channel learning feedback signaling is Z, the identifier of the resource occupied by the channel learning feedback signaling is the resource 1.

For example, when the bit quantity of the channel learning feedback signaling is $W_3$, the identifier of the resource occupied by the channel learning feedback signaling is the resource 2.

For example, when the bit quantity of the channel learning feedback signaling is 20 bits, the identifier of the resource occupied by the channel learning feedback signaling is the resource 1; or when the bit quantity of the channel learning feedback signaling is 10 bits, the identifier of the resource occupied by the channel learning feedback signaling is the resource 1.

For example, when the bit quantity of the channel learning feedback signaling is greater than 10 bits, the identifier of the resource occupied by the channel learning feedback signaling is the resource 1; or when the bit quantity of the channel learning feedback signaling is less than 10 bits, the identifier of the resource occupied by the channel learning feedback signaling is the resource 2.

For example, when the bit quantity of the channel learning feedback signaling is Z, the size of the resource occupied by the channel learning feedback signaling is X resource units. The resource unit may refer to an RE, a symbol, or an RB.

For example, when the bit quantity of the channel learning feedback signaling is $W_3$, the size of the resource occupied by the channel learning feedback signaling is Y resource units. The resource unit may refer to an RE, a symbol, or an RB.

Optionally, there is a correspondence between whether the channel learning model is applicable and the bit quantity of the channel learning feedback signaling. For details, refer to the example of the correspondence in Table 9 in this application. For brevity, details are not described herein.

Optionally, the first communications apparatus and/or the second communications apparatus may determine the bit quantity of the channel learning feedback signaling based on the correspondence between whether the channel learning model is applicable and the bit quantity of the channel learning feedback signaling.

Optionally, there is a correspondence between the bit quantity of the channel learning feedback signaling and the resource occupied by the channel learning feedback signaling. For details, refer to the example of the correspondence in Table 10 in this application. For brevity, details are not described herein.

Optionally, the first communications apparatus and/or second communications apparatus may determine, based on the correspondence between the bit quantity of the channel learning feedback signaling and the resource occupied by the channel learning feedback signaling, the resource occupied by the channel learning feedback signaling.

In the foregoing design, when the terminal device receives the channel learning training signaling, the terminal device and/or the network device may determine whether the channel learning model is applicable, and determine the feedback content, the feedback bit quantity, and the feedback resource of the channel learning feedback signaling based on whether the channel learning model is applicable. In this way, feedback overheads of the channel learning feedback signaling can be more effectively reduced, the feedback resource can be properly used, and resource utilization can be improved, to improve communication performance. For example, for a scenario in which the channel learning model is not applicable, the feedback content in the channel learning feedback signaling may be reduced, to reduce feedback overheads and avoid unnecessary feedback.

For the foregoing scenario 2, namely, a scenario in which the terminal device does not receive the channel learning training signaling, correspondingly, the network device does not send the channel learning training signaling.

In this scenario, the terminal device may perform channel learning training based on a timer (or periodically), and feed back the channel learning feedback signaling. Training and feedback are performed at a specified time and on a specified resource. Therefore, the feedback content may include only the configuration parameter of the channel learning model.

The channel learning feedback signaling may not include information indicating whether the channel learning model is applicable. For example, the terminal device may feed back the channel learning feedback signaling only when determining that the channel learning model is not applicable.

In this scenario, the channel learning feedback signaling may be periodically sent.

The rank value in the channel learning feedback signaling is based on a design in the conventional technology, and ranges from 1 to R.

The feedback content in the channel learning feedback signaling may include the configuration parameter of the channel learning model.

The feedback content in the channel learning feedback signaling may include the first channel information. The timer has a relatively long length, and therefore the first channel information changes relatively greatly. Therefore, the first channel information may not be fed back in the differential manner. The first channel information is first channel information determined by the terminal device based on the configuration parameter in the channel learning feedback signaling.

When the terminal device independently feeds back the channel learning feedback signaling at a specific time and on a specific resource, to enable the network device to correctly receive the channel learning feedback signaling and reduce detection/receiving complexity, in this scenario, the feedback content, the feedback bit quantity, and the feedback resource of the channel learning feedback signaling may be preconfigured, for example, determined based on higher layer signaling configuration of the network device.

In this embodiment, different channel learning feedback signaling is designed based on whether the model is applicable. In this way, there can be different feedback information in different scenarios, and the channel learning feedback signaling can be properly and efficiently sent and/or received, to reduce feedback overheads, so as to improve communication performance.

The method in the embodiments of this application is described above in detail with reference to FIG. 10 to FIG. 17. An apparatus in the embodiments of this application is described below in detail with reference to FIG. 18 to FIG. 20. It should be noted that the apparatus shown in FIG. 18 to FIG. 20 may implement the steps in the foregoing method. For brevity, details are not described herein.

Figure 18:
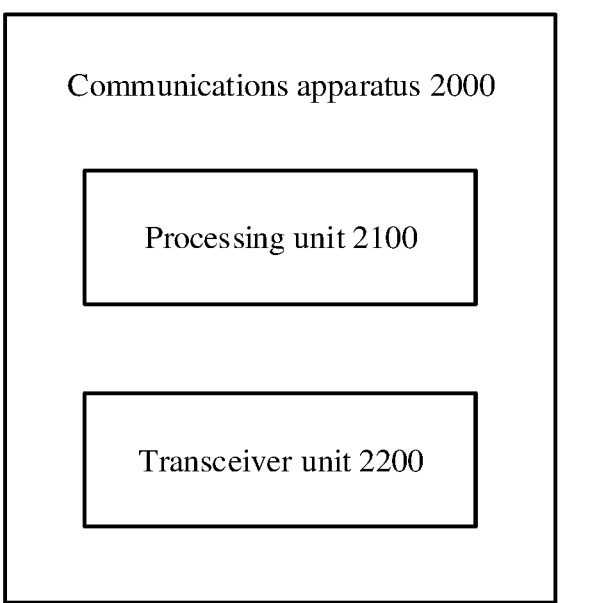
FIG. 18 is a schematic diagram of a communications apparatus according to an embodiment of this application.

FIG. 18 is a schematic block diagram of a communications apparatus according to an embodiment of this application. As shown in FIG. 18, the communications apparatus 2000 may include a processing unit 2100 and a transceiver unit 2200.

In a possible design, the communications apparatus 2000 may correspond to the first communications apparatus in the foregoing method embodiments, for example, may be a first communications apparatus or a component (for example, a chip or a chip system) disposed in a first communications apparatus.

It should be understood that the communications apparatus 2000 may correspond to the first communications apparatus in the method 200, the method 300, and the method 400 according to the embodiments of this application. The communications apparatus 2000 may include units configured to perform the methods performed by the first communications apparatus in the method 200 in FIG. 10, the method 300 in FIG. 12, and the method 400 in FIG. 13. In addition, the units in the communications apparatus 2000 and the foregoing other operations and/or functions are respectively used to implement the corresponding procedures of any one of the method 200 in FIG. 10, the method 300 in FIG. 12, and the method 400 in FIG. 13. It should be understood that a specific process in which the units perform the foregoing corresponding steps has been described in detail in the foregoing method embodiments. For brevity, details are not described herein again.

In another possible design, the communications apparatus 2000 may correspond to the second communications apparatus in the foregoing method embodiments, for example, may be a second communications apparatus or a component (for example, a chip or a chip system) disposed in a second communications apparatus.

It should be understood that the communications apparatus 2000 may correspond to the second communications apparatus in the method 200, the method 300, and the method 400 according to the embodiments of this application. The communications apparatus 2000 may include units configured to perform the methods performed by the second communications apparatus in the method 200 in FIG. 10, the method 300 in FIG. 12, and the method 400 in FIG. 13. In addition, the units in the communications apparatus 2000 and the foregoing other operations and/or functions are respectively used to implement the corresponding procedures of any one of the method 200 in FIG. 10, the method 300 in FIG. 12, and the method 400 in FIG. 13. It should be understood that a specific process in which the units perform the foregoing corresponding steps has been described in detail in the foregoing method embodiments. For brevity, details are not described herein again.

In still another possible design, the communications apparatus 2000 may correspond to the terminal device in the foregoing method embodiments, for example, may be a terminal device or a component (for example, a chip or a chip system) disposed in a terminal device.

It should be understood that the communications apparatus 2000 may correspond to the terminal device in the method 500 to the method 800 according to the embodiments of this application. The communications apparatus 2000 may include units configured to perform the methods performed by the terminal device in the method 500 to the method 800 in FIG. 14 to FIG. 17. In addition, the units in the communications apparatus 2000 and the foregoing other operations and/or functions are respectively used to implement the corresponding procedures of any one of the method 500 to the method 800 in FIG. 14 to FIG. 17. It should be understood that a specific process in which the units perform the foregoing corresponding steps has been described in detail in the foregoing method embodiments. For brevity, details are not described herein again.

It should be further understood that when the communications apparatus 2000 is a chip disposed in a terminal device, the transceiver unit 2200 in the communications apparatus 2000 may be implemented by using an input/output interface, and the processing unit 2100 in the communications apparatus 2000 may be implemented by using a processor, a microprocessor, an integrated circuit, or the like integrated into the chip or a chip system.

In still another possible design, the communications apparatus 2000 may correspond to the network device in the foregoing method embodiments, for example, may be a network device or a component (for example, a chip or a chip system) disposed in a network device.

It should be understood that the communications apparatus 2000 may correspond to the network device in the method 500 to the method 800 according to the embodiments of this application. The communications apparatus

2000 may include units configured to perform the methods performed by the network device in the method 500 to the method 800 in FIG. 14 to FIG. 17. In addition, the units in the communications apparatus 2000 and the foregoing other operations and/or functions are respectively used to implement the corresponding procedures of any one of the method 500 to the method 800 in FIG. 14 to FIG. 17. It should be understood that a specific process in which the units perform the foregoing corresponding steps has been described in detail in the foregoing method embodiments. For brevity, details are not described herein again.

It should be further understood that when the communications apparatus 2000 is a chip disposed in a network device, the transceiver unit 2200 in the communications apparatus 2000 may be implemented by using an input/output interface, and the processing unit 2100 in the communications apparatus 2000 may be implemented by using a processor, a microprocessor, an integrated circuit, or the like integrated into the chip or a chip system.

Figure 19:
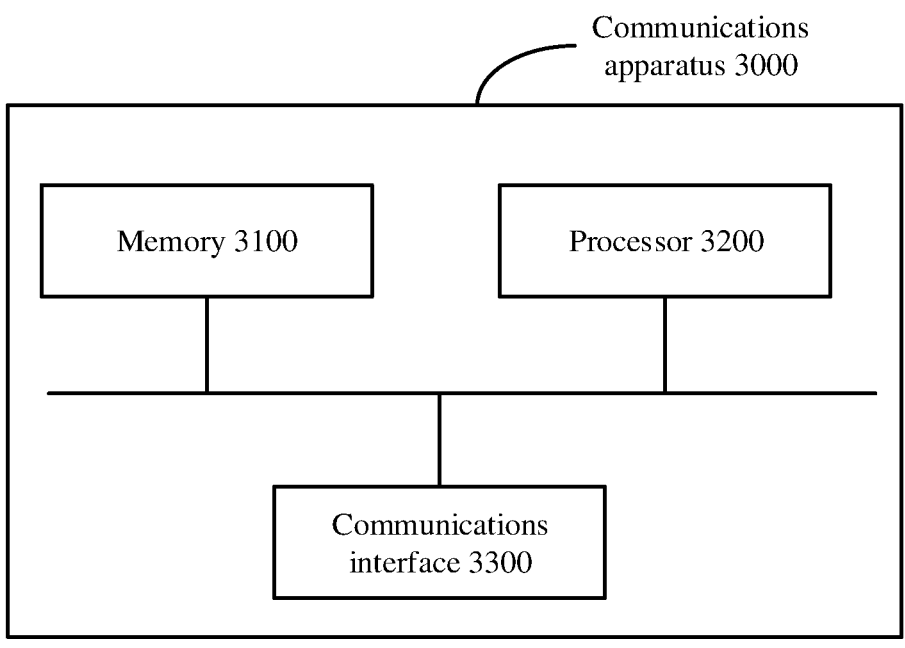
FIG. 19 is a schematic block diagram of a communications apparatus according to another embodiment of this application.

FIG. 19 is a schematic block diagram of a communications apparatus according to another embodiment of this application. The communications apparatus 3000 shown in FIG. 19 may include a memory 3100, a processor 3200, and a communications interface 3300. The memory 3100, the processor 3200, and the communications interface 3300 are connected by using an internal connection path. The memory 3100 is configured to store instructions. The processor 3200 is configured to execute the instructions stored in the memory 3100, to control an input/output interface 3000 to receive/send a first message. Optionally, the memory 3100 may be coupled to the processor 3200 by using an interface, or may be integrated into the processor 3200.

It should be noted that the communications interface 3300 uses a transceiver apparatus that includes but is not limited to a transceiver, to implement communication between the communications apparatus 3000 and another device or a communications network. The communications interface 3300 may further include an input/output interface.

In an implementation process, the steps in the foregoing method may be implemented by using a hardware integrated logical circuit in the processor 3200, or by using instructions in a form of software. The method disclosed with reference to embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 3100, and the processor 3200 reads information in the memory 3100 and completes the steps in the foregoing methods in combination with hardware of the processor. To avoid repetition, details are not described herein again.

It should be understood that, the processor in embodiments of this application may be a central processing unit (CPU), or the processor may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It should also be understood that in embodiments of this application, the memory may include a read-only memory and a random access memory, and provide instructions and data to the processor. A part of the processor may further include a non-volatile random access memory. For example, the processor may further store information of a device type.

Figure 20:
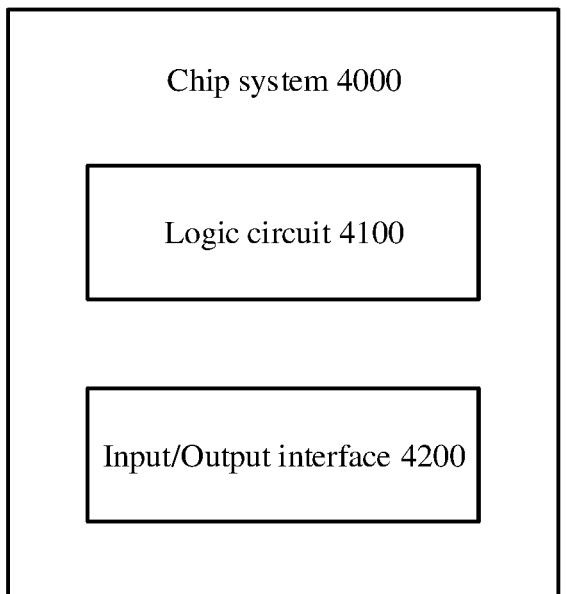
FIG. 20 is a schematic diagram of a chip system according to an embodiment of this application.

FIG. 20 is a schematic diagram of a chip system according to an embodiment of this application. The chip system 4000 shown in FIG. 20 includes a logic circuit 4100 and an input/output interface 4200. The logic circuit is configured to: be coupled to an input interface, and transmit data (for example, a first message) through the input/output interface, to perform the methods in FIG. 10 and FIG. 12 to FIG. 17.

An embodiment of this application further provides a processing apparatus, including a processor and an interface. The processor is configured to perform the method in any one of the foregoing method embodiments.

It should be understood that the processing apparatus may be one or more chips. For example, the processing apparatus may be a field-programmable gate array (FPGA), an application-specific integrated circuit (ASIC), a system on chip (SoC), a central processor unit (CPU), a network processor (NP), a digital signal processor (DSP), a micro controller unit (MCU), a programmable logic device (PLD) or another integrated chip.

In an implementation process, the steps in the foregoing methods can be implemented by using a hardware integrated logic circuit in the processor, or by using instructions in a form of software. The steps of the method disclosed with reference to embodiments of this application may be directly performed by a hardware processor, or may be performed by a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that, the processor in this embodiment of this application may be an integrated circuit chip, and has a signal processing capability. In an implementation process, steps in the foregoing method embodiments are implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (erasable PROM, EPROM), an electrically erasable programmable read-only memory (electrically EPROM, EEPROM), or a flash memory. The volatile memory may be a random access memory (RAM) and is used as an external cache. By way of example and not limitation, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the systems and methods described in this specification includes but is not limited to these and any memory of another appropriate type.

According to the method provided in the embodiments of this application, this application further provides a computer program product. The computer program product includes computer program code. When the computer program code is run on a computer, the computer is enabled to perform the methods respectively performed by the first communications apparatus and the second communications apparatus in the embodiments shown in FIG. 10, FIG. 12, and FIG. 13, or perform the methods respectively performed by the terminal device and the network device in the embodiments shown in FIG. 14 to FIG. 17.

According to the method provided in the embodiments of this application, this application further provides a computer-readable storage medium. The computer-readable storage medium stores program code. When the program code is run on a computer, the computer is enabled to perform the methods respectively performed by the first communications apparatus and the second communications apparatus in the embodiments shown in FIG. 10, FIG. 12, and FIG. 13, or perform the methods respectively performed by the terminal device and the network device in the embodiments shown in FIG. 14 to FIG. 17.

According to the method provided in the embodiments of this application, this application further provides a system. The system includes one or more first communications apparatuses and one or more second communications apparatuses. The first communications apparatus may be a terminal device, and the second communications apparatus may be a network device. Alternatively, the first communications apparatus may be a network device, and the second communications apparatus may be a terminal device.

The network device and the terminal device in the apparatus embodiments fully correspond to the network device or the terminal device in the method embodiments. A corresponding module or unit performs a corresponding step. For example, the communications unit (transceiver) performs a receiving step or a sending step in the method embodiments, and a step other than the sending step and the receiving step may be performed by the processing unit (processor). For a specific function of the unit, refer to the corresponding method embodiments. There may be one or more processors.

Terms such as "component", "module", and "system" used in this specification are used to indicate a computer-related entity, hardware, firmware, a combination of hardware and software, software, or software being executed. For example, a component may be, but is not limited to, a process that is run on a processor, a processor, an object, an executable file, a thread of execution, a program, and/or a computer. As illustrated by using figures, both an application that is run on a computing device and the computing device may be components. One or more components may reside within a process and/or an execution thread, and a component may be located on one computer and/or distributed between two or more computers. In addition, these components may be executed by various computer-readable media that store various data structures. The components may communicate by using a local and/or remote process and based on, for example, a signal having one or more data packets (for example, data from two components interacting with another component in a local system, in a distributed system, and/or across a network such as the internet interacting with other systems by using the signal).

A person of ordinary skill in the art may be aware that, in combination with illustrative logical blocks described in embodiments disclosed in this specification and steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

In the foregoing embodiments, all or some of the functions of the functional units may be implemented by software, hardware, firmware, or any combination thereof. When software is used to implement the embodiments, all or a part of the embodiments may be implemented in a form of a computer program product. The computer program product includes one or more computer instructions (programs). When the computer program instructions (programs) are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:

determining, by a first communications apparatus, whether a first channel learning model is applicable, wherein the first channel learning model is used to determine first channel information based on target channel information, and a data amount of the first channel information is less than a data amount of the target channel information;

sending, by the first communications apparatus, a first message in response to determining that the first channel learning model is not applicable, wherein the first message is used to indicate that the first channel learning model is not applicable; and receiving, by the first communications apparatus, first indication information, wherein the first indication information is used to indicate one or more of the following:

a resource used to transmit the first message, content in the first message, a manner of sending the first message, or a channel learning model training parameter, wherein the channel learning model training parameter comprises at least one of the following: a channel learning model training time or configuration information of a reference signal for channel learning model training.

2. The method according to claim 1, wherein the determining, by a first communications apparatus, whether a first channel learning model is applicable comprises:

in response to determining that a variation of a long-term statistical characteristic of a target channel is greater than or equal to a first preset threshold, determining, by the first communications apparatus, that the first channel learning model is not applicable; or in response to determining that a variation of a long-term statistical characteristic of a target channel is less than the first preset threshold, determining, by the first communications apparatus, that the first channel learning model is applicable.

3. The method according to claim 1, wherein the target channel information is an input to the first channel learning model, and the first channel information is an output of the first channel learning model.

4. The method according to claim 1, wherein the determining, by a first communications apparatus, whether a first channel learning model is applicable comprises at least one of:

determining, by the first communications apparatus based on received first scheduling information, whether the first channel learning model is applicable, or determining, by the first communications apparatus based on data transmission performance, whether the first channel learning model is applicable.

5. The method according to claim 1, wherein the determining, by a first communications apparatus, whether a first channel learning model is applicable comprises:

in response to determining that a scenario changes, determining, by the first communications apparatus, that the first channel learning model is not applicable; or in response to determining that a scenario does not change, determining, by the first communications apparatus, that the first channel learning model is applicable, wherein the scenario comprises at least one of the following: an indoor still scenario, an outdoor still scenario, a low-speed moving scenario, a high-speed moving scenario, a suburban scenario, an urban scenario, a macro base station, a micro base station, a vehicle-mounted scenario, a vehicle-to-another device scenario, or a scenario defined in a third generation partnership project protocol.

6. The method according to claim 1, wherein the determining, by a first communications apparatus, whether a first channel learning model is applicable comprises:

when a performance indicator of the first channel learning model is less than a second preset threshold, determining, by the first communications apparatus, that the first channel learning model is not applicable, wherein the performance indicator comprises continuity and/or trustworthiness; or in response to determining that a performance indicator of the first channel learning model is greater than or equal to the second preset threshold, determining, by the first communications apparatus, that the first channel learning model is applicable.

7. The method according to claim 1, wherein the determining, by a first communications apparatus, whether a first channel learning model is applicable comprises:

determining, by the first communications apparatus based on an error between the target channel information and second channel information, whether the first channel learning model is applicable, wherein the second channel information is determined based on the first channel information and a second channel learning model, and the second channel learning model corresponds to the first channel learning model.

8. The method according to claim 1, wherein the first indication information is used to indicate the first communications apparatus to perform channel learning model training.

9. The method according to claim 1, wherein the method further comprises:

sending, by the first communications apparatus, a first request message, wherein the first request message is used to request one or more of the following: an operation of performing channel learning model training, an operation of sending the first message, or the first indication information.

10. The method according to claim 1, wherein the first message is further used to indicate one or more configuration parameters used to update a second channel learning model, and the second channel learning model is used to determine second channel information based on the first channel information.

11. The method according to claim 1, wherein the method further comprises:

receiving, by the first communications apparatus, a second message, wherein the second message is used to indicate one or more configuration parameters used to update the first channel learning model.

12. The method according to claim 10, wherein the method further comprises:

determining, by the first communications apparatus based on a first parameter, the one or more configuration parameters used to update a second channel learning model, wherein:

the first parameter comprises at least one of the following: a cell identifier of a cell in which the first communications apparatus is located, a scenario in which the first communications apparatus is located, a type of the first communications apparatus, or a geographical location in which the first communications apparatus is located.

13. A communication method, comprising:

receiving, by a second communications apparatus, a first message;

determining, by the second communications apparatus based on the first message, that a first channel learning model is not applicable, wherein the first channel learning model is used to determine first channel information based on target channel information, and a dimension of the first channel information is less than a dimension of the target channel information; and sending, by the second communications apparatus, first indication information, wherein the first indication information is further used to indicate one or more of the following:

a resource used to transmit the first message, content in the first message, a manner of the first message, or a channel learning model training parameter, wherein the channel learning model training parameter comprises at least one of the following: a channel learning model training time or configuration information of a reference signal for channel learning model training.

14. The method according to claim 13, wherein the first indication information is used to indicate to perform channel learning model training.

15. The method according to claim 13, wherein the method further comprises:

receiving, by the second communications apparatus, first request signaling, wherein the first request signaling is used to request one or more of the following: an operation of performing channel learning model training, an operation of sending the first message, or the first indication information.

16. The method according to claim 13, wherein the first message is further used to indicate one or more configuration parameters used to update a second channel learning model, and the second channel learning model is used to determine second channel information based on the first channel information.

17. The method according to claim 13, wherein the method further comprises:

sending, by the second communications apparatus, a second message, wherein the second message is used to indicate one or more configuration parameters used to update the first channel learning model.

18. A communications apparatus, comprising:

at least one processor; and at least one memory coupled to the at least one processor and storing programming instructions for execution by the at least one processor to cause the communications apparatus to:

determine whether a first channel learning model is applicable, wherein the first channel learning model is used to determine first channel information based on target channel information, and a data amount of the first channel information is less than a data amount of the target channel information;

send a first message in response to determining that determining that the first channel learning model is not applicable, wherein the first message is used to indicate that the first channel learning model is not applicable; and receive first indication information, wherein the first indication information is used to indicate one or more of the following:

a resource used to transmit the first message, content in the first message, a manner of sending the first message, or a channel learning model training parameter, wherein the channel learning model training parameter comprises at least one of the following: a channel learning model training time or configuration information of a reference signal for channel learning model training.

19. The communications apparatus according to claim 18, wherein the programming instructions are for execution by the at least one processor to cause the communications apparatus to: in response to determining that a variation of a long-term statistical characteristic of a target channel is greater than or equal to a first preset threshold, determine that the first channel learning model is not applicable; or in response to determining that a variation of a long-term statistical characteristic of a target channel is less than the first preset threshold, determine that the first channel learning model is applicable.

* * * * *